(12) United States Patent
Tarumi

(10) Patent No.: US 6,182,273 B1
(45) Date of Patent: *Jan. 30, 2001

(54) GROUPWARE DEVELOPMENT ASSISTING SYSTEM

(75) Inventor: Hiroyuki Tarumi, Tokyo (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/245,681

(22) Filed: May 18, 1994

(30) Foreign Application Priority Data

May 18, 1993 (JP) .................................................. 5-115463

(51) Int. Cl.[7] ........................................................ G06F 9/00
(52) U.S. Cl. ............................................ 717/1; 709/316
(58) Field of Search ............................ 315/185 UL, 700; 395/680, 683; 709/300, 303, 310–332, 1, 100–108, 204, 206; 717/1–11; 345/329; 358/400; 714/4

(56) References Cited

U.S. PATENT DOCUMENTS

| | | | |
|---|---|---|---|
| 5,408,333 | * 4/1995 | Kojima et al. | 358/400 |
| 5,557,736 | * 9/1996 | Hirosawa et al. | 714/4 |
| 5,692,141 | * 11/1997 | Kamisango et al. | 345/329 |
| 5,822,527 | * 10/1998 | Post | 709/206 |

OTHER PUBLICATIONS

Schnaidt, Patricia, "X.400 messaging,", LAN Magazine, v7, n6, p19(2), Jun. 1992.*
Schnaidt, Patricia, X.400 messaging, LAN Magazine, v7, n6, p19(2), Jun. 1992.*

* cited by examiner

Primary Examiner—Alvin E. Oberley
Assistant Examiner—St. John Courtenay, III
(74) Attorney, Agent, or Firm—Foley & Lardner

(57) ABSTRACT

The groupware development assisting system includes a format definition portion which defines a format of the electronic mail given or received among nodes, an object definition portion which defines the operation condition information of a software object forming one of nodes inputting or outputting the electronic mail, a transferring order definition portion which designates a transferring route showing the delivery and receipt of the electronic mail among the nodes and a format of the electronic mail given or received by the transferring route. There is also a generation portion which generates electronic mail utilization environment definition information indicating the transferring operation of the electronic mail and the editing operation of the electronic mail in the transferring route relating to a node corresponding to a worker, and generates a processing program code required to execute individual operation of the software object and second electronic mail utilization environment definition information indicating the transferring operation of the electronic mail in the transferring route relating to the software object based on the format definition information, the object definition information and the transferring order definition information.

44 Claims, 45 Drawing Sheets

FIG. 4   40 FORMAT DEFINITION INFORMATION

```
1  pageform 330x240
2  name label0
3  type LabelType
4  position 0x0
5  const"QUESTIONNAIRE"
6  size 328x58
7  endn
8  name label1
9  type LabelType
10 position 0x60
11 const"TITLE"
12 size 58x28
13 endn
14 name TE0
15 type TextType
16 position 60x60
17 size 268x28
18 endn
19 name label2
20 type LabelType
21 position 0x90
22 const"CLASSIFICATION"
23 size 58x28
24 endn
25 name TE1
26 type TextType
27 position 60x120
28 size 268x118
29 endn
30 name label3
31 type LabelType
32 position 0x120
33 const"QUESTION/n CONTENT"
34 size 58x118
35 endn
36 name menu0
37 type SelectionType
38 position 60x90
39 select"a)TECHNOLOGY"" b)OFFICE WORK""c)OTHER"
40 size 268x28
41 endn
```

FIG.5

```
1  Object QuestionRecorder
2  Input QUESTIONNAIRE/m
3
4  Procedure {
5      if(m->menu0=="a)TECHNOLOGY") {
6          add_db("TECHNOLOGY QUESTION RECORD", m->TE0) ;
7      }
8
9      if(m->menu0=="b)OFFICE WORK") {
10         add_db("OFFICE WORK QUESTION RECORD", m->TE0) ;
11     }
12 }
13
14 Output QUESTIONNAIRE/m
15 End Object
```

FIG.11

```
1  (declare-person (TARO YAMADA HANAKO SUZUKI))
2  (declare-object (QuestionRecorder))
3  (declare-form (QUESTIONNAIRE REPLY SLIP))
4
5  (define-node node1 (person-node TARO YAMADA))
6  (define-node node2 (object-node QuestionRecorder))
7  (define-node node3 (person-node HANAKO SUZUKI))
8  (define-node node4 (person-node TARO YAMADA))
9
10 (define-arc arc1 (node1 node2))
11 (define-arc arc2 (node2 node3))
12 (define-arc arc3 (node3 node4))
13
14 (define-form arc1 QUESTIONNAIRE)
15 (define-form arc2 QUESTIONNAIRE)
16 (define-form arc3 REPLY SLIP)
```

FIG.13

```
1 if(format(ReceivedMail)==QUESTIONNAIRE & from(ReceivedMail)==QuestionRecorder){
2    show ReceivedMail
3    create REPLY SLIP as A
4    edit A
5    send A to TARO YAMADA
6 }
```

FIG.14

141 QUESTION REPLY WINDOW

142 END OF WORK

QUESTIONNAIRE

| TITLE | cc-P | |
|---|---|---|
| CLASSIFICATION | a) TECHNOLOGY b) OFFICE WORK | c) OTHER |
| QUESTION CONTENT | PLEASE ADVICE ABOUT -P OPTION OF C COMPILER | |

143 QUESTIONNAIRE PRESENTATION SUB-WINDOW

REPLY SLIP

| TITLE | | |
|---|---|---|
| CLASSIFICATION | a) TECHNOLOGY b) OFFICE WORK | c) OTHER |
| REPLY | | |

144 REPLY SLIP EDITING SUB-WINDOW

FIG. 16

```
1 if(format(ReceivedMail)==QUESTIONNAIRE & from(ReceivedMail)==TARO YAMADA) {
2    A=do_proc(proc_QuestionRecorder_1,ReceivedMail)
3    send A to HANAKO SUZUKI
4 }
```

FIG.17

```
1  QUESTIONNAIRE*proc_QuestionRecorder_1(QUESTIONNAIRE*m){
2    if(strcmp(m->menu0,"a)TECHNOLOGY")==0){
3      add_db("TECHNOLOGY QUESTION RECORD",m->TE0);
4    }
5
6    if(strcmp(m->menu0,"b)OFFICE WORK")==0){
7      add_db("OFFICE WORK QUESTION RECORD",m->TE0);
8    }
9    return m;
10 }
```

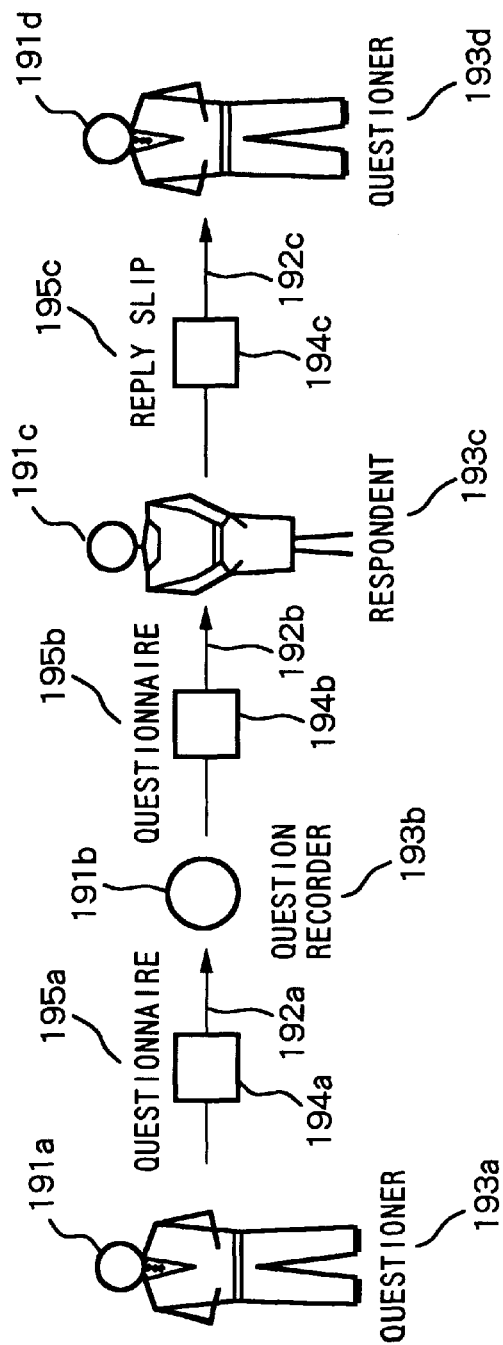

FIG.22

```
1 From:ReportCollector
2 To: Notifier
3 Subject:Automatic Reporting Mail
4
5 Completion:REPORT from TARO YAMADA,message-id=<93030040850AA01388>,
6      date=Thu, 04 Mar 93 17:50:19+0900,
7      scenario-id=<g8340398>
```

FIG.24

```
1 PseudoObject(Meeting)StrategicMeeting
2 Input MARKET TREND REPORT, EXCHANGE TREND REPORT
3
4 Attendant CHAIRPERSON, SECRETARY, MARKET TREND REPORTER, EXCHANGE TREND REPORTER,
  BUSINESS MANAGER, SALES PROMOTION MANAGER
5 OutputMaker SECRETARY
6
7 Output MINUTES
```

FIG.25

```
1  BEGIN{m=0,n=0}
2  if(format(ReceivedMail)==MARKET TREND REPORT & from(ReceivedMail)==KOZO SATO) {
3    X=ReceivedMail
4    m=m+1
5  }
6  if(format(ReceivedMail)==EXCHANGE TREND REPORT & from(ReceivedMail)==KOJI FUKUDA) {
7    Y=ReceivedMail
8    n=n+1
9  }
10 if(m>0 & n>0) {
11   m=0, n=0
12   send X to MISAKO TANAKA, JIRO NAKAGAWA, KOJI FUKUDA, AKIKO YANO, MICHIO OGAWA
13   send Y to MISAKO TANAKA, JIRO NAKAGAWA, KOZO SATO, AKIKO YANO, MICHIO OGAWA
14   create MINUTES as B
15   send B to JIRO NAKAGAWA
16 }
```

FIG.26

```
1 if(format(ReceivedMail)==MINUTES & from(ReceivedMail)==StrategicMeeting){
2   edit ReceivedMail
3   send ReceivedMail to HANAKO SUZUKI
4 }
```

FIG.27

```
1 PseudoObject(Meeting) StrategicMeeting
2 Input MARKET TREND REPORT, EXCHANGE TREND REPORT
3 Tool MERMAID
4
5 Attendant CHAIRPERSON, SECRETARY, MARKET TREND REPORTER, EXCHANGE TREND REPORTER,
  BUSINESS MANAGER, SALES PROMOTION MANAGER
6 Originator CHAIRPERSON
7 OutputMaker SECRETARY, BUSINESS MANAGER
8
9 Output MINUTES
```

FIG.28

```
1  BEGIN{m=0, n=0}
2  if(format(ReceivedMail)==MARKET TREND REPORT & from(ReceivedMail)==KOZO SATO){
3    X=ReceivedMail
4    m=m+1
5  }
6  if(format(ReceivedMail)==EXCHANGE TREND REPORT & from(ReceivedMail)==KOJI FUKUDA){
7    Y=ReceivedMail
8    n=n+1
9  }
10 if(m>0 & n>0){
11   m=0, n=0
12   send X to MISAKO TANAKA, JIRO NAKAGAWA, KOJI FUKUDA, AKIKO YANO, MICHIO OGAWA
13   send Y to MISAKO TANAKA, JIRO NAKAGAWA, KOZO SATO, AKIKO YANO, MICHIO OGAWA
14   create MINUTES as A
15   send A to JIRO NAKAGAWA
16 }
```

FIG.29

```
1  BEGIN{m=0, n=0}
2  if(format(ReceivedMail)==MARKET TREND REPORT & from(ReceivedMail)==StrategicMeeting){
3    m=m+1
4  }
5  if(format(ReceivedMail)==EXCHANGE TREND REPORT & from(ReceivedMail)==StrategicMeeting){
6    n=n+1
7  }
8  if(m>0 & n>0){
9    m=0, n=0
10   append_menu MERMAID for"mermaid",on_termination T
11 }
12 if(T){
13   create_signal_message as X
14   send X to JIRO NAKAGAWA
15 }
```

FIG.30

```
1 if(format(ReceivedMail)==MINUTES & from(ReceivedMail)==StrategicMeeting){
2   store ReceivedMail as /tmp/foobar
3 }
4 if(format(ReceivedMail)==SIGNAL && from(ReceivedMail)==MISAKO TANAKA){
5   get/tmp/foobar as C
6   send C to HANAKO SUZUKI
7 }
```

FIG.33

```
1  Object BudgetManager
2  Input BUDGET RESULT REPORT/y
3
4  Procedure{
5   int x;
6   SHIPPING POSSIBILITY REPORT *a;
7
8   x=call_coordination(MINIMIZE, y->BALANCE BUDGET/MANHOUR_YEN);
9   a=create_format("SHIPPING POSSIBILITY REPORT");
10  a->PROPRIETY=(x>=0)?"yes":"no";
11  a->REQUIRED MANHOUR=x;
12  }
13
14 Output SHIPPING POSSIBILITY REPORT/a
15 End Object
```

FIG.34

```
1  SHIPPING POSSIBILITY REPORT*proc_BudgetManager_1(SHIPPING POSSIBILITY REPORT*y) {
2    int x;
3    SHIPPING POSSIBILITY REPORT *a;
4
5    x=call_coordination(MINIMIZE,y->BALANCE BUDGET/MANHOUR_YEN,QualityManager);
6    a=create_format("SHIPPING POSSIBILITY REPORT");
7    a->PROPRIETY=(x>=0)?"yes":"no";
8    a->REQUIRED MANHOUR=x;
9
10   return a;
11 }
```

FIG.38

```
1  IF_NODE=kclpcl, OS=Windows, EDITOR=EDITOR OF COMPANY J
2  if(format(ReceivedMail)==QUESTIONNAIRE & from(ReceivedMail)==QuestionRecorder)
3  {
4    show ReceivedMail
5    create REPLY SLIP as A
6    edit A
7    send A to TARO YAMADA @cs-net
8  }
```

```
1 Object MailDelayer
2 Input REPORT,SIGNAL(TriggerMaker)
3 Output REPORT
4 End Object
```

FIG.41

```
1  BEGIN{m=0, n=0}
2  if(format(ReceivedMail)==REPORT & from(ReceivedMail)==TARO YAMADA) {
3      A=ReceivedMail
4      m=m+1
5  }
6  if(format(ReceivedMail)==SIGNAL & from(ReceivedMail)==TriggerMaker) {
7      n=n+1
8  }
9  if(m>0 & n>0) {
10     m=0, n=0
11     send A to HANAKO SUZUKI
12 }
```

FIG.49

| | FORMAT | SENDER | SYNCHRONIZATION | ACTION |
|---|---|---|---|---|
| 1 | EXCHANGE TREND REPORT | StrategicMeeting | NONE | show |
| 2 | MARKET TREND REPORT | StrategicMeeting | NONE | show |
| 3 | MINUTES | StrategicMeeting | NONE | store/tmp/foobar |
| 4 | STATE-TRNS | | 5 | state4 |
| 5 | SIGNAL | MISAKO TANAKA | 4 | send/tmp/foobar to HANAKO SUZUKI |

| | FORMAT | SENDER | SYNCHRONIZATION | ACTION |
|---|---|---|---|---|
| 1 | BEGIN | | NONE | state 2 |
| 2 | STATE-TRNS | | NONE | create EXAMINATION REPORT<br>edit EXAMINATION REPORT<br>send EXAMINATION REPORT<br>  to MEGUMI ISHIGURO |
| 3 | EXAMINATION REPORT<br>F(APPROVAL)=NO | MEGUMI ISHIGURO | NONE | edit EXAMINATION REPORT<br>send EXAMINATION REPORT<br>  to MEGUMI ISHIGURO |
| 4 | EXAMINATION REPORT<br>F(APPROVAL)=YES | MEGUMI ISHIGURO | NONE | edit EXAMINATION REPORT<br>state 3 |
| 5 | STATE-TRNS | | NONE | edit EXAMINATION REPORT<br>send EXAMINATION REPORT<br>  to TADASHI SEKIMOTO |

| | FORMAT | SENDER | SYNCHRONIZATION | ACTION |
|---|---|---|---|---|
| 1 | BUDGET RESULT REPORT | TARO YAMADA | NONE | proc_BudgetManger_1 send SHIPPING POSSIBILITY to HANAKO SUZUKI |

511

GROUPWARE DEVELOPMENT ASSISTING SYSTEM

BACKGROUND OF THE INVENTION

1. Field of the Invention

This invention relates to a groupware development assisting system. More specifically, it relates to a system for assisting designing and development of groupware which supports the execution of a series of works which is made by a plurality of workers using electronic mail for communication between individual workers.

2. Description of the Related Art

A system for assisting work which is conducted by a plurality of workers is generally called groupware. Among such groupware, one used on the assumption that all workers work at the same time is called realtime type groupware, and one without such an assumption is called non-realtime type groupware. This invention mainly relates to non-realtime type groupware.

In the non-realtime type groupware, electronic mail is generally used to communicate between workers. A typical system for assisting the communication among a plurality of workers using electronic mail as a communication means is an office automation system which uses electronic mail to treat slips and forms so as to assist works of filling or approving slips and forms. Prior art relating to this type of office automation system will be described below.

The published Japanese Patent application 4-76768 describes an electronic slip preparing device which designs and prepares electronic slips. This electronic slip preparing device can previously define processing order for activating slip processing parts for printing, approving, copying, posting or the like according to the input of data. And, the published Japanese Patent application 63-141176 describes an electronic slip system for doing office work by using electronic mail as slips. This electronic slip system includes a business conducting flow management mechanism and a business conducting automatization processing program activation and monitoring mechanism. The business conducting flow management mechanism automatically determines where a slip shall be sent or a next slip processing which corresponds to the content conditions of a slip, and when a slip processing is particularly needed, the business conducting automatization processing program activation and monitoring mechanism automatically activates an applicable processing program.

An example published as an academic society thesis includes a Brownie system which was made public in the 42nd national convention 4T-6 of the Information Processing Society and the 44th national convention 4M-4 of the Information Processing Society. This Brownie system allows giving and receiving one form as electronic mail between workers, and each worker fills out a form according to respective roles. And, a method of describing the flow of group work is also disclosed.

The aforementioned conventional groupware development assisting systems have drawbacks of lacking in convenience of the assisting system and diversity of transferring forms which the assisting system can treat. Such drawbacks will be described in detail below.

(1) As it is seen from the published Japanese Patent application 63-141176, although an electronic mail transferring order and a processing program activation condition in the groupware can be defined, its defining method has to depend on a method to enter in a condition table or a special programming language, and cannot be easily defined by a developer who does not have a specialized knowledge on an electronic mail transferring method or an application activation method from electronic mail.

(2) As it is seen from the published Japanese Patent applications 4-76768 and 63-141176, even a system which can activate a certain processing program when electronic slips or forms meet a certain condition cannot consistently design a series of order which includes intermingled processing by the system and manual filling, such as transferring the processed slip or form after the completion of processing by electronic mail to another worker. And, the Brownie system discloses a method of describing the flow of group work, but the description of the flow cannot be directly used by the development assisting system as a result of designing.

(3) Each worker in a series of works of the office automation system is merely given a fixed role based on the structure such as "assistant manager" and "manager". Therefore, when the groupware is designed using a title name such as "inspector" and "approver" relating to each step of a series of works rather than the structure, a developing method which determines which worker is given which role afterward cannot be employed.

(4) A subject series of works is limited to works which are gradually conducted by a plurality of workers laying stress on editing of documents such as entering in slips with a computer. For example, a meeting which does not use a computer or a series of works having a meeting using a computer in it such as an online realtime meeting system is not subjected to development.

(5) A series of works in which a plurality of software modules dynamically adjust mutual autonomic targets to automatically find an optimum solution can not be subjected.

(6) All workers are restricted to use the same type of computer, to use the same network, and to use the same editing program. And, the construction of a flexible system reflecting a preference of workers and a private difference of work environment cannot be supported.

(7) Designing of a worker or software object which starts the next operation after receiving a plurality of electronic mails cannot be made.

(8) A pattern which is frequently used in connection of the transferring order of electronic mail cannot be registered for reuse.

SUMMARY OF THE INVENTION

An object of this invention is to provide a groupware development assisting system which excels in convenience of the assistance system and variety of a transferring form that the assisting system can operate, saves labor extensively in developing groupware, can enhance developing efficiency, specifically enables a developer who does not have a specialized knowledge on an exclusive language to easily develop the groupware using electronic mail and to set freely the electronic mail transferring order between a worker and a processing program (object), and can consistently design a series of procedure having the entry by manual and the processing by the system intermingled.

A second object of this invention is to provide a groupware development assisting system which can design groupware using a name of a role relating to each step of a series of works, and can have a developing method which can determine afterward which worker specifically gets which role.

A third object of this invention is to provide a groupware development assisting system which can generate groupware which automatically generates and gives and receives electronic mail showing the completion of work.

A fourth object of this invention is to provide a groupware development assisting system which can assist the development of groupware supporting a series of works with a meeting among it, and particularly can use an online realtime meeting system.

A fifth object of this invention is to provide a groupware development assisting system in which a plurality of software modules dynamically adjust mutual autonomic targets to automatically find an optimum solution, using a so-called multi-agent system.

A sixth object of this invention is to provide a groupware development assisting system which can support the construction of a flexible system reflecting a preference of workers and work environment.

A seventh object of this invention is to provide a groupware development assisting system which can define a transferring order to start the next operation after receiving a plurality of electronic mails.

An eighth object of this invention is to provide a groupware development assisting system which previously defines a pattern which is frequently used in connection of the transferring order of electronic mail, and can reuse it to efficiently develop groupware.

According to one aspect of the invention, a groupware development assisting system for accomplishing the above object of this invention comprises:

a format definition means for visually defining a format of said electronic mail given or received among said nodes and outputting the defined content as format definition information, an object definition means for defining the operation condition information of a software object forming one of said nodes inputting or outputting said electronic mail and outputting as object definition information, a transferring order definition means for visually designating a transferring route showing the delivery and receipt of said electronic mail among said plurality of nodes and a format of said electronic mail given or received by said transferring route, and outputting as transferring order definition information, and a generation means for generating first electronic mail utilization environment definition information indicating the transferring operation of said electronic mail and the editing operation of said electronic mail in said transferring route relating to a node corresponding to a worker who is a component unit of said nodes based on said format definition information, said object definition information and said transferring order definition information, and generating a processing program code required to execute individual operation of said software object and second electronic mail utilization environment definition information indicating the transferring operation of said electronic mail in said transferring route relating to said software object based on said format definition information, said object definition information and said transferring order definition information.

In the preferred construction, said generation means, when a meeting pseudo object node expressing a meeting by a plurality of workers with said electronic mail as at least input or output as one of said software object nodes is described by said transferring order definition means, delivers said electronic mail which is inputted to said meeting pseudo object node as a meeting material to the nodes corresponding to workers attending said meeting, and generates electronic mail utilization environment definition information indicating to deliver said electronic mail in a format of minutes to the worker nodes previously designated.

Also, said meeting pseudo object is an online realtime meeting system communicating in realtime through an intercomputer network.

Also, said generation means, when said software object node having a plurality of electronic mail inputs by said transferring order definition means, generates sixth electronic mail utilization environment definition information which indicates to start the operation of said software object after waiting the completion of a plurality of electronic mail inputs as said groupware of said software object node having said plurality of electronic mail inputs.

Also, said transferring order definition means has a reutilization means which refers to a pattern of transferring order previously registered and reuses.

According to a further aspect of the invention, a groupware development assisting system for assisting effective execution of a series of works by giving or receiving electronic mail among a plurality of nodes, comprises:

a format definition means for visually defining a format of said electronic mail given or received among said nodes and outputting the defined content as format definition information, an object definition means for defining the operation condition information of a software object forming one of said nodes inputting or outputting said electronic mail and outputting as object definition information, a transferring order definition means for visually designating a transferring route expressed in a role name given with the delivery and receipt of said electronic mail among said plurality of nodes corresponded to said plurality of nodes and a format of said electronic mail given or received among said nodes in said transferring route, and outputting as transferring order definition information, a role corresponding definition means for defining the corresponding relation between said role name given to said node and the actual name of a worker in said node, and outputting as role corresponding definition, and a generation means for generating first electronic mail utilization environment definition information indicating the transferring operation of said electronic mail and the editing operation of said electronic mail relating to a node corresponding to a worker who is a component unit of said nodes in said transferring route based on said format definition information, said object definition information, said transferring order definition information and said role corresponding definition, and generating a processing program code required to execute individual operation of said software object and second electronic mail utilization environment definition information indicating the transferring operation of said electronic mail relating to said software object node based on said format definition information, said object definition information, said transferring order definition information and said role corresponding definition.

According to another aspect of the invention, a groupware development assisting system for assisting effective execution of a series of works by giving or receiving electronic mail among a plurality of nodes, comprises:

a format definition means for visually defining a format of said electronic mail given or received among said nodes and outputting the defined content as format definition information, an object definition means for defining the operation condition information of a software object forming one of said nodes inputting or outputting said electronic mail and outputting as object definition information, a transferring order definition means for visually designating a transferring route showing the delivery and receipt of said electronic mail among said plurality of nodes and a format of said electronic mail given or received by said transferring route, and outputting as transferring order definition information, and a generation means for generating first electronic mail utilization environment definition information indicating the transferring operation of said electronic mail and the editing operation of said electronic mail in said transferring route relating to a node corresponding to a worker who is a component unit of said nodes based on said format definition information, said object definition information and said transferring order definition information, and generating a processing program code required to execute individual operation of said software object and second electronic mail utilization environment definition information indicating the transferring operation of said electronic mail in said transferring route relating to said software object based on said format definition information, said object definition information and said transferring order definition information, said generation means, when a mutual relation meaning cooperation among said plurality of software object nodes is defined by said transferring order definition means, generating a processing program code for said software object described to execute multi-agent processing for automatically obtaining an optimum solution while dynamically adjusting a self-target of said software object node having a mutual relation indicating said cooperation.

According to another aspect of the invention, a groupware development assisting system for assisting effective execution of a series of works by giving or receiving electronic mail among a plurality of nodes, comprises:

a format definition means for visually defining a format of said electronic mail given or received among said nodes and outputting the defined content as format definition information, an object definition means for defining the operation condition information of a software object forming one of said nodes inputting or outputting said electronic mail and outputting as object definition information, a transferring order definition means for visually designating a transferring route showing the delivery and receipt of said electronic mail among said plurality of nodes and a format of said electronic mail given or received by said transferring route, and outputting as transferring order definition information, a generation means for generating first electronic mail utilization environment definition information indicating the transferring operation of said electronic mail and the editing operation of said electronic mail in said transferring route relating to a node corresponding to a worker who is a component unit of said nodes based on said format definition information, said object definition information and said transferring order definition information, and generating a processing program code required to execute individual operation of said software object and second electronic mail utilization environment definition information indicating the transferring operation of said electronic mail in said transferring route relating to said software object based on said format definition information, said object definition information and said transferring order definition information, a working environment definition means for defining work environments including individual editing program and electronic mail utilization environment used by said worker corresponding node and types of individual computer used as said worker corresponding node and network to which said worker corresponding node belongs, said generation means generating electronic mail utilization environment definition information for indicating to execute the transferring operation of said electronic mail and the editing operation of said electronic mail under said working environment designated by said working environment definition information as said groupware of said worker corresponding node.

According to another aspect of the invention, a groupware development assisting system for assisting effective execution of a series of works by giving or receiving electronic mail among a plurality of nodes, comprises:

a format definition means for visually defining a format of said electronic mail given or received among said nodes and outputting the defined content as format definition information, an object definition means for defining the operation condition information of a software object forming one of said nodes inputting or outputting said electronic mail and outputting as object definition information, a transferring order definition means for visually designating a transferring route expressed in a role name given with the delivery and receipt of said electronic mail among said plurality of nodes corresponded to said plurality of nodes and a format of said electronic mail given or received among said nodes in said transferring route, and outputting as transferring order definition information, a role corresponding definition means for defining the corresponding relation between said role name given to said node and the actual name of a worker in said node, and outputting as role corresponding definition, and a generation means for generating first electronic mail utilization environment definition information indicating the transferring operation of said electronic mail and the editing operation of said electronic mail relating to a node corresponding to a worker who is a component unit of said nodes in said transferring route based on said format definition information, said object definition information, said transferring order definition information and said role corresponding definition, and generates a processing program code required to execute individual operation of said software object and second electronic mail utilization environment definition information indicating the transferring operation of said electronic mail relating to said software object node based on said format definition information, said object definition information, said transferring order definition information and said role corresponding definition, said generation means, when a mutual relation meaning cooperation among said plurality of software object nodes is defined by said transferring order definition means, generating a processing program code for said software object described to execute multi-agent processing for automatically obtaining an optimum solution while dynamically adjusting a self-target of said software object node having a mutual relation indicating said cooperation.

According to another aspect of the invention, a groupware development assisting system for assisting effective execution of a series of works by giving or receiving electronic mail among a plurality of nodes, comprising:

a format definition means for visually defining a format of said electronic mail given or received among said nodes, and outputting the defined content as format definition information, an object definition means for defining the operation condition information of a software object forming one of said nodes inputting or outputting said electronic mail, and outputting as object definition information, a transferring order definition means for visually designating a transferring route showing the delivery and receipt of said electronic mail among said plurality of nodes and a format of said electronic mail given or received by said transferring route, and outputting as transferring order definition information, a generation means for generating first electronic mail utilization environment definition information indicating the transferring operation of said electronic mail and the editing operation of said electronic mail in said transferring route relating to a node corresponding to a worker who is a component unit of said nodes based on said format definition information, said object definition information and said transferring order definition information, and generating a processing program code required to execute individual operation of said software object and second electronic mail utilization environment definition information indicating the transferring operation of said electronic mail in said transferring route relating to said software object based on said format definition information, said object definition information and said transferring order definition information, and a working environment definition means for defining work environments including individual editing program and electronic mail utilization environment used by said worker corresponding node and types of individual computer used as said worker corresponding node and network to which said worker corresponding node belongs, said generation means generating electronic mail utilization environment definition information for indicating to execute the transferring operation of said electronic mail and the editing operation of said electronic mail under said working environment designated by said working environment definition information as said groupware of said worker corresponding node.

According to another aspect of the invention, a groupware utilization device comprises:

an electronic mail sending and receiving means for sending or receiving electronic mail with respect to a computer network, an environment interpreting means for reading and interpreting an electronic mail utilization definition file defining a corresponding relation of the condition and operation regarding said electronic mail, and a control means for executing an operation corresponding to said condition when said condition is formed in said electronic mail after receiving said corresponding relation from said environment interpreting means and receiving the electronic mail from said electronic mail receiving means, said electronic mail utilization environment definition file further holding an identification name of an electronic mail receiving terminal and definition information of a type of electronic mail editing software, and said environment interpreting means interpreting an identification name of said terminal and the definition of a type of said electronic mail editing software, and said control means connecting to said terminal according to the definition of an identification name of said terminal given from said environment interpreting means and directing the selection of said electronic mail editing software to said terminal according to the definition of a type of said electronic mail editing software given from said environment interpreting means.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 4 is a view showing an example of describing format definition given from the format definition means to the generation means of FIG. 1.

FIG. 5 is a view showing an example defining an object by the object definition means of FIG. 1.

FIG. 11 is a view showing one example of the transferring order definition given from the transferring order definition means to the generation means when defining the transferring order according to the chart of FIG. 6.

FIG. 13 is an example of generation of the electronic mail utilization environment definition information referred to by the groupware utilization software used by the worker in the example of FIG. 6.

FIG. 14 is a screen structural view showing one example of the screen which the groupware utilization software shows to the worker.

FIG. 16 is a view showing one example of the electronic mail utilization environment definition information generated with respect to the software object of FIG. 6.

FIG. 17 is a view showing one example of the processing program generated with respect to the software object (QuestionRecorder) of FIG. 6.

FIG. 19 is a chart showing an example of transferring order defined using the transferring order definition means of FIG. 18.

FIG. 20 is a view showing one example of a corresponding table of the role name and the name defined using the role corresponding definition means of FIG. 18.

FIG. 22 is a view showing one example of the electronic mail given or received according to the arc shown in the chart of FIG. 21.

FIG. 24 is a view showing an example that the meeting pseudo object is defined using the object definition means.

FIG. 25 is a view showing one example of the code generated with respect to the electronic mail utilization environment definition of the meeting pseudo object (StrategicMeeting) of FIG. 23.

FIG. 26 is a view showing one example of the code of the electronic mail utilization environment definition generated by the groupware utilization software used by the secretary.

FIG. 27 is a view showing one example of the object definition description using the online realtime meeting system as the meeting pseudo object of FIG. 23 in the groupware development assisting system of the fifth embodiment.

FIG. 28 is a view showing one example of the code generated with respect to the electronic mail utilization environment definition of the meeting pseudo object of FIG. 23 when using the online realtime meeting system.

FIG. 29 is a view showing one example of the code of the electronic mail utilization environment definition generated by the groupware utilization software used by the chairperson when using the online realtime meeting system.

FIG. 30 is a view showing one example of the code of the electronic mail utilization environment definition generated by the groupware utilization software used by the secretary when using the online realtime meeting system.

FIG. 33 is a view showing one example of the object definition defined by using the object definition means regarding the software object (BudgetManager) of FIG. 31.

FIG. 34 is a view showing one example of the code which is generated as the processing program of the software object by the generation means from the object definition of FIG. 33.

FIG. 38 is a view showing one example of the electronic mail utilization environment definition outputted from the generation means based on the worker environment definition of FIG. 36 and the transferring order definition of FIG. 6.

FIG. 41 is a view showing one example of the transferring order definition shown by the chart of FIG. 39 and the electronic mail utilization environment definition of the software object which is generated by the generation means based on the object definition of the software object shown in FIG. 40.

FIG. 49 is a view showing an example of generating the node data table regarding the nodes of FIG. 48.

FIG. 50 is a view showing an example of generating the node data table regarding the person in charge of examination when expanding the transferring order definition shown in FIG. 42 and FIG. 44.

FIG. 51 is a view showing an example of the node data table generated regarding the nodes of FIG. 31.

DESCRIPTION OF THE PREFERRED EMBODIMENT

Figure 1:
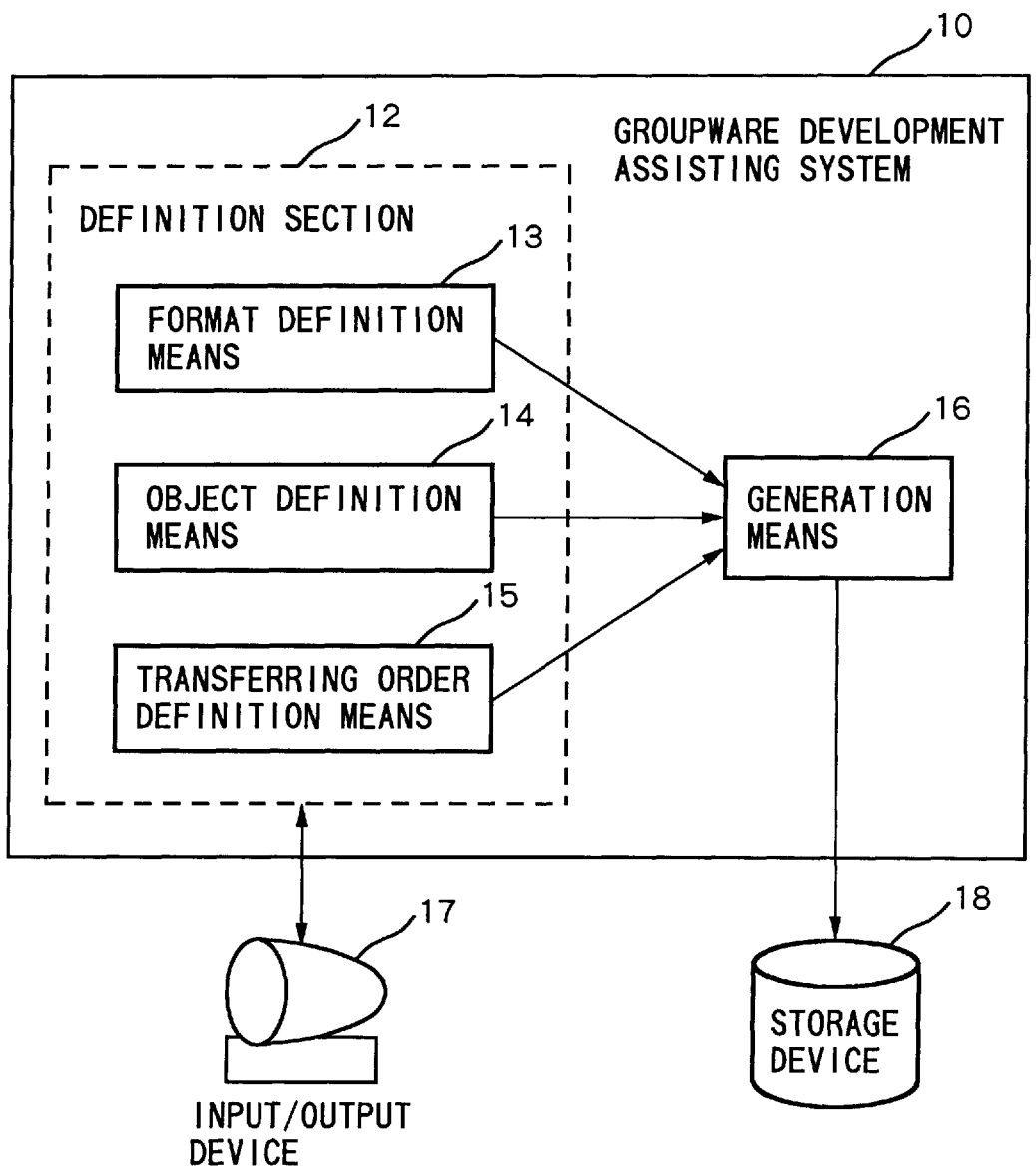
FIG. 1 is a block diagram showing the structure of the groupware development assisting system according to a first embodiment of this invention.

Now, preferred embodiments of this invention will be described with reference to the drawings. FIG. 1 is a block diagram showing the structure of the groupware development assisting system according to a first embodiment of this invention. A groupware development assisting system 10 consists of a definition section 12 and a generation means 16.

The definition section 12 is provided with a format definition means 13, an object definition means 14, and a transferring order definition means 15. The definition section 12 is connected to an input/output device 17 (e.g., display, keyboard, mouse). A developer using this groupware development assisting system 10 can make a required definition by operating three definition means included in the definition section 12 by the input/output device 17. Also, the generation means 16 is connected to a storage device 18 for storing the generated information.

The format definition means 13 defines a format of electronic mail and sends format definition information to the generation means 16. The object definition means 14 defines a software object (equivalent to a software module) which at least inputs or outputs electronic mail, and sends the defined information to the generation means 16. The transferring order definition means 15 defines a format of electronic mail used for each delivery and receipt work, and a transferring order of electronic mail which is given or received among a plurality of workers or a plurality of software objects, which become a node of a target system (e.g., office automation system) to be developed, and sends the defined information to the generation means 16. The generation means 16 receives the defined information from the format definition means 13, the object definition means 14, and the transferring order definition means 15, generates a code for determining the operation of each software object and electronic mail utilization environment information regarding each worker and each software object in a target system, and stores them in the storage device 18.

Figure 2:
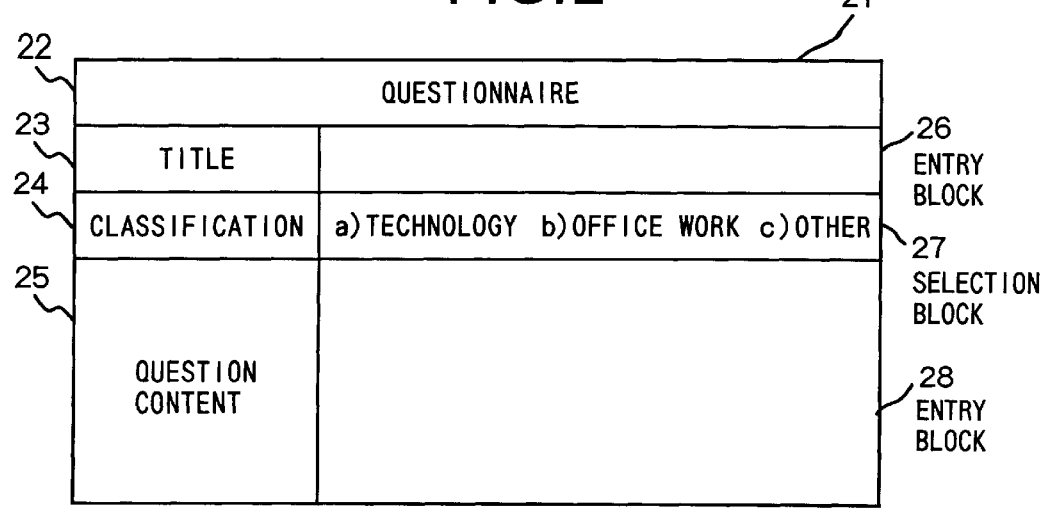
FIG. 2 is a view showing a format example which is defined by the format definition means of FIG. 1.

The aforementioned format definition means 13 will be described with reference to FIG. 2 through FIG. 4. FIG. 2 is a structural view showing a format example of electronic mail which is defined by the format definition means 13 on the groupware development assisting system 10 shown in FIG. 1.

FIG. 2 defines a format of questionnaire which is one of electronic mails. A questionnaire 21 has 7 fields (label 22, label 23, label 24, label 25, entry block 26, selection block 27, entry block 28) within an outer frame. Among them, the worker can enter characters in the entry block 26 and the entry block 28. And, as to the selection block 27, the worker can select a selector contained in the selection block 27.

Figure 3:
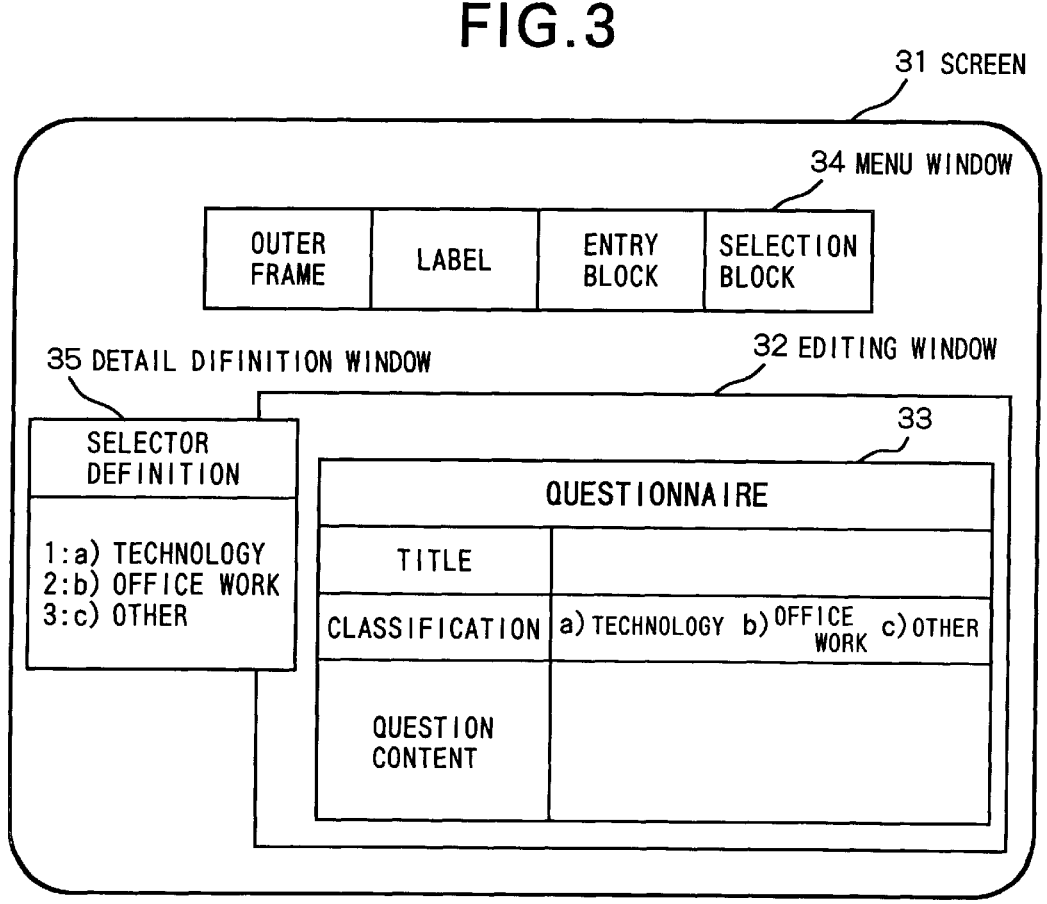
FIG. 3 is a diagram showing a screen example when using the format definition means of FIG. 1.

FIG. 3 is a diagram showing a screen display example of defining electronic mail by operating the format definition means 13 through the input/output device 17. A display screen 31 of the input/output device 17 displays a multi-window system. An editing window 32 functions as an editor to edit a format of electronic mail. In this case, a state editing the questionnaire 21 shown in FIG. 2 is shown. The editing window 32 shows an edited result 33 of the questionnaire 21 as actually seen. On a menu window 34, menu items (outer frame, label, entry block, selection block) for selectively inputting each field and the outer frame which are elements to form the format when defining and preparing the format shown in the edited result 33 on the editing window 32 are arranged. Specifically, by selecting a certain menu item on the menu window 34 using a mouse or the like, the selected window is inputted and arranged on the editing window 32.

An example of editing method will be described. First, the developer clicks the mouse to select one item from four menu items including "outer frame", "label", "entry block", and "selection block" (first click). Then, the developer clicks the mouse in the editing window 32 (second click). As a result, the field or outer frame selected by the first click is arranged at a position of the second click.

Then, the developer drags the mouse from an optional corner of the arranged field (square) to deform the field, and repeats the required deformation to prepare a desired format and the same form. According to the above procedure, the outer frame and all fields can be arranged. But, as to the selection block, it is necessary to further define the selectors one by one. In this case, when the mouse is double-clicked on the selection block, a detailed definition window 35 as shown is popped up. The developer can define a selector in the detailed definition window 35. A character string in the label block is similarly defined using the detailed definition window. Specifically, when the mouse is double clicked on the label block, a label definition window for inputting the character string of the label is popped up.

FIG. 4 shows an example of describing format definition information given from the format definition means 13 to the generation means 16. This format definition information shows the questionnaire of FIG. 2. The line number is given for convenience of description. First line of format definition information 40 defines the width and height of the outer frame. The second, eighth, 14th, 19th, 25th, 30th and 36th lines indicate the start of definition of each field, and a term (Label 0, TE 0, etc.) immediately behind "name" on each line is a name of field. The name of each field is automatically added. The seventh, 13th, 18th, 24th, 29th, 35th and 41st lines indicate the termination of field definition. The third, ninth, 15th, 20th, 26th, 31st and 37th lines indicate a type of field. Among the types of fields, "LabelType" is a label column, "TextType" is an entry column, and "SelectionType" is a selection column.

The fourth, tenth, 16th, 21st, 27th, 32nd and 38th lines indicate the left top corner of each field by a relative coordinate value from the left top corner of the outer frame. The fifth, eleventh, 22nd and 33rd lines define a character string added to a label type field. The thirty ninth line determines a selector of a selection type field. The sixth, twelfth, seventeenth, 23rd, 28th, 34th and 40th lines are size values showing the width and height of each field. And, a reason that the width of the label field added with a character string of "questionnaire" for example is 328 as indicated on the 6th line and does not agree with the width 330 of the outer frame indicated on the first line is because the width of ruled lines on both sides of the field is deducted.

An embodiment of the simplest format definition means has been described, and a higher functional format definition means may have the following functions added.

1. Function to add a picture description block, voice recording block, numeric entering block, date entering block or the like as a type of field.

2. In case of the selection block, a function to make the definition of the maximum and minimum values of the number of selectors which can be selected at a time.

3. Function capable of defining a pattern (broken line, solid line, etc.) and width of ruled line drawn between fields.

4. In case of the numeric entering column, a function capable of defining the maximum and minimum values of numerals which can be entered.

Now, the object definition means 14 will be described with reference to FIG. 5.

The object definition means 14 is given to the developer in a form of text editor capable of describing the object definition information. FIG. 5 shows an example defining a software object. But, the line number is added to FIG. 5 for convenience of description.

The first line defines the name "QuestionRecorder" of the software object. The second line indicates that this software object receives "questionnaire" as the input by electronic mail. In the definition, "m" is a pointer to declare to refer to "questionnaire". The fourth to twelfth lines define the processing by the software program executed by this software object.

The fifth to seventh lines define the processing when the content of the selector selected in the selection block 27 (in FIG. 4, definition is made in the name of "menu 0" on the 36th to 41st lines) of the questionnaire in the format of FIG. 2 is "a) technology". First, on the fifth line, it is judged whether the selected content of the selection block 27 is "a) technology" or not, and if the selected content of the selection block 27 is "a) technology", the description content of the entry block 26 (defined in the name of "TE0" on the 14th through 18th lines in FIG. 4) in FIG. 2 is registered in the exterior data base in the name of "technology question record" on the 6th line. In this case, the registration to the data base "technology question record" can be realized in a function of "add_db".

The ninth to twelfth lines define the processing when the selected content of the selection column 27 is "b) office work" in the same way as the fifth to seventh lines. The fourteenth line indicates that the output of this software object is the form of "questionnaire" in the same way as the input and referred to by "m" in the definition. The fifteenth line indicates the termination of definition. of the software object "QuestionRecorder". The object definition means 14 gives the object definition information of FIG. 5 to the generation means 16 as it is.

To make the description simple, the name showing the selection block 27 of "menu 0" used on for example the fifth line of FIG. 5 is a name automatically generated by the format definition means 13. Therefore, in this case, it is necessary to investigate the name automatically generated by the format definition means 13 so that the developer makes the object definition by the object definition means 14. To remedy the trouble of the above investigation, a function with which the developer can define the name of the block in the format definition means 13 may be provided.

Figure 6:
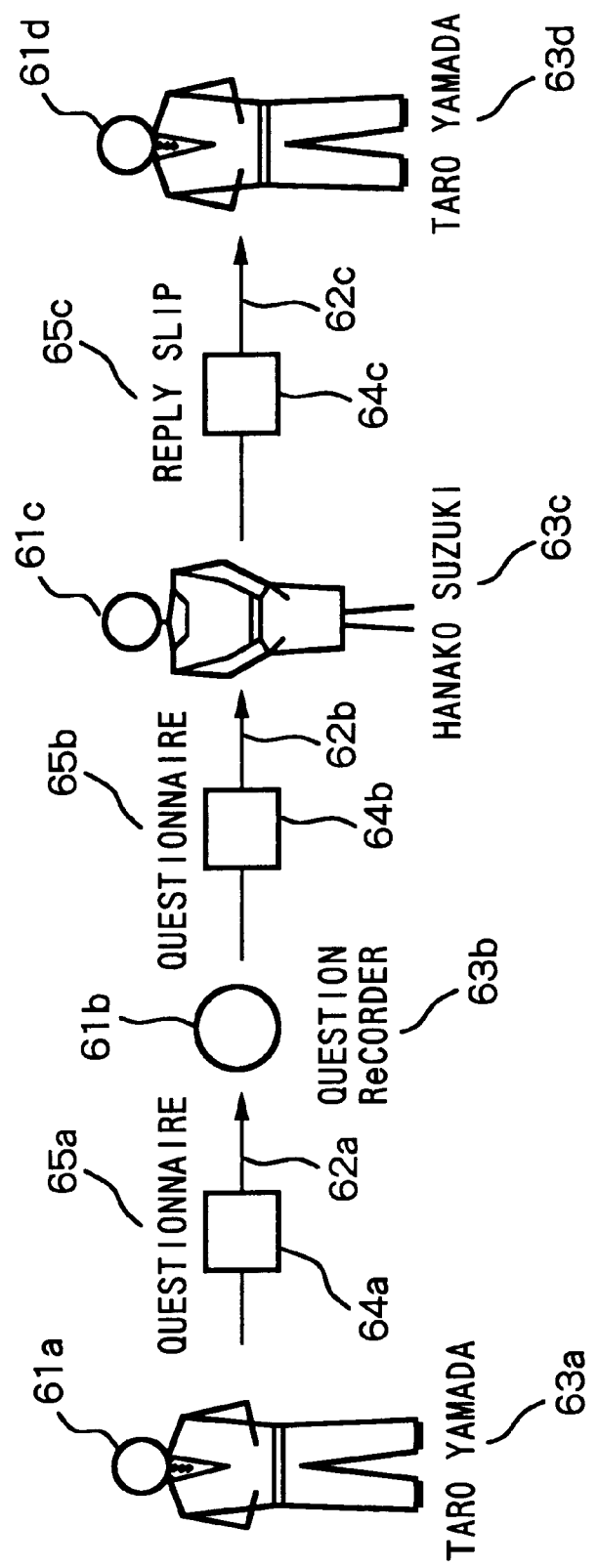
FIG. 6 is a chart showing an example of transferring order to define using the transferring order definition means of FIG. 1.

The transferring order definition means 15 will be described with reference to FIG. 6 through FIG. 11. FIG. 6 is a chart showing an example that the developer defines a transferring order by the transferring order definition means 15. This chart consists of nodes and arcs connecting the nodes. In the drawing, 61a, 61b, 61c and 61d represent nodes, and 62a, 62b and 62c arcs.

Among all nodes, the nodes 61a, 61c and 61d corresponding to workers are represented by a worker icon, and the node 61b corresponding to the software object is represented by a circle. Reference numerals 63a, 63b, 63c and 63d are labels showing the name of each node. The labels 63a, 63c and 63d are given the names of workers, and the label 63b is given the name (name of "QuestionRecorder" defined in FIG. 5) of the software object.

The arcs 62a, 62b and 62c represent the delivery and receipt of electronic mail between the nodes. Squares 64a, 64b and 64c represent that the electronic mail given or received by the arcs 62a, 62b and 62c has a format. And the name of the format is designated by labels 65a, 65b and 65c. The format "questionnaire" added to the labels 65a and 65b is defined in FIG. 2. The format "reply slip" (definition content omitted) designated by the label 65c is a format to reply to a question using the "questionnaire" defined in FIG. 2 by electronic mail.

The chart of FIG. 6 means the following transferring order.

1. The worker "Taro Yamada" uses a format "questionnaire" to prepare questions and sends to the software object "QuestionRecorder" as electronic mail.

2. The software object "QuestionRecorder" registers the described content of questions in the database "technology question record" according to the definition of FIG. 5 and transfers the questionnaire to the worker "Hanako Suzuki".

3. The worker "Hanako Suzuki" prepares a reply to the questions using a format "reply slip" and sends to the worker "Taro Yamada" as electronic mail.

Figure 7:
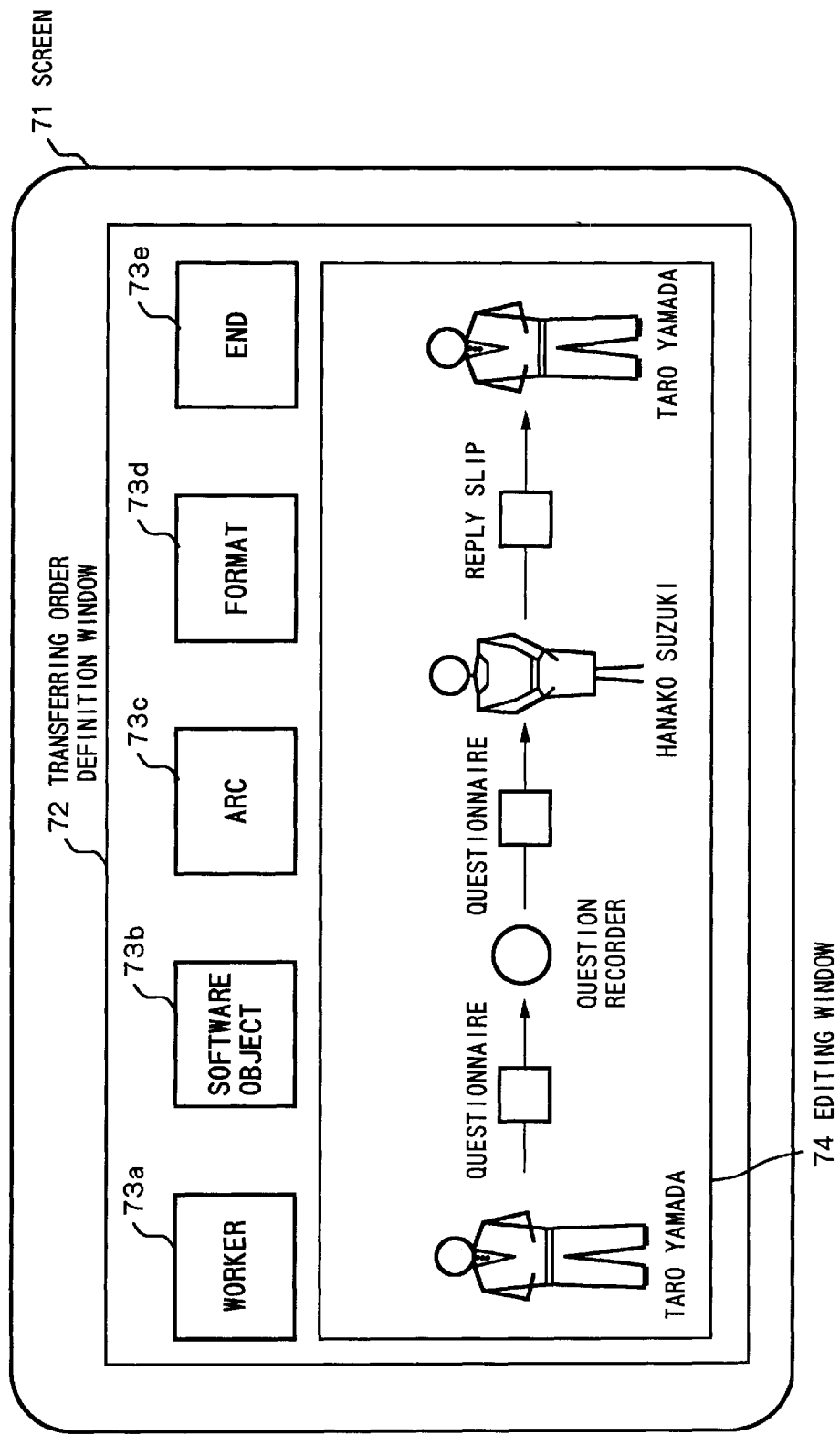
FIG. 7 is a screen diagram showing one example of the screen when using the transferring order definition means through the input/output device of FIG. 1.
Figure 8:
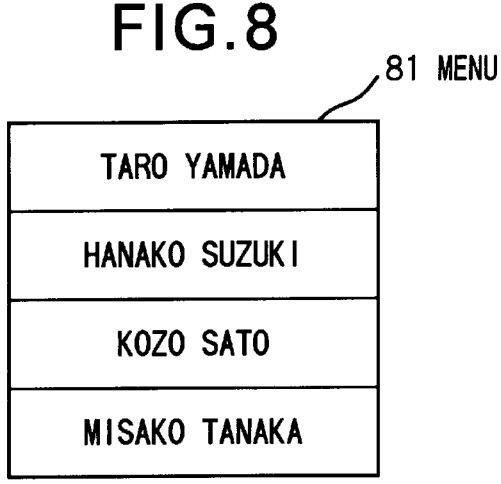
FIG. 8 is a view showing a menu which is displayed in the chart editing by the transferring order definition means.
Figure 9:
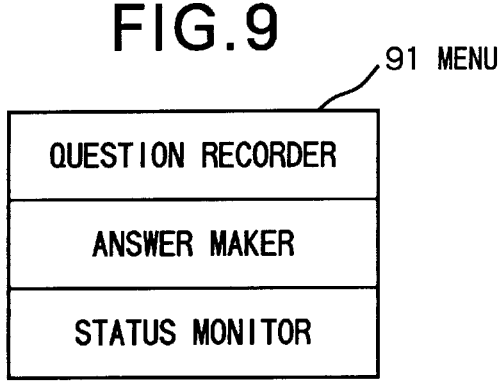
FIG. 9 is a view showing a menu which is displayed in the chart editing by the transferring order definition means.
Figure 10:
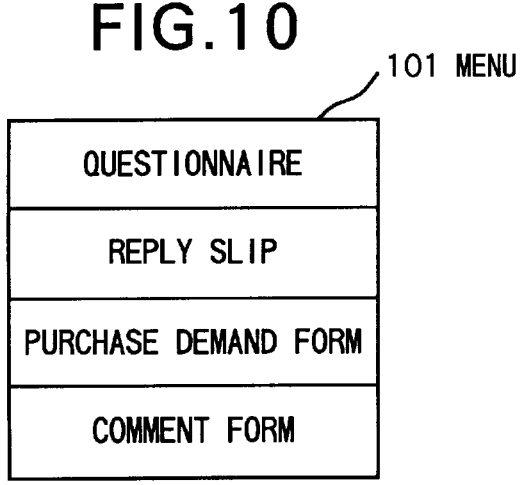
FIG. 10 is a view showing a menu which is displayed in the chart editing by the transferring order definition means.

FIG. 7 is a diagram showing one example of the screen when the input/output device 17 is used to define the transferring order by the transferring order definition means 15. A screen 71 displays by a multi-window system. The screen 71 shows a transferring order definition window 72. The transferring order definition window 72 is a work window for using the transferring order definition means 15. The transferring order definition window 72 includes buttons 73a, 73b, 73c, 73d and 73e, and an editing window 74. FIG. 7 shows that editing has completed, and the chart shown in FIG. 6 has been completed in the editing window 74. As shown in the drawing, the editing window 74 is a window for editing the chart.

One example of the editing method of a chart (transferring order definition) will be described with reference to FIG. 7. To edit the chart, the buttons 73a, 73b, 73c and 73d are used.

1. When the mouse is clicked on the button 73a, a list of names of workers pre-registered is indicated in a menu style as shown in a menu 81 of FIG. 8. The developer selects one worker from the menu 81, and clicks the mouse on one point in the editing window 74, so that an icon indicating the worker can be arranged at that point.

2. When the mouse is clicked on the button 73b, a list of names of the software objects defined by the object definition means 14 is indicated in a menu style as shown in a menu 91 of FIG. 9. The developer selects one software object from the menu 91, and clicks the mouse on one point in the editing window 74, so that a circle showing the software object can be arranged at that point.

3. As described above, all nodes (workers or software objects) are arranged, and the developer defines arcs. To define the arcs, the mouse is clicked on the button 73c, then the mouse is clicked on the start node of the arc and moved with the mouse button depressed to the end node of the arc, and the mouse button is released. Thus, the arc is defined.

4. Lastly, the developer designates a format of electronic mail which is given or received between the nodes. To designate the format, the mouse is clicked on the button 73d. As a result, a list of formats of electronic mail defined by the format definition means 13 is indicated in a menu style as shown in a menu 101 of FIG. 10. The developer clicks the mouse to select a desired format from the menu 101, and clicks the mouse to select one of arcs defined in the editing window 74. Then, a format corresponding to the arc indicating the delivery and receipt of electronic mail is designated in the format selected from the menu 101. When the editing of the chart completes by the above operation, the developer lastly clicks the mouse on the button 73e to terminate the transferring order definition. And, such a chart can be easily structured by using the graph structure editor part contained in for example a chart editing software "Canae" (Trademark of NEC).

FIG. 11 is a diagram showing an example of the content of transferring order definition information sent from the transferring order definition means 15 to the generation means 16 when the transferring order according to the chart of FIG. 6 is defined by the transferring order definition means 15. But, the line number is added for convenience of description.

The first to third lines are descriptions respectively declaring the worker, software object and format used for the transferring order definition. The fifth to eighth lines define four nodes in the chart in order. For example, the fifth line indicates that "node1" is a worker node "Taro Yamada". The tenth to twelfth lines define the arcs. For example, the tenth line indicates that there is an arc "arc1" advancing from "node1" to "node2". The fourteenth to sixteenth lines define formats used for the delivery and receipt of electronic mail indicated by each arc. For example, the fourteenth line indicates that the delivery and receipt of electronic mail indicated by "arc1" is the electronic mail of a format "questionnaire".

Now, the operation of the generation means 16 will be described with reference to FIG. 12 through FIG. 17. The generation means 16 receives the format definition information of FIG. 4 from the format definition means 13, the object definition information of FIG. 5 from the object definition means 14, and the transferring definition information of FIG. 11 from the transferring order definition means 5, respectively.

Since the above three definition information are described in a format processable on a computer, the generation means 16 can easily judge the transferring order of electronic mail between each worker and the software object, and the format used in the delivery and receipt of electronic mail in each transfer of electronic mail. Then, the generation means 16 generates electronic mail utilization environment information regarding each worker appearing in the transferring order definition information of FIG. 11, and partially generates the electronic mail utilization environment information and source code regarding each software object. In this case, the processing by the generation means 16 of "Hanako Suzuki" (node 61c of FIG. 6) among the workers and a software object "QuestionRecorder" (node 61b of FIG. 8) is referred to for description.

Figure 12:
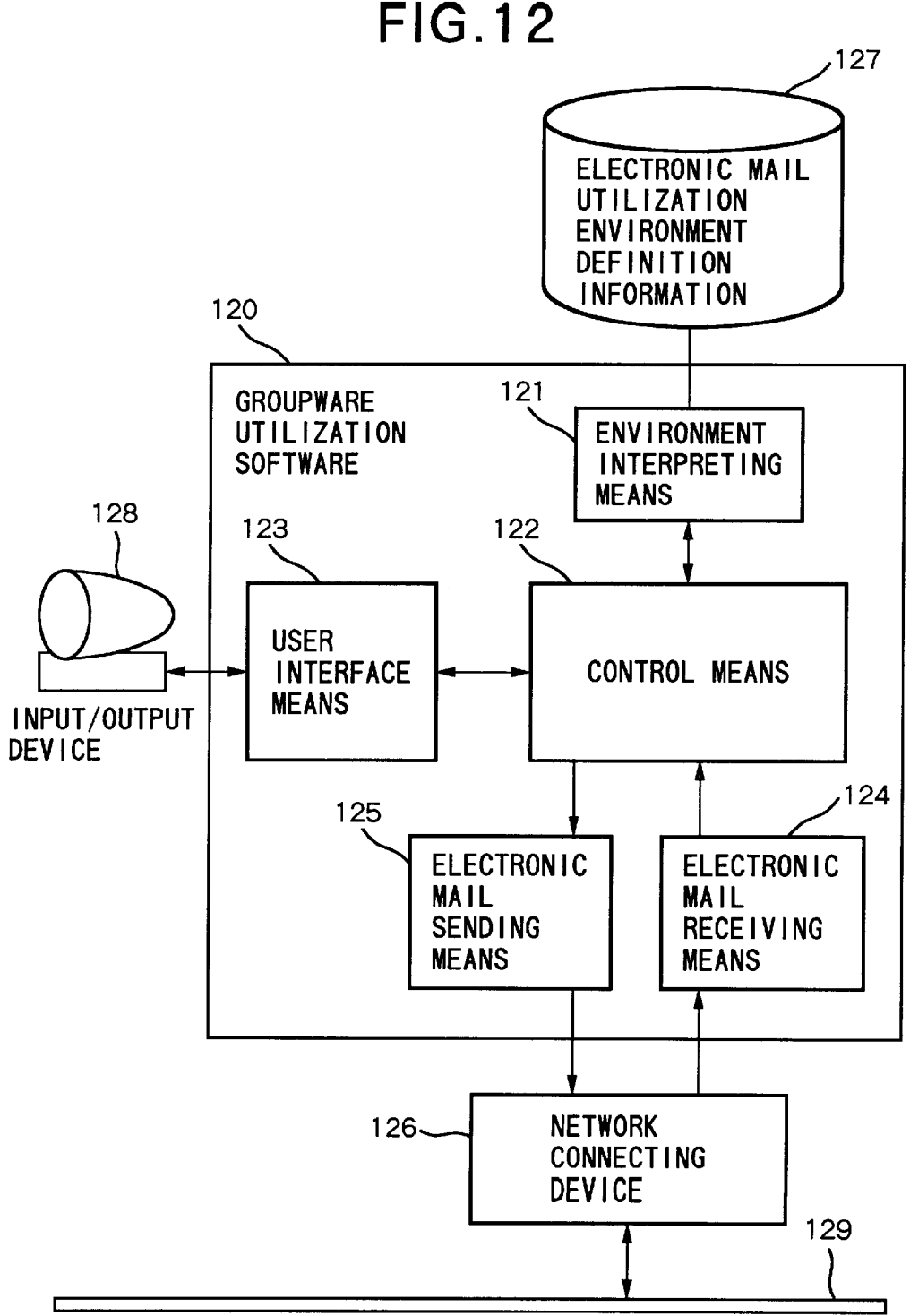
FIG. 12 is a block diagram showing a structural example of a worker node using guoupware developed by the groupware development assisting system.

An example of the worker "Hanako Suzuki" will be described with reference to FIG. 12 through FIG. 14. FIG. 12 is a block diagram showing a structural example of software which is used when each worker using the groupware developed by the groupware development assisting system 10 of this invention uses the groupware.

A groupware utilization software 120 is software which runs on a computer such as a workstation, and is available in one for each worker. The worker operates an input/output device 128 to use the groupware utilization software 120.

The groupware utilization software 120 consists of at least an environment interpreting means 121, a control means 122, a user interface means 123, an electronic mail receiving means 124, and an electronic mail sending means 125. The electronic mail receiving means 124 and the electronic mail sending means 125 are connected to a network bus 129 through a network connecting device 126, and allow the receipt and sending of each electronic mail with the groupware utilization software or software object used by another worker.

The user interface means 123 is connected to the input/output device 128 and collectively manages the input and output conducted with the worker. These input and output include the read/write of electronic mail, input of command to the control means 122 by the worker, and a message outputted from the control means 122 to the worker.

The control means 122 is activated when the electronic mail receiving means 124 receives electronic mail and when the user interface means 123 receives command from the worker, controls another means contained in the groupware utilization software 120, and sends a message to the worker through the user interface means 123, as required. When controlling them or outputting a message, the control means 122 refers to electronic mail utilization environment definition information 127 which is an external file through the environment interpreting means 121 and determines a plan of control.

As the groupware utilization software 120 is structured as described above, the operation of the groupware utilization software 120 is changed depending on the content of the electronic mail utilization environment definition information 127. Generation of the electronic mail utilization environment definition information 127 is a role of the generation means 16.

FIG. 13 is an example that the electronic mail utilization environment definition information 127 referred to by the groupware utilization software 120 used by the worker "Hanako Suzuki" in FIG. 6 is generated by the generation means 16. But, the line number is added for convenience of description.

The first and sixth lines indicate to execute when the following two conditions are met:

(1) a format of electronic mail receiving the operation of the second to fifth lines is a questionnaire, and (2) a sender of electronic mail receiving the operation of the second to fifth lines is software object "QuestionRecorder". In the drawing, "ReceivedMail" is a term indicating the received electronic mail. The second to fifth lines indicate the specific operation at that time. The second line indicates to show the received electronic mail to the worker, the third line indicates to prepare a new reply slip and to call it as "A", the fourth line indicates to let the worker to edit "A", and the fifth line indicates to send the edited "A" as electronic mail to "Taro Yamada".

FIG. 14 shows one example of the screen structure which the groupware utilization software 120 used by the worker "Hanako Suzuki" shows to the worker "Hanako Suzuki" when the electronic mail utilization environment information having the content of FIG. 13 is generated and used as the electronic mail utilization environment definition information 127 of FIG. 12.

The screen shows a question/reply window 141. The question/reply window 141 consists of a questionnaire presentation sub-window 143, a reply slip editing sub-window 144, and a work termination button 142. The worker "Hanako Suzuki" uses the reply slip editing sub-window 144 to edit a reply slip (editing environment is prepared according to the third and fourth lines of FIG. 13) to reply to the question (indicated according to the second line of FIG. 13) from the worker "Taro Yamada" presented on the questionnaire presentation sub-window 143. Lastly, clicking the mouse on the work termination button 142 is regarded as the termination of editing, and (according to the fifth line of FIG. 13) the reply slip is sent to the worker "Taro Yamada".

Figure 15:
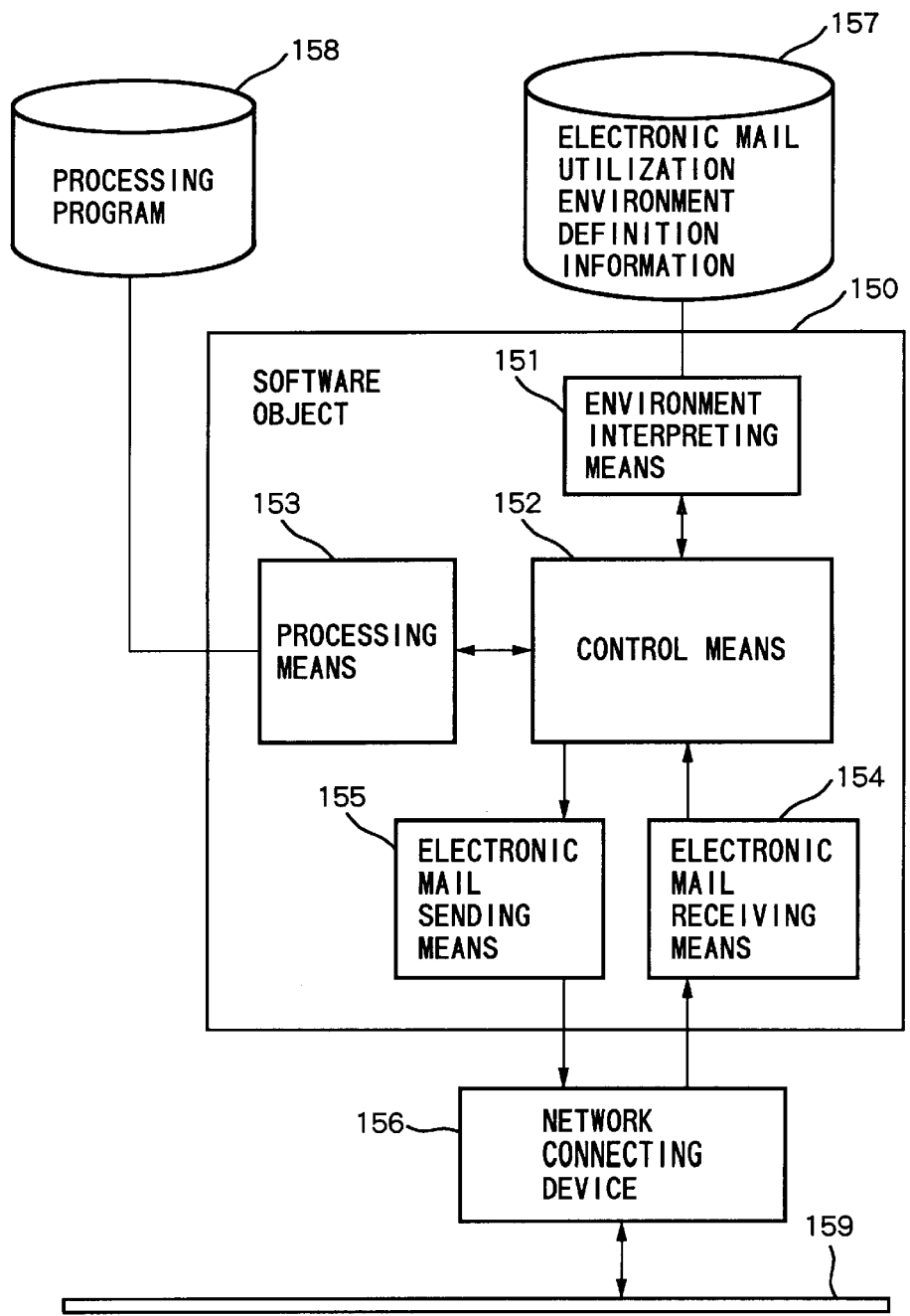
FIG. 15 is a block diagram showing a structural example of the software object using the groupware developed by the groupware development assisting system.

Now, an example of the software object "QuestionRecorder" will be described with reference to FIG. 15 through FIG. 17. FIG. 15 is a block diagram showing one example of the software object structuring the groupware developed by the groupware development assisting system 10 of this invention. A software object 150 is software which runs on a computer such as a workstation. The software object 150 consists of at least an electronic mail receiving means 154, an electronic mail sending means 155, a control means 152, a processing means 153, and an environment interpreting means 151.

The electronic mail receiving means 154 and the electronic mail sending means 155 are connected to a network bus 159 through a network connecting device 156, and allow the receipt and sending of each electronic mail with the groupware utilization software or another software object used by the worker. The control means 152 is activated when the electronic mail receiving means 154 receives electronic mail, when the processing means 153 completes processing, or when another event (when the electronic mail sending means 155 succeeds or fails to send, or when reaching a certain time when the software object 150 has a timer in it) occurs, controls another means contained in the software object 150, and requests the processing means 153 to process, as required.

And, the control means 152, when controlling them, refers to electronic mail utilization environment definition information 157 which is an external file through the environment interpreting means 151 and determines a plan of control. When requested by the control means 152 to process, the processing means 153 uses a single or plurality of processing program 158 which is externally accumulated as required to execute processing, and returns the processed result to the control means 152. The control means 152, when requesting the processing means 153 to process, sends the electronic mail received as required. And, the processing means 153, when returning the processed result to the control means 152, sends after adjusting the processed result to a form according to a certain format of the electronic mail which the software object 150 has to send next time, as required.

A method by which the processing means 153 uses the processing program 158 may be as follows.

1. The processing program 158 is available as a program which operates separately, and the processing means 153 calls the above program through the operating system and executes.

2. The processing program 158 is available as a part of program source codes and, when preparing the processing means 153, compiled including such source codes, and the processing program 158 includes the processing means 153 when executing.

3. The processing program 158 is available as a library when executing, and links such a library when preparing the processing means 153.

4. The processing program is actually available as data, and the processing means 153 refers to and interprets the processing program 158 when executing to process and executes the processing.

5. Intermingling of the methods 1 to 4 above.

Since the software object 150 is structured as described above, the operation of the software object 150 changes depending on the content of the electronic mail utilization environment definition information 157 and the content of the processing program 158. Generation of the electronic mail utilization environment definition information 157 and the processing program 158 is a role of the generation means 16.

FIG. 16 relates to an example of the software object "QuestionRecorder" and shows an example of the electronic mail utilization environment definition information 157 generated by the generation means 16. But, the line number is added to FIG. 16 for convenience of description. The first and fourth lines indicate that the operations of the second and third lines are executed when the following two conditions are met.

A format of the received electronic mail is a questionnaire.

A sender of the received electronic mail is "Taro Yamada".

In the drawing, "ReceivedMail" is a term indicating the received electronic mail. The second and third lines indicate the specific operation at that time. The second line indicates to call "processed proc_QuestionRecorder_1", then give "ReceivedMail", and call the result as "A". The third line indicates to send "A" as electronic mail to "Hanako Suzuki".

FIG. 17 relates to an example of the software object "QuestionRecorder" and shows an example of the processing program 158 generated by the generation means 16. But, the line number is added for convenience of description. Here, a method by which as the processing program 158, a function of C language is generated, and the function of C language generated when preparing the processing means 153 is compiled simultaneously to obtain the processing means 153 is adopted.

The first line declares by a pointer m that a format of the electronic mail which is given and received when called from the processing means 153 is data of a questionnaire type. The second to eighth lines correspond to the definition of the software object shown in FIG. 5. But, the pointer m referring to the questionnaire in FIG. 5 is the pointer m to data of a questionnaire type in FIG. 17.

The "strcmp" is a standard library function to, compare the character strings and returns "0" when the character strings agree. A function "add_db" shall be separately available. The ninth line indicates to return the questionnaire (indicated by the pointer m) to the processing means 153 as it is.

As described above, the generation means 16 generates the electronic mail utilization environment definition information 127 for the worker, and the electronic mail utilization environment definition information 157 and the processing program 158 for the software object. By these three generated data, the groupware utilization software 120 used by each worker and each software object 150 can transfer the electronic mail according to the transferring order defined by the transferring order definition means 15. And, each software object 150 can execute the processing defined by the object definition means 14 according to the intention of the developer.

Now, the groupware development assisting system, according to a second embodiment of this invention will be described. With the groupware development assisting system according to the first embodiment, as shown in the example described with reference to for example FIG. 2 through FIG. 17, a questioner is always "Taro Yamada" and a respondent is always limited to "Hanako Suzuki". The groupware development assisting system of the second embodiment remedies such drawbacks.

Figure 18:
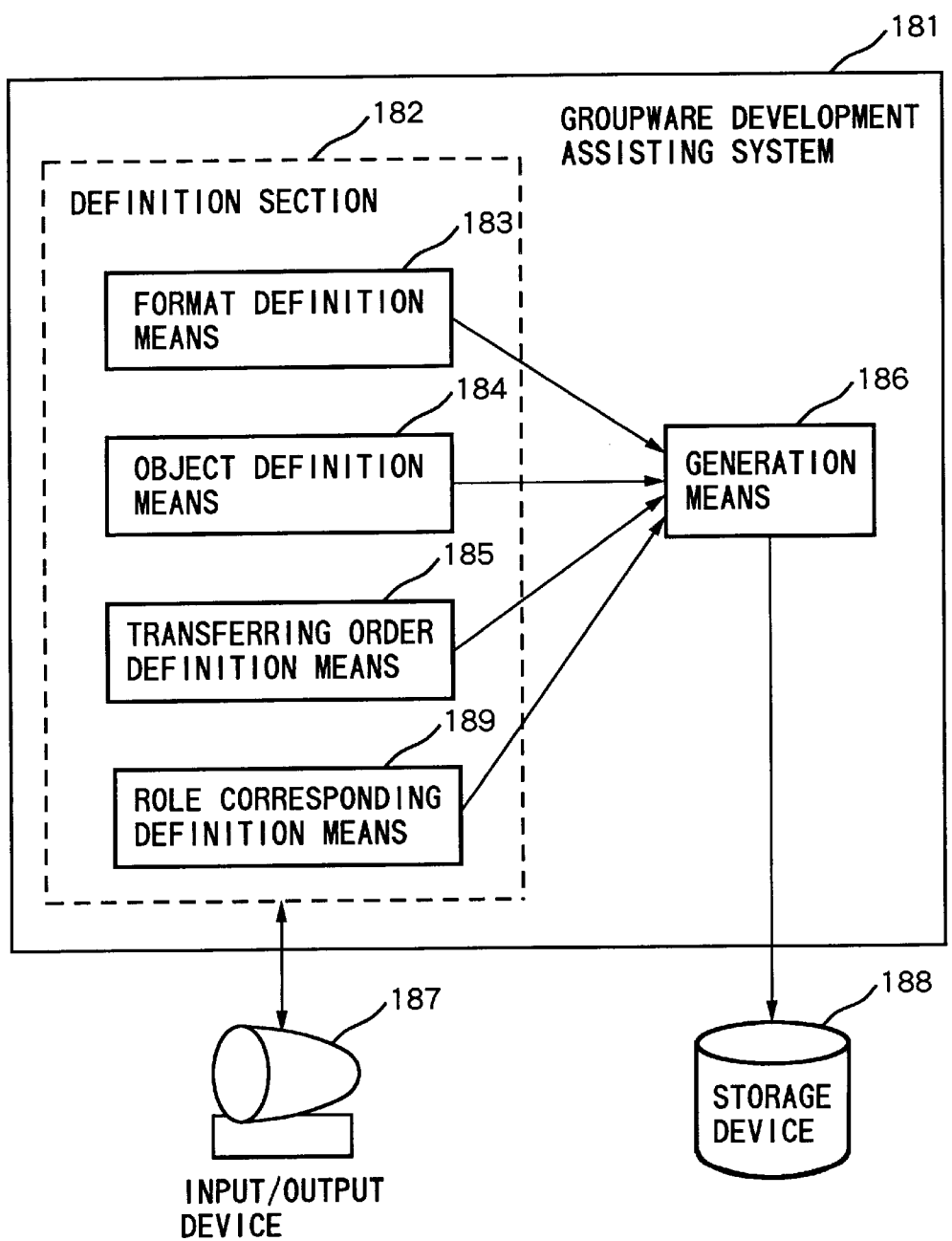
FIG. 18 is a block diagram showing one embodiment of the groupware development assisting system of the second embodiment.

FIG. 18 is a block diagram showing one embodiment of the groupware development assisting system of the second invention. A groupware development assisting system 181 includes a definition section 182 and a generation means 186. The definition section 182 includes a format definition means 183, an object definition means 184, a transferring order definition means 185, and a role corresponding definition means 186. The definition section 182 is connected to an input/output device 187 (e.g., display, keyboard, mouse), the developer of the groupware development assisting system can operate the four definition means contained in the definition section 182 through the input/output device 187 to make the required definition.

The format definition means 183 defines a format of electronic mail and sends the format defined content to the generation means 186. The object definition means 184 defines a software object (another name: software module) with the electronic mail as at least input or output and sends the defined content to the generation means 186. The transferring order definition means 185 defines a transferring order of the electronic mail given and received between a plurality of roles or a plurality of software objects of a system to be developed and a format used for each delivery and receipt, and sends the definition to the generation means 186.

The role corresponding definition means 189 defines a corresponding relation between an actual worker and a role name used in the transferring order definition with the transferring order definition means 185, and sends to the generation means 186. The generation means 186 receives the defined results from the format definition means 183, the object definition means 184, the transferring order definition means 185, and the role corresponding definition means 186, generates electronic mail utilization environment information on each worker in the target system and code for determining at least part of operation of electronic mail utilization environment definition information and software object on each object, and stores the generated result in a storage device 188.

Since the groupware development assisting system according to the second embodiment is basically the same with the first embodiment on parts other than the transferring order definition means 185 and the role corresponding definition means 189 (but, the generation means 186 further receives the corresponding relation of name of worker's private name and a role name from the role corresponding definition means), these two means will be described.

FIG. 19 is a chart showing an example of transferring order defined by the developer using the transferring order definition means 185. This chart is a graph consisting of nodes and arcs connecting the nodes. In the drawing, 191a, 191b, 191c and 191d represent nodes, and 192a, 192b and 192c arcs. Among all nodes, the nodes 191a, 191c and 191d corresponding to the workers are represented by a worker icon, and the node 191b corresponding to the software object represents the software object by a circle.

Reference numerals 193a, 193b, 193c and 193d aria labels showing the name of each node; 193a, 193c and 193d indicate the name of each worker's role, and 193b indicates the name of the software object. The first embodiment sets each worker's name on the label of the node corresponding to the worker, but this embodiment sets the role of each worker as described above. In this embodiment, the role of the worker includes two of "questioner" and "respondent", and two "questioners" are indicated to be the same, but if there are for example a plurality of different "questioners", each questioner is identified as "questioner 1" and "questioner 2".

Arcs 192a, 192b and 192c represent the deliver and receipt of electronic mail between the nodes. Squares 194a, 194b and 194c represent that the delivery and receipt of electronic mail represented by the arcs 192a, 192b and 192c has a format. And the name of the format is designated by labels 195a, 195b and 195c. The format of electronic mails "questionnaire" and "reply slip" designated by the labels 195a, 195b and 195c is defined by the format definition means 183, but the definition method is the same with the first embodiment, and therefore its description will be omitted.

FIG. 20 shows one example of a corresponding table of the worker's actual name and a role name defined by the developer using the role corresponding definition means 189. Items 201a and 201b indicate the role name, and items 202a and 202b indicate the worker's actual name. In this example, the questioner is actually "Taro Yamada", and the respondent is actually "Hanako Suzuki". Therefore, when the definition is made as shown in FIG. 19 and FIG. 20, the groupware to be generated is the same with the content described in the first embodiment with reference to FIG. 12 through FIG. 17.

Specifically, according to the groupware of the second embodiment, in the transferring order defined by the transferring order definition means 185, the worker's role is designated as the name of node corresponding to each worker, and the corresponding relation of the role and the worker's actual name is defined by the role corresponding definition means 189, so that it is not necessary to specify each worker's name at the time of defining the transferring order, allowing to provide a more flexible system.

The groupware development assisting system according to a third embodiment of this invention will be described with reference to FIG. 21 and FIG. 22. The entire structure of the groupware development assisting system according to the third embodiment is basically the same with the structure of the groupware development assisting system according to the first or second embodiment.

Figure 21:
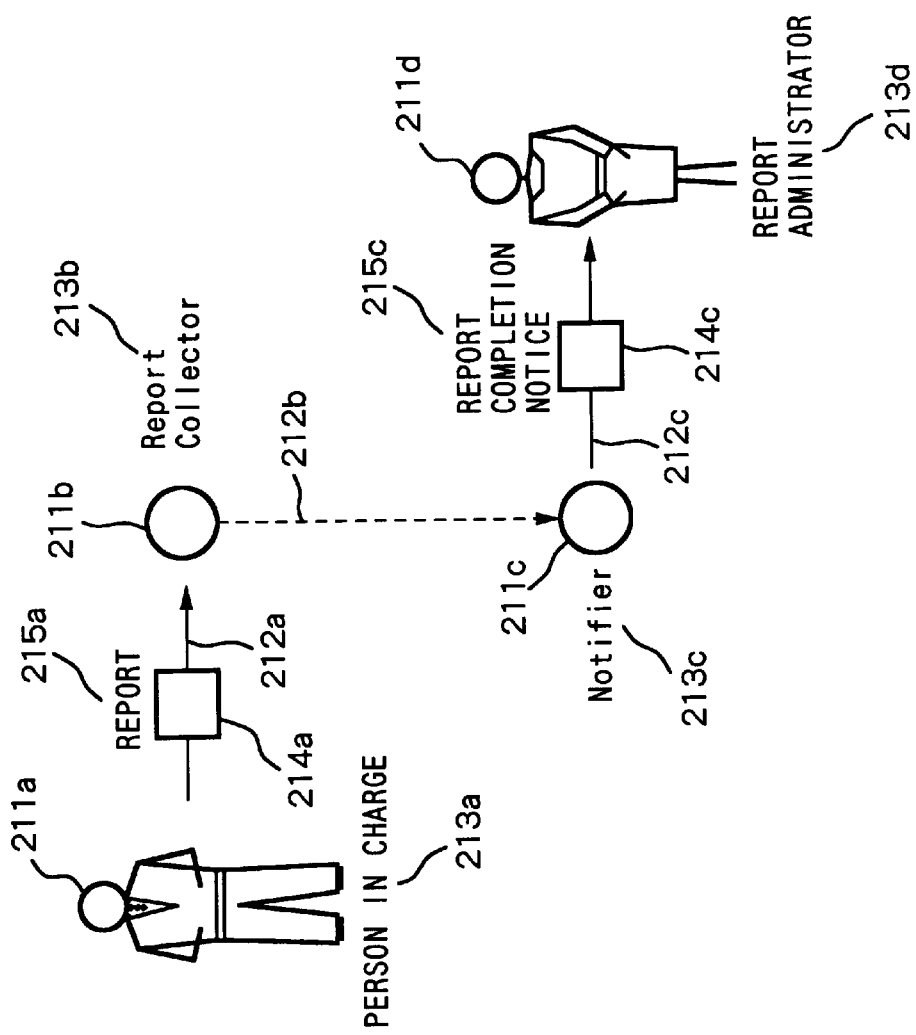
FIG. 21 is a chart showing one example of the transferring order defined by the transferring order definition means when using the groupware development assisting system according to the third embodiment.

FIG. 21 is a chart showing one example of the transferring order defined by the transferring order definition means when using the groupware development assisting system according to the third embodiment. In the same way as FIG. 6 or FIG. 19, this chart is a graph consisting of nodes and arcs connecting the nodes.

In FIG. 21, 211a, 211b, 211c and 211d represent nodes, and 212a, 212b and 212c arcs. The arc gives or receives electronic mail. The nodes 211a and 211d are workers, and the nodes 211b and 211c are software objects.

Reference numerals 213a, 213b, 213c and 213d are labels showing the name of each node, 213a and 213d indicate the name of role, and 213b and 213c indicate the name of the software object. Squares 214a and 214c represent that the delivery and receipt of electronic mail represented by the arcs 212a and 212c has a format, and the name of the format is designated by labels 215a and 215c.

A difference of the chart of FIG. 21 from FIG. 6 or FIG. 19 is that the format of the arc 212b is not designated. In the drawing, the arc 212b is represented by a broken line to emphasize that the format is not designated.

FIG. 22 is a view showing one example of the electronic mail which is given or received corresponding to the arc 212b by the groupware generated by the third embodiment according to the transferring order represented by the chart of FIG. 21. But, the line number is added to FIG. 22 for convenience of description.

The electronic mail of FIG. 22 is in accordance with the format (RFC822 specification) of electronic mail used by the operating system such as UNIX. The first to third lines are headers of electronic mail, the fourth line is a blank line indicating the end of header, and the fifth to seventh lines are the text of electronic mail.

The first line indicates a sender of the electronic mail. In this case, the sender of the electronic mail is a software object (ReportCollector). The second line indicates an addressee of the electronic mail. In this case, the addressee of the electronic mail is a software object (Notifier). The third line is a subject of the electronic mail. In this case, the subject of the electronic mail is Automatic Reporting Mail. In this embodiment, one defined as the electronic mail not designating the format when defining the transferring order is structured to be given this subject automatically.

The fifth to seventh lines indicate the test automatically generated by the groupware development assisting system. The fifth line indicates the content noticed by the electronic mail. Specifically, it indicates that the electronic mail in the form of report is sent from Taro Yamada to ReportController (sender indicated on the first line) in an identification code (message-id)=<9303040850.AA01388> of the electronic mail. "Taro Yamada" is a name of the worker who actually takes charge of a role "person in charge" indicated by the label 213a of FIG. 21.

The sixth line indicates a time when the event shown on the fifth line occurs. The seventh line indicates that the identification number (scenario-id) of transferring order definition is g8340398.

The groupware development assisting system of the third embodiment generates groupware so that the electronic mail of FIG. 22 is sent as the electronic mail corresponding to the arc 212b. Specifically, when the ReportCollector is generated according to the structure of FIG. 15, the processing program 158 generates the content consisting of the following steps as a program activated when the report is received from the person in charge.

(Step 1): The test corresponding to the fifth to seventh lines of FIG. 22 is prepared. But, parts of "<9303040850.AA01388>" of the fifth line and "Thu, 04 Mar 93 17:50:19+0900" of the sixth line are left blank. "Taro Yamada" of the fifth line shall be replaced by the name of the worker given to the person in charge by the role corresponding definition means. And, "<g8340398>" of the seventh line shall be replaced by the identification name (this identification name is one automatically adopted by the transferring order definition means, but may be named by the developer) in the transferring order defined by the transferring order definition means.

(Step 2): The blank of the fifth line shall be replaced by the identification name of the electronic mail received by the ReportCollector.

(Step 3): The blank of the sixth line shall be replaced by the time indicated on the header of the electronic mail received by ReportCollector.

(Step 4): A sentence completed by the steps 1 to 3 shall be sent to Notifier by electronic mail.

The groupware development assisting system of the third embodiment, when the software object (Notifier) is generated according to the structure of FIG. 15, may generate the definition to automatically prepare the report completion notice to send to the report administrator when the electronic mail in the form of FIG. 22 is received from ReportCollector as the electronic mail utilization environment definition information 157.

FIG. 21 and FIG. 22 show an example that the groupware development assisting system of the third embodiment is applied to the second embodiment, but it may be applied to the first embodiment.

The groupware development assisting system according to a fourth embodiment will be described with reference to FIG. 23 and FIG. 24. The entire structure of the groupware development assisting system according to the fourth embodiment is basically the same with the structure of the groupware development assisting system according to the first or second embodiment.

Figure 23:
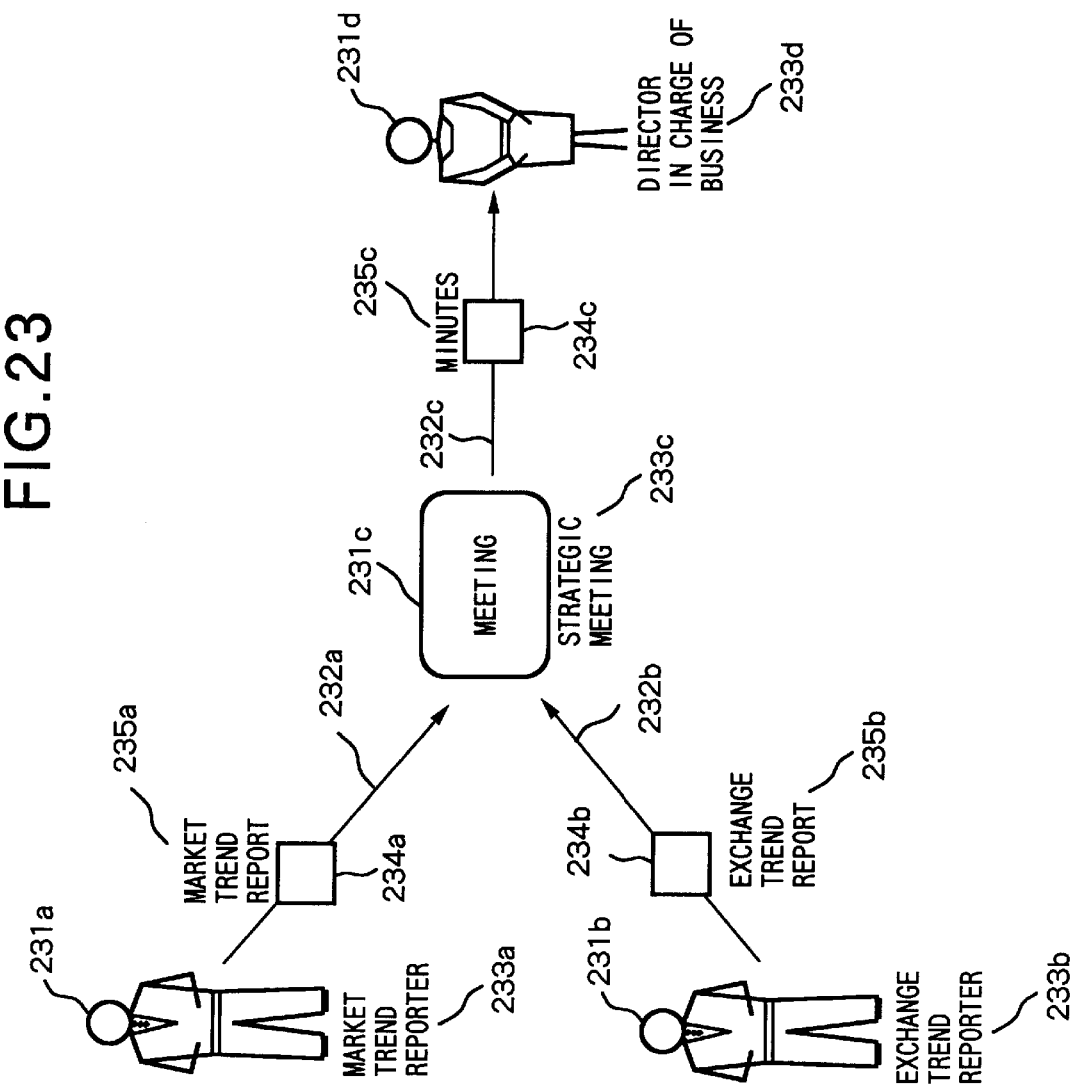
FIG. 23 is a chart showing one example of the transferring order defined by the transferring order definition means when using the groupware development assisting system according to the third embodiment.

FIG. 23 is a chart showing one example of the transferring order defined by the transferring order definition means when the developer of groupware uses the groupware development assisting system of the fourth embodiment. In the same way as FIG. 6 or FIG. 19, this chart is a graph consisting of nodes and arcs connecting the nodes. Reference numerals 231a, 231b, 231c and 231d represent nodes, and 232a, 232b and 232c arcs. The arc indicates the delivery and receipt of the electronic mail. The nodes 231a, 231b and 231d correspond to a worker, and the node 233c corresponds to a meeting pseudo object.

Reference numerals 233a, 233b, 233c and 233d are labels showing the name of each node, 233a, 233b and 233d indicate the name of role, and 233c indicates the name of the meeting pseudo object. Squares 234a, 234b and 234c represent that a format is designated in the delivery and receipt of electronic mail represented by the arcs 232a, 232b and 232c, and the format is designated by labels 235a, 235b and 235c. These three formats, or market trend report, exchange tend report and minutes have been defined by the format definition means.

In FIG. 23, a difference from FIG. 6 or FIG. 19 is that a meeting pseudo object 231c is used. The meeting pseudo object alone will be described here. The meeting pseudo object 231c is an object to deliver the electronic mail to be inputted to all meeting attendants and to provide a worker with environment to prepare minutes after the completion of meeting.

As already described with reference to FIG. 5, the software object is defined by the object definition means, but in this embodiment, a function to define the meeting pseudo object is added to the object definition means, so that the meeting pseudo object can be defined in the same way.

FIG. 24 shows an example that the meeting pseudo object is defined by the object definition means. But, the line number is added to FIG. 24 for convenience of description.

The first line indicates a definition start declaration of the meeting pseudo object and that its name is StrategicMeeting. The second line indicates the designation of the format of electronic mail received by the meeting pseudo object. Specifically, the meeting pseudo object becomes a state capable of starting a meeting upon receiving two electronic mails written in the forms of market trend report and exchange trend report.

The fourth line indicates the meeting attendants in the name of role. Specifically, it indicates that six persons including the chairperson, secretary, market trend reporter, exchange trend reporter, business manager and sales promotion manager attend the meeting. The fifth line designates a worker who prepares the electronic mail which is output of the meeting. In this case, the secretary prepares the electronic mail which is output of the meeting. The seventh line indicates that the format of the electronic mail which is output of the meeting is minutes.

The generation means generates the groupware of the method to be described below corresponding to the meeting pseudo object (StrategicMeeting) defined as shown in FIG. 23 and FIG. 24.

One software object is generated at a position of the meeting pseudo object in the transferring order definition.

This is a substance to realize the meeting pseudo object, and the name is determined to be StrategicMeeting. The structure of the meeting pseudo object (StrategicMeeting) is the same with one shown in FIG. 15.

The code shown as an example in FIG. 25 is generated in the electronic mail utilization environment definition information 157 of the meeting pseudo object (StrategicMeeting). FIG. 25 will be described afterward.

Nothing is particularly defined on the processing program 158 of the meeting pseudo object (StrategicMeeting).

The groupware utilization software of secretary is generated in the structure shown in FIG. 12. The code shown as an example in FIG. 26 is generated in the electronic mail utilization environment definition information 127 of secretary. FIG. 26 will be described afterward.

Before describing FIG. 25 and FIG. 26, the role corresponding definition in this embodiment will be supposed. In this case, it is defined that the market trend reporter is "Kozo Sato", exchange trend reporter is "Koji Fukuda", chairperson is "Misako Tanaka", secretary is "Jiro Nakagawa", business manager is "Akiko Yano", sales promotion manager is "Michio Ogawa", and director in charge of business is "Hanako Suzuki".

FIG. 25 is one example of the code generated for the electronic mail utilization environment definition information 157 of the meeting pseudo object (StrategicMeeting). But, the line number is added for convenience of description. The first line indicates the initialization of variables, and sets the variables "m" and "n" to "0" respectively. In the drawing, BEGIN is a reserved word, and indicates that the meeting pseudo object (StrategicMeeting) executes the code in { } immediately behind BEGIN at the start of operation.

The second to fifth lines indicate the operation when the market trend report is received from "Kozo Spito" (market trend reporter). Here, ReceivedMail is a word to indicate the mail received in the same way as FIG. 13 and FIG. 16. The third line temporarily saves the received electronic mail in variable "X". The fourth line indicates to increase the variable "m" by one.

The sixth to ninth lines indicate the operation when the exchange trend report is received from "Koji Fukuda" (exchange trend reporter). The seventh line saves the received electronic mail in variable "Y". The eighth line indicates to increase the variable "n" by one.

The tenth to fourteenth lines indicate the operation of the meeting pseudo object (StrategicMeeting) when the market trend report and exchange trend report are available. When these reports are available, both the variables "m" and "n" become an integer, so that the if condition of the tenth line is organized, and the eleventh to fifteenth lines are executed.

The eleventh line resets the variables "m" and "n" to "0". The twelfth line sends the market trend report which has been saved in the variable "X" to the meeting attendants other than "Kozo Sato". The thirteenth line sends the exchange trend report which has been saved in the variable "Y" to the meeting attendants other than "Koji Fukuda". The fourteenth line indicates to prepare electronic mail in the format of minutes, and determines it to be "A". The fifteenth line sends "A" to "Jiro Nakeigawa" (secretary).

In FIG. 25, the second line describes the condition of the market trend report, and the sixth line describes the condition of the exchange trend report, but this does not mean that the market trend report has to be received earlier than the exchange trend report. The utilization environment definition is not executed succeedingly, and the executable statement corresponding to the formed condition (including the reserved word such as BEGIN, and the condition indicated immediately behind the if) is executed any time.

Therefore, either of the market trend report and exchange trend report may be received earlier by the meeting pseudo object (StrategicMeeting), and both the variable "m" and "n" become positive when both reports are given.

FIG. 26 shows one example of the code of the electronic mail utilization environment definition information 127 generated for the groupware utilization software used by "Jiro Nakagawa" who is the secretary. But, the line number is added for convenience of description. "Jiro Nakagawa", after receiving the minutes from the meeting pseudo object (StrategicMeeting), can edit them any time (second line), and after editing, send to "Hanako Suzuki" who is the director in charge of business (third line).

Using the groupware generated as described above, a meeting can be held any time after the market trend report and the exchange trend report are given, and the minutes can be edited soon and sent to the addressee (director in charge of business in this case) without fail.

The groupware development assisting system according to a fifth embodiment will be described with reference to FIG. 27. The groupware development assisting system according to the fifth embodiment has a function making it possible to use an online realtime meeting system as a method to realize a meeting given to the groupware development assisting system according to the fourth embodiment.

An example of the online realtime meeting system includes for example MERMAID (trademark of NEC). This online realtime meeting system MERMAID is described in for example the Information Processing Society's collection of theses, volume 32, No. 9, pages 1200 to 1209.

Using the online realtime meeting system MERMAID, a meeting attendant can talk in his or her seat with another meeting attendant through a multi-media network using the workstation, and can edit documents accumulated in the workstation by himself or herself or together with another meeting attendant while continuing the meeting. And, the online realtime meeting system MERMAID has a function that the chairperson invites other attendants to call a meeting.

FIG. 27 is an example of the object definition description substituting for FIG. 24 of the meeting pseudo object 231c when using the online realtime meeting system MERMAID as a method to realize the meeting pseudo object 231c in a series of works according to the transferring order definition of FIG. 23 which has been already described. But, the line number is added to FIG. 27 for convenience of description.

The first, second, fifth and ninth lines of FIG. 27 are same with the first, second, fourth and seventh lines of FIG. 24. The third line indicates that the online realtime meeting system MERMAID can be used as a meeting tool. The sixth line indicates that the meeting is called by the chairperson. The seventh line indicates that the minutes are prepared by the secretary and the business manager.

The generation means generates the groupware of the method to be described below, corresponding to the meeting pseudo object defined in FIG. 23 and FIG. 27.

One software object is generated at a position of the meeting pseudo object in the transferring order definition. This is a substance to realize the meeting pseudo object StrategicMeeting, and the name is determined to be "StrategicMeeting". The structure of the meeting pseudo object StrategicMeeting is same with one shown in FIG. 15.

The code shown as an example in FIG. 28 is generated in the electronic mail utilization environment definition information 157 of the meeting pseudo object StrategicMeeting. FIG. 28 will be described afterward.

Nothing is particularly defined on the processing program 158 of the meeting pseudo object StrategicMeeting.

The groupware utilization software of chairperson is generated in the structure shown in FIG. 12. The code shown as an example in FIG. 29 is generated in the electronic mail utilization environment definition information 127 of the chairperson. FIG. 29 will be described afterward.

The attendants indicated on the fifth line of FIG. 27 are registered in the initialization file of the online realtime meeting system MERMAID for the chairperson. (The generation means of this embodiment has to be provided with the generation function of an initialization file of the online realtime meeting system MERMAID in addition to the generation means of the above embodiments.

The groupware utilization software of the secretary is also generated in the structure shown in FIG. 12. The code shown as an example in FIG. 30 is generated in the electronic mail utilization environment definition information 127 of the secretary. FIG. 30 will be described afterward.

The MERMAID initialization file for the secretary shall be indicated that the minutes (since a file name "/tmp/foobar" is given in FIG. 30, precisely this file) is edited together with the business manager.

In the above description, the initialization file of the online realtime meeting system MERMAID is a file referred to when the online realtime meeting system MERMAID is started, and includes information such as a list of the meeting attendants and a list of document files to be edited jointly.

Before describing FIG. 28, FIG. 29 and FIG. 30, the role corresponding definition in this embodiment will be supposed. In this case, in the same way as FIG. 25 and FIG. 26, it is defined that the market trend reporter is "Kozo Sato", exchange trend reporter is "Koji Fukuda", chairperson is "Misako Tanaka", secretary is "Jiro Nakagawa", business manager is "Akiko Yano", sales promotion manager is "Michio Ogawa", and director in charge of business is "Hanako Suzuki".

FIG. 28 is one example of the code generated for the electronic mail utilization environment definition information 157 of the meeting pseudo object StrategicMeeting. But, the line number is added for convenience of description. FIG. 28 is the same with FIG. 25.

FIG. 29 shows one example of the code of the electronic mail utilization environment definition information 127 generated for the groupware utilization software used by Misako Tanaka who is the chairperson. But, the line number is added for convenience of description.

The first line initializes the variables "m" and "n" to "0". The second to seventh lines wait for the market trend report and exchange trend report sent from the meeting pseudo object StrategicMeeting. When both reports are received, the variables "m" and "n" become positive, and the ninth and tenth lines are executed. The ninth line reinitializes the variables "m" and "n" to "0".

The "append_menu" of the tenth line indicates to add a menu according to a new graphic user interface to the user interface means 123. The name of this menu is "MERMAID", and it is indicated that when this menu is selected, a command "mermaid" is executed, and a variable "T" becomes true when the execution terminates.

The twelfth line checks if the variable "T" is true or not. If the variable "T" is true or the mermaid command has been executed, the thirteenth and fourteenth lines are executed. The thirteenth line indicates that electronic mail which does not have the format indicating the completion of work is automatically generated and determined to be "X". The fourteenth line sends the "X" to the secretary "Jiro Nakagawa".

FIG. 30 is one example of the code of the electronic mail utilization environment definition information 127 generated by the groupware utilization software used by the secretary Jiro Nakagawa. But, the line number is added for convenience of description.

When the condition of the first line is formed, or when the minutes are received from the meeting pseudo object StrategicMeeting, it is once stored in a file name "/tmp/foobar" according to the definition of the second line. This file name "/tmp/foobar" is automatically determined by the generation means.

The condition of the fourth line is formed when electronic mail in SIGNAL form (electronic mail not having a format) is received from the chairperson "Misako Tanaka. Specifically, according to the definition of FIG. 29, since the electronic mail (X) in the SIGNAL form is sent when the meeting completes, the condition of the fourth line of FIG. 30 is formed after the completion of the meeting. At the termination of the meeting, the minutes have been completed (because, the minutes are generated in the online realtime meeting system MERMAID by a joint editing with the business manager by the designation of the MERMAID initialization file for the secretary).

The fifth line indicates to read the completed minutes file "/tmp/foobar" and determine it to be "C". The sixth line indicates to send the minutes "C" to the director in charge of business "Hanako Suzuki".

Figure 31:
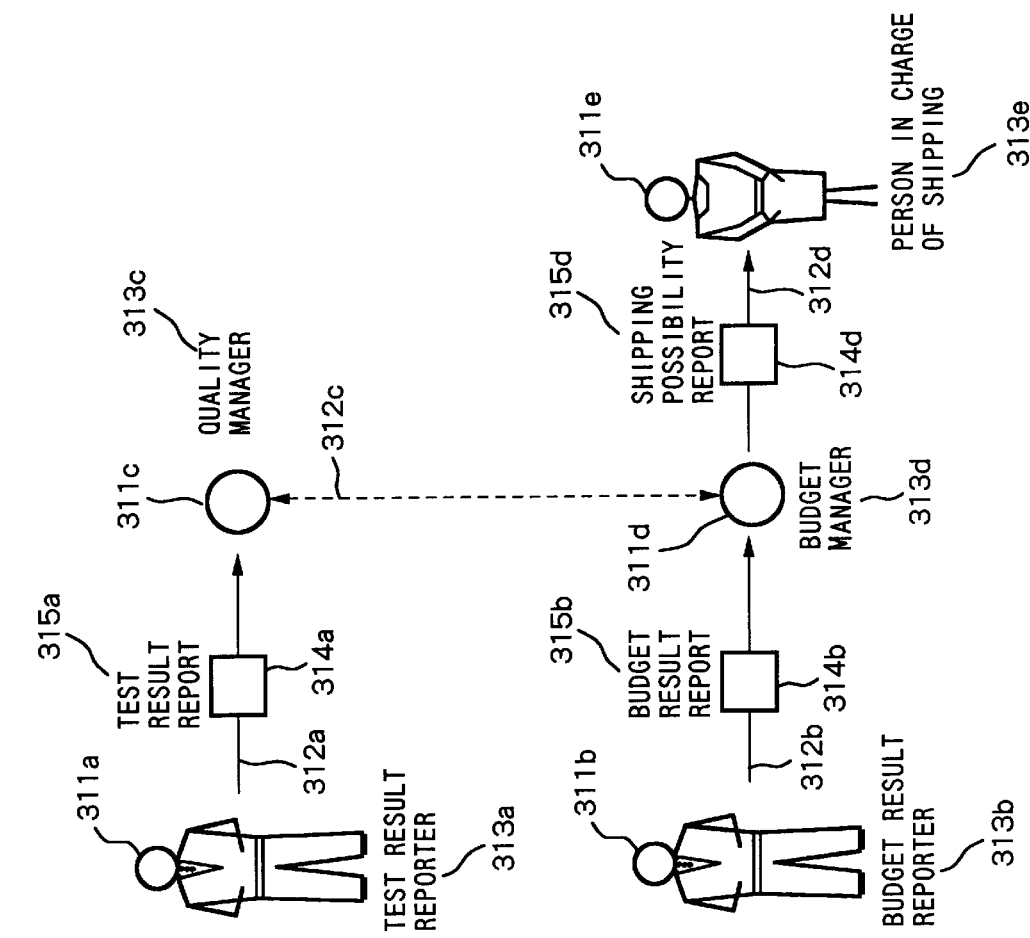
FIG. 31 is a chart showing one example of the transferring order defined by using the transferring order definition means in the groupware development assisting system of the sixth embodiment.

The groupware development assisting system according to a sixth embodiment will be described with reference to FIG. 31 through FIG. 34. FIG. 31 is a chart showing one example of the transferring order defined by the developer using the transferring order definition means in the groupware development assisting system of the sixth embodiment. FIG. 31 is a graph consisting of nodes and arcs, and 311*a*, 311*b*, 311*c*, 311*d* and 311*e* are nodes, and 312*a*, 312*b*, 312*c* and 312*d* are arcs. The nodes 311*a*, 311*b* and 311*e* represent workers, and the nodes 311*c* and 311*d* represent software objects. Reference numerals 313*a*, 313*b*, 313*c*, 313*d* and 313*e* represent labels of nodes. The labels 313*a*, 313*b* and 313*e* represent the names of roles, and the labels 313*c* and 313*d* represent the names of software objects.

The arcs 312*a*, 312*b* and 312*d* represent the delivery and receipt of electronic mail, and squares 314*a*, 314*b* and 314*d* indicate that formats are designated for the delivery and receipt of electronic mail represented by the arcs 312*a*, 312*b* and 312*d*. Labels 315*a*, 315*b* and 315*d* of the arc represent that such formats are a test result report, budget result report and shipping possibility report. These formats are supposed to have been defined using the format definition means.

The arc 312*c* defines a mutual relation which means cooperation. The cooperation here means first that when a plurality of software objects having own target executes some software to accomplish the own target, and the achievement of target in each software object cannot be realized simultaneously with the achievement of target of another software object, the adjustment of targets is automatically made. Secondly, it means that when the software object having own target does not have all means for achieving the target or a software execution method by itself, it asks another software object having means to help to achieve the object for help.

The construction method of a software object making such cooperation is not common but many examples are shown in for example "Lecture Note Software Engineering 2, Multi-agent and Cooperation Calculation 1" (edited by Hideyuki Nakajima, ISBN 4-7649-0202-8) published by Kindai Kagakusha. This publication describes a multi-agent system which is a system that a plurality of agents mutually communicates to adjust to achieve respective targets and makes cooperative operation. In this multi-agent system, the agent is a respective independent software having a peculiar object, and autonomously operates (without being commanded by another). Communication between the agents is conducted to secure the resource and information needed to achieve each object, to adjust and compromise for the object achievement and a system order preservation, and to request a job to another agent.

The example of FIG. 31 represents a series of works regarding the quality of software and management of budget, and shows one example of the first definition of the above cooperation. Generally, it is necessary to predict quality from a test result before shipping the software to judge if quality is on a level allowed for shipping. On the other hand, a test man hour is required to improve quality but the improvement of quality by accumulating test results is restricted by a limited budget.

In FIG. 31, a software object (QualityManager) 311c, upon receiving a test result report, predicts quality, and if quality is low, judges that many tests are needed.

Specifically, the own target of the software object (QualityManager) 311c is to improve quality. On the other hand, a software object (BudgetManager) 311d, upon receiving a budget result report, monitors the execution of the budget, and ships in the budget as low as possible. Specifically, the own target of the software object (BudgetManager) 311d is to reduce a cost. Therefore, since respective own targets of the software object (QualityManager) 311c and the software object (BudgetManager) 311d cannot be attained simultaneously, the cooperative operation to adjust the target level is required between these two software objects.

As a result of cooperation, when an estimate of the budget required before shipping and propriety of shipping is prepared, the software object (BudgetManager) 311d generates the result as a shipping possibility report, and sends to a person in charge of shipping 311e as electronic mail.

Figure 32:
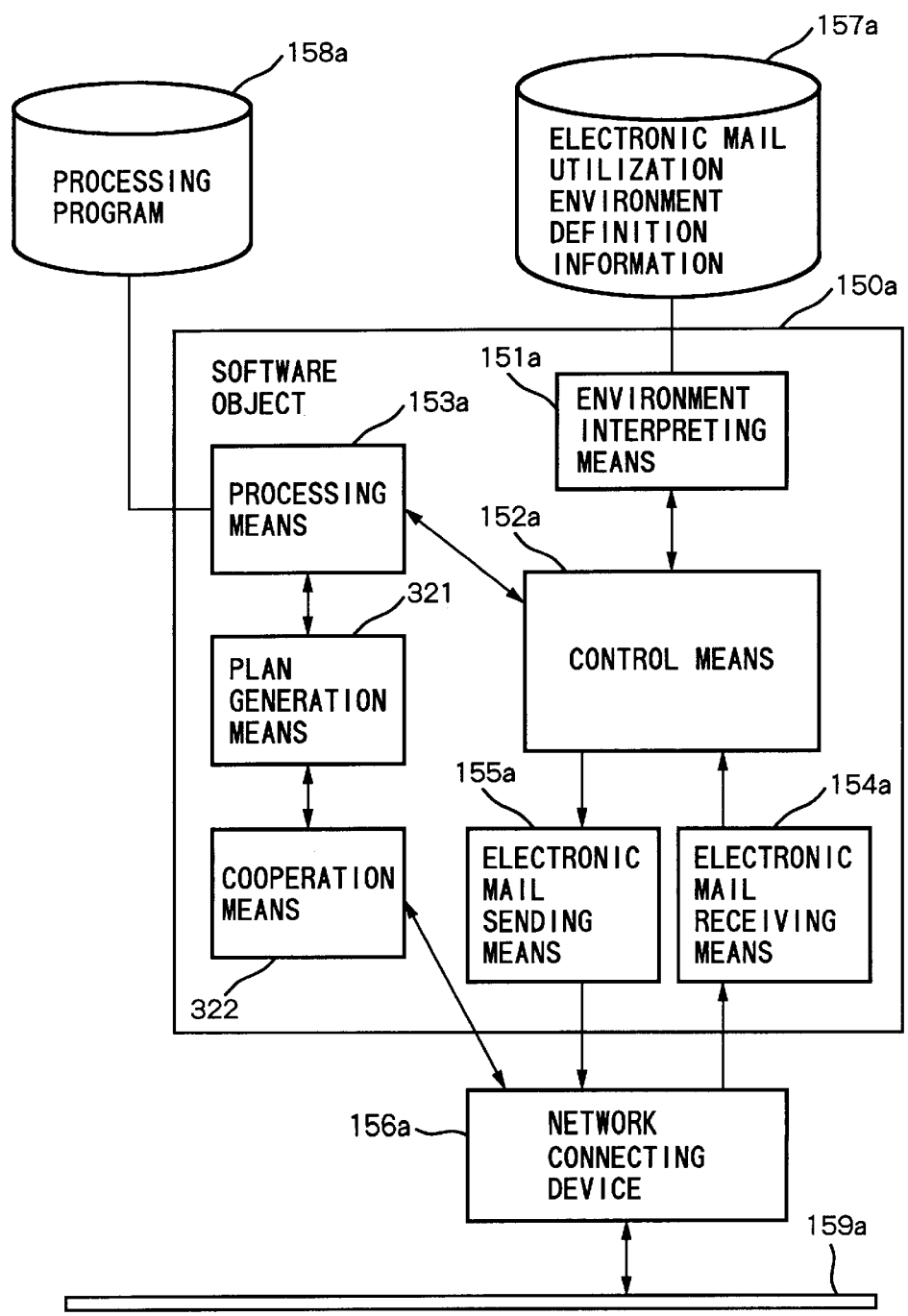
FIG. 32 is a block diagram showing one example of the structure of the soft object making the cooperation activity.

FIG. 32 is a block diagram showing one example of the structure of the software object making the cooperation activity like the software object (QualityManager) 311c and the software object (BudgetManager) 311d of FIG. 31. A difference from FIG. 15 is that a plan generation means 321 and a cooperation means 322 are added to the interior of the software object 150a. An environment definition means 151a, a control means 152a, an electronic mail receiving means 154a, an electronic mail sending means 155a, a network connecting device 156a, electronic mail utilization environment definition information 157a, a processing program 158a and a network bus 159a are basically the same with the environment definition means 151, the control means 152, the electronic mail receiving means 154, the electronic mail sending means 155, the network connecting device 156, the electronic mail utilization environment definition information 157, the processing program 158 and the network bus 159 of FIG. 15.

The processing means 153a has a function to give a target to the plan generation means 321 and to start, in addition to the function of the processing means 153 of FIG. 15. The plan generation means 321, when started from the processing means 153a, prepares a plan to achieve a target, and if the target can be achieved, advises the target to the cooperation means 322.

When the target is advised from the plan generation means 321, the cooperation means 322 makes the cooperative operation with an exterior software object. The cooperative operation is physically conducted through the network, so that the network connecting device 156a is used.

When the cooperative operation is completed, the cooperation means 322, when the target is changed as a result of cooperation, returns the changed target to the plan generation means 321. When the changed target is given from the cooperation means 322, the plan generation means 321 investigates whether a plan for realizing the changed target can be prepared, and if not possible, changes the target again, and gives it to the cooperation means 322. Thus, the target is changed several times between the plan generation means 321 and the cooperation means 322, and when a plan is finally decided, the plan generation means 321 returns the finally decided target and plan to the processing means 153a. And, when the achievement of the target is finally impossible (for example, when the target cannot be settled with the cooperation companion software object), the effect the target cannot be achieved is returned to the processing means 153a.

FIG. 33 is one example of the object definition defined by the developer using the object definition means regarding the software object (BudgetManager) 311d between the two software objects of FIG. 31. And, the line number is added for convenience of description.

The first line defines the object's name "BudgetManager". The second line indicates that this object receives a budget result report as input by electronic mail. In the definition, it is declared to refer to by "y". The fourth through twelfth lines define the processing by the software program executed by this object. The fifth to sixth lines declare a variable. The fifth line declares an integer "x", and the sixth line declares a pointer "a" to data of a "shipping possibility report" type.

The "call_coordination" of the eighth line indicates to call the plan generation means 321. The first parameter "MINIMIZE" of the call is a reserved word dedicated to "call_coordination" and indicates that a target at a time of cooperation of this project is to obtain a smaller value as a final conclusion based on a value given by the second parameter as the maximum value. This second parameter is an amount shown in the "balance budget" column entered in the budget result report converted into a value of man hour. "MAN HOUR_YEN" is a constant used for the conversion. The result of the cooperation is substituted for the integer "x". But, a negative value is entered when cooperation failed.

The ninth line indicates that the format of shipping possibility report is newly generated, and it is referred to by "a". The tenth line indicates that in the "propriety" column of the shipping possibility report, "yes" is entered when "x" is positive or zero, and "no" is entered when "x" is negative. The eleventh line indicates that a value of "x" is entered in the "required man hour" column of the shipping possibility report. The fourteenth line indicates that the output of this object is electronic mail of the shipping possibility report format and referred to by "a" being defined. The fifteenth line indicates the termination of object definition.

The generation means receiving the object definition of FIG. 33 outputs the code of for example FIG. 3 as the processing program 158a of the software object (BudgetManager) 311d. But, the line number is added to FIG. 34 for convenience of description.

FIG. 34 has the parts of the fourth to twelfth lines of FIG. 33 arranged in the function form of C language. But, the fifth line uses information obtained from the transferring order definition to designate that the cooperation companion is the software object (QualityManager) 311c. And, the tenth line designates to return "a" as a return value to the control means 152a.

The cooperation in this example is effected as follows. The software object (BudgetManager) 311d has a target to be finished by a manhour as small as possible with the manhour usable by "balance budget" as the maximum value as shown on the fifth line of FIG. 34. The other software object (QualityManager) 311c has a target to apply a manhour as many as possible to improve quality with the manhour at least required to keep the standard quality as the minimum value.

The software object (BudgetManager) 311d and the software object (QualityManager) 311c determine a finally required manhour so as to complete both targets. Its determination method is variable according to the realization method of the plan generation means 321 and the cooperation means 322. In this case, there may be for example a method "when the maximum value allowed by the software object (BudgetManager) is larger than or equal to the minimum value required by the software object (QualityManager), an average of both of them is determined as a conclusion, and other is determined to be cooperation impossible". In the example of FIG. 31, the software objects subjected to cooperation have been two but may be three or more.

The groupware development assisting system according to a seventh embodiment will be described with reference to FIG. 35 through FIG. 38.

To describe the above embodiments, an example in which the structure of the groupware utilization software used by the worker is one shown in FIG. 12 has been used for description. The structure of FIG. 12 assumes mainly "UNIX" as the operating system of the computer. But actually, a worker would use a different operating system in a daily work, for example the Windows (MS-Windows) of Microsoft Corp. Since it is realistically unreasonable to make all workers use the same computer and operating system because of facility investment and habit, the groupware is desired to be usable among different computers and operating systems.

And, as to the same operating system, for example an editor is available in several types, and users are using their favorite one. The groupware is desired to be usable regardless of the type of the editor used by the worker. Further, since different computers may be connected to different networks, the electronic mail used by the groupware is desired to be communicable among different networks.

Figure 35:
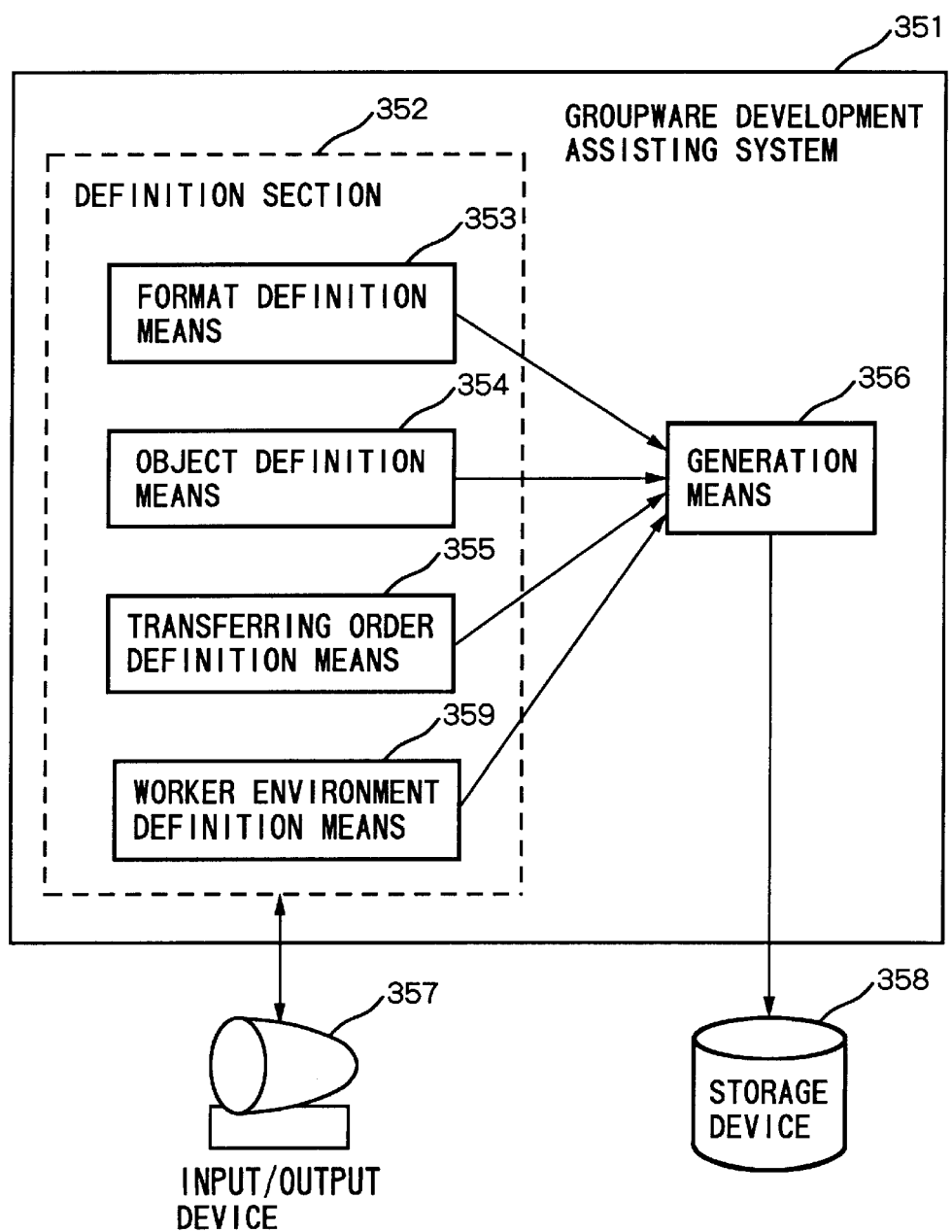
FIG. 35 is a block diagram showing the structure of the groupware development assisting system according to the seventh embodiment.

The embodiment of the groupware development assisting system according to the seventh embodiment to be described below can generate an appropriate groupware by previously defining, at the time of developing the groupware, differences of the operating systems and editors used by the workers and differences of the network connected to the computers used by the workers. FIG. 35 is a block diagram showing the structure of the groupware development assisting system according to the seventh embodiment. FIG. 35 has a structure having a worker environment definition means 359 added to FIG. 1.

A groupware development assisting system 351 includes a definition section 352 and a generation means 356. The definition section is provided with a format definition means 353, an object definition means 354, a transferring order definition means 355, and a worker environment definition means 359. The definition section 352 is connected to an input/output device 357 (e.g., display, keyboard, mouse). The developer who is a user of this groupware development assisting system can operate four definition means contained in the definition section 352 through the input/output device 357 to make a required definition.

The format definition means 353, the object definition means 354, and the transferring order definition means 355 may be the same with the format definition means 3, the object definition means 4 and the transferring order definition means 5 described in FIG. 1.

The worker environment definition means 359 is used when the developer of the groupware defines the types of individual computers and networks used by individual workers and the worker environment including tastes such as electronic mail utilization environment and individual editing program used by each worker. And, these are generically called as the worker environment definition. The generation means 356 receives the defined result from the format definition means 353, the object definition means 354, and the transferring order definition means 355, generates electronic mail utilization environment information of each worker in the target system, electronic mail utilization environment information of each software object and a code for determining at least part of operation, and stores the generated result in the storage device 358.

Figure 36:
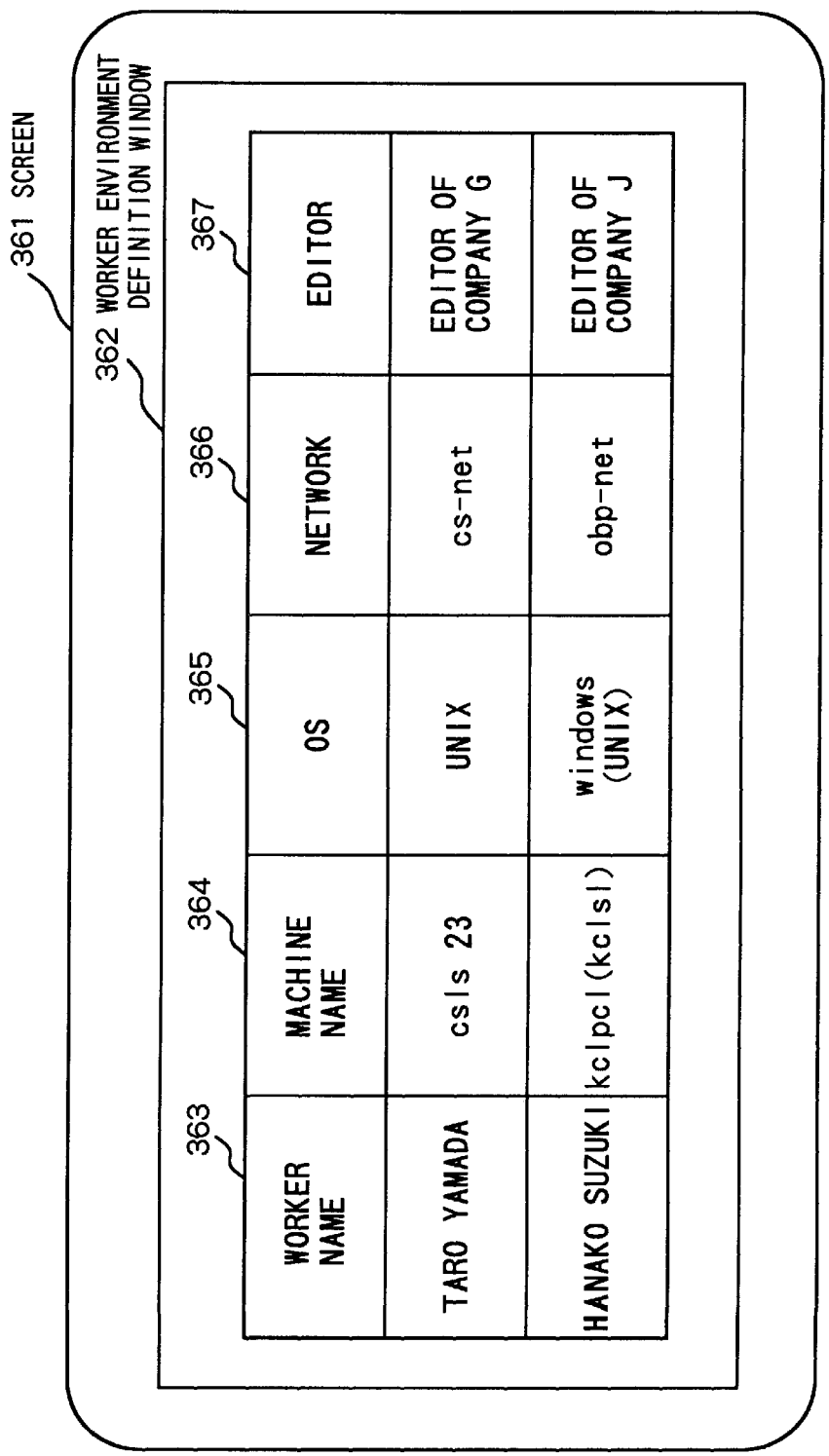
FIG. 36 is a screen view showing one example of the screen when the worker environment is defined by using the worker environment definition means through the input/output device.

FIG. 36 shows one example of the screen when the worker environment is defined using the worker environment definition means 357 by operating an input/output device 367. A screen 361 displays by the multi-window system, and a worker environment definition window 362 is shown on the screen 361. The worker environment definition using the worker environment definition window 362 is effected in a table form. This table consists of five columns of 363, 364, 365, 366 and 367. In each column, the first line is a label showing the defined content, and the second line and after are actual defined contents.

The column 363 is a column to enter the worker's name. In this example, two workers "Taro Yamada" and "Hanako Suzuki" are defined. In the column 364, the name of the computer (machine) used by each worker is entered. In this example, it is defined that "Taro Yamada" uses a machine "csls23" and "Hanako Suzuki" uses a machine "kclpcl". But, it is noted in parentheses that the machine "kclpcl " used by "Hanako Suzuki" is used connected to another machine "kcls1". In this case, the groupware utilization software of "Hanako Suzuki" consists of two machines, the machine "kclpcl " on a terminal, and the machine "kcls1" on a host. Details will be described afterward with reference to FIG. 37.

In the column 365, the operating system (OS) of the machine used by each worker is defined. In this case, the operating system used by "Taro Yamada" is "UNIX", the operating system used by "Hanako Suzuki" is "Windows" for the machine "kclpc1" and "UNIX" for the machine "kcls1". In the column 366, the name of the network to which the machine used by each worker is connected is defined. In this case, a machine "csls23" is connected to "cs-net" and the machine "kcls1" is connected to "obp-net". Since the machine "kclpc1" is connected to the machine "kcls1", it is not directly connected to the network. In the column 367, the name of the editor used by each worker is defined. In this case, "Taro Yamada" uses an editor of company G, and "Hanako Suzuki" uses an editor of company J.

Figure 37:
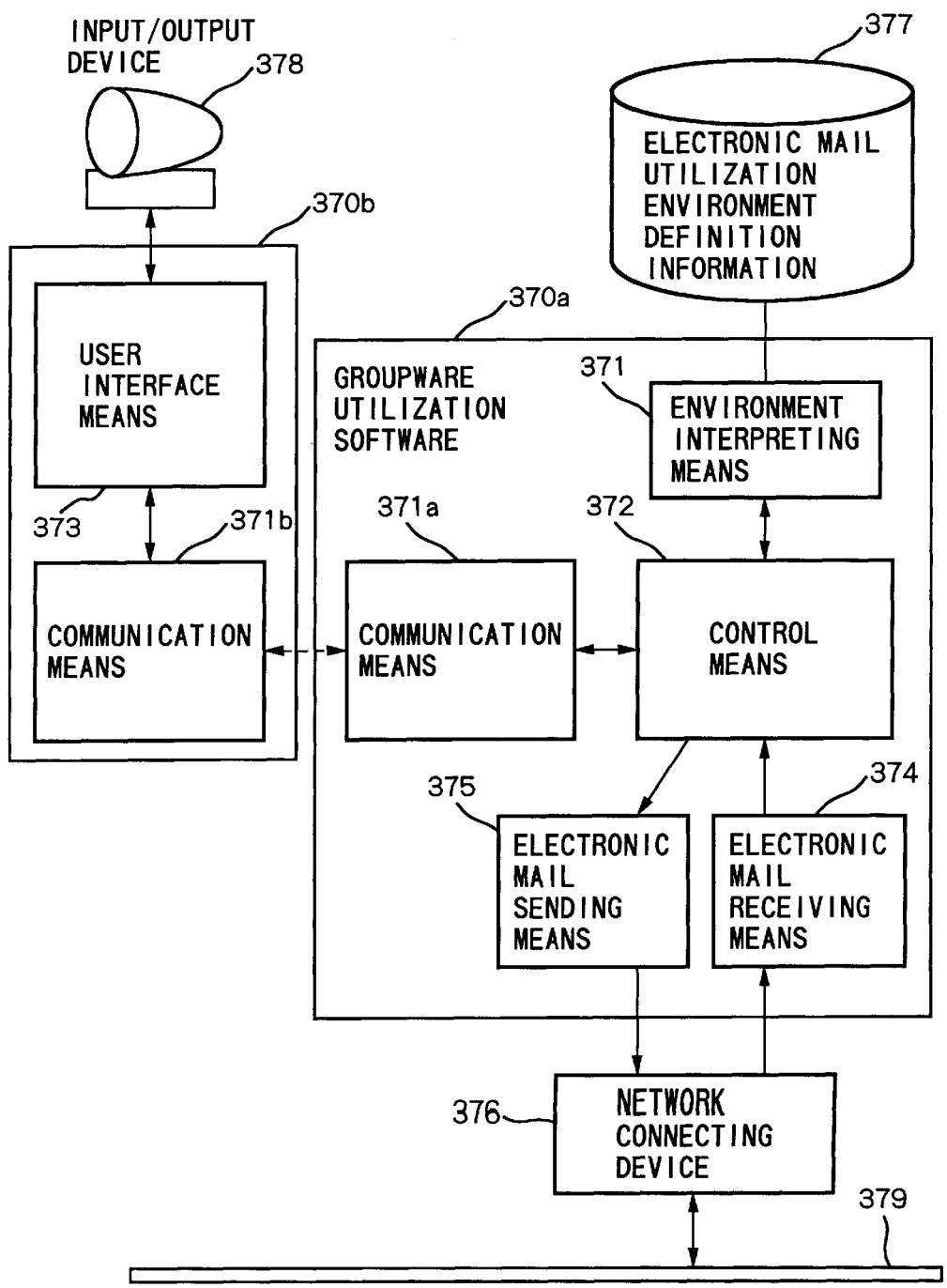
FIG. 37 is a block diagram showing the structure when the groupware utilization software is structured by two machines.

FIG. 37 is a block diagram showing the structure when the groupware utilization software of the worker is structured by two machines as shown in the example of "Hanako Suzuki" in the worker environment definition of FIG. 36.

The groupware utilization software consists of 370a and 370b. Among them, the groupware utilization software 370a is a part realized on a machine on the host, or on the machine "kcls1" in the environment of "Hanako Suzuki" defined in FIG. 36. On the other hand, the groupware utilization software 370b is a part realized on a machine on a terminal, or on the machine "kclpc1" in the environment of "Hanako Suzuki" defined in FIG. 36. Both are mutually communicable through communication means 371a, 371b.

The groupware utilization software 370a includes at least an environment interpreting means 371, a control means 372, a communication means 371a, an electronic mail receiving means 374, and an electronic mail sending means 375. The electronic mail receiving means 374 and the electronic mail sending means 375 are connected to a network bus 379 through a network connecting device 376, and can send or receive electronic mail with groupware utilization software used by another worker or the software object.

The control means 372 is activated when the electronic mail receiving means 374 receives the electronic mail and the communication means 371a receives a command from the worker, controls other means contained in the groupware utilization software 370a, and send a message to the worker through the communication means 371a as necessary. The control means 372, when outputting such control or message, refers to an exterior file electronic mail utilization environment definition information 377 through the environment interpreting means 371 to decide a plan of control.

For a method to communicate between the communication means 371a, 371b, there are many methods such as using a serial line interface and the network bus 379. In any case, through the communication means 371a, 371b, the control means 372 can send a command or data to a user interface means 373 and receive a command or data from the user interface means 373. The user interface means 373 interacts with the worker through an input/output device 378.

FIG. 38 is one example of the electronic mail utilization environment definition information 377 for "Hanako Suzuki" outputted from the generation means when the worker environment definition of FIG. 36 and the transferring order definition of FIG. 6 are inputted in the generation means. But, the line number is added to FIG. 38 for convenience of description.

FIG. 38 is the same with the example of FIG. 13 excepting a certain part. The "IF_NODE=kclpc1" of the first line indicates that the groupware utilization software of "Hanako Suzuki" uses the machine "kclpc1" as an interface node (or terminal) machine. And, "OS=Windows, EDITOR=Editor of company J" of the first line indicates that OS of the machine "kclpc1" is Windows, and the editor used by "Hanako Suzuki" is an editor of company J.

The first to sixth lines and the eighth line are the same with the first to fourth lines and the sixth line of FIG. 13. In the seventh line, information on the network name in which "Taro Yamada" is present is added as information to which electronic mail is sent.

The control means 372 uses information of the electronic mail utilization environment definition shown in FIG. 38 and controls. For example, since "A" cannot be edited by the machine on the host alone when executing the sixth line of FIG. 38, the following procedure has to be executed.

1. The terminal machine "kclpc1" is searched, and connected through the communication means 371a, 371b.
2. "A" is sent to the user interface means 373 of the machine "kclpc1".
3. The editor (not shown in FIG. 37 but prepared in a form usable on the machine "kclpc1") of company J is started on the machine "kclpc1", and a command is given to the user interface means 373 so as to edit "A".
4. After the completion of editing, the edited "A" is received from the user interface means 373.

In this embodiment, information (e.g., name of the editor used) regarding the terminal is generated as part of the electronic mail utilization definition information 377 used on the host side, but another electronic mail utilization environment file may be connected to the groupware utilization software 370b on the terminal side to generate information about the terminal side with respect to the electronic mail utilization environment definition file on the terminal side.

Figures 39, 40:
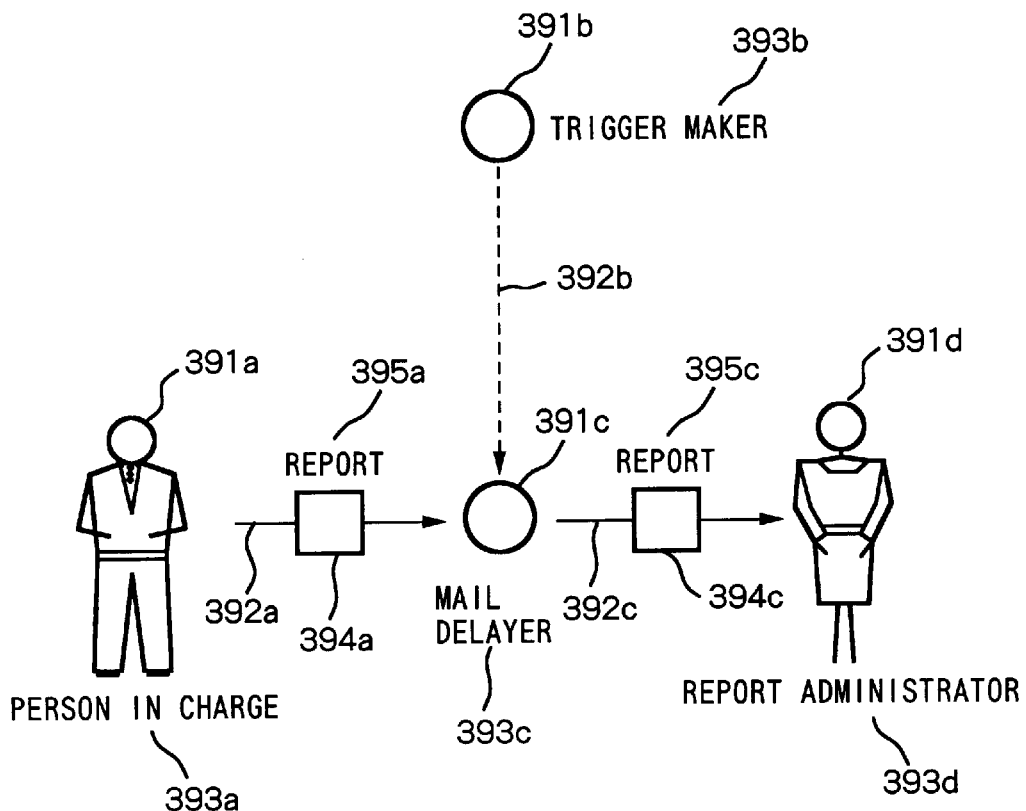
FIG. 39 is a chart showing one example of the transferring order defined by using the transferring order definition means when using the groupware development assisting system according to the eighth embodiment.
FIG. 40 is a view showing an example of effecting the object definition of the software object regarding the transferring order definition shown by the chart of FIG. 39.

Now, the groupware development assisting system according to an eighth embodiment will be described with reference to FIG. 39 through FIG. 41. FIG. 39 is a chart showing one example of the transferring order defined by using the transferring order definition means when the developer of the groupware uses the groupware development assisting system according to the eighth embodiment. The chart is a graph consisting of nodes and arcs connecting the nodes, and 391a, 391b, 391c and 391d represent nodes, and 392a, 392b and 392c arcs. The nodes 391a, 391d are workers, and the nodes 391b, 391c are software objects.

Labels 393a, 393b, 393c and 393d are labels showing the name of each node; 393a and 393d indicate the name of each worker's role, and 393b and 393c indicate the name of the software object. Squares 394a, 394c represent that the delivery and receipt of electronic mail represented by the arcs 392a and 392c has a format, and the name of the format is designated by labels 395a and 395c. The arc 392b is represented by a broken line, but its format is not shown in the same way as the arc 212b of FIG. 21. Specifically, the electronic mail corresponding to this arc is automatically sent when the operation of the software object 391b completes.

In FIG. 39, input is not present for the software object 391b, but a procedure that the software object 391b has a certain designated time is defined. This procedure is started at the generation of the object, and terminates when that time comes. Specifically, the electronic mail represented by the arc 392b is sent when a certain designated time comes.

FIG. 40 shows an example of effecting the object definition of the software object "MailDelayer" 391c regarding the transferring order definition shown by the chart of FIG. 39. But, the line number is added for convenience of description.

The first line is a name of the object. The second line indicates that the software object "MailDelayer" 391c has two inputs. One of them indicates SIGNAL (electronic mail automatically generated and not having a format) sent from the software object "TriggerMaker". In this case, parentheses are used when the sender of the electronic mail is particularly indicated. The third line indicates that output is a report, and the fourth line indicates the termination of the definition of the object.

FIG. 41 shows one example of the transferring order definition shown by the chart of FIG. 39 and the electronic mail utilization environment definition of the software object "MailDelayer" 391c which is generated by the generation means when the object definition of the software object "MailDelayer" 391c shown in FIG. 40 is given to the generation means. But, the line number is added for convenience of description. And, as the role corresponding definition, it is supposed that the person in charge is determined to be "Taro Yamada" and the report administrator to be "Hanako Suzuki". A method for realizing queuing of electronic mail is the same as indicated in FIG. 25 and FIG. 28.

First, the first line indicates the initialization of variables, and sets the variables "m" and "n" to "0" respectively. In the drawing, BEGIN is a reserved word, and indicates to execute the code in { } immediately behind BEGIN at the start of operation. The second to fifth lines indicate the operation when the report is received from the person in charge "Taro Yamada". "ReceivedMail" is a word to indicate the received mail. The third line indicates that the received mail is once stored in an internal variable "A". The fourth line indicates to increase the variable "m" by one.

The sixth to eighth lines indicate the operation. when the electronic mail (electronic mail not having a format) of SIGNAL type is received from a software object "Trigger-Maker". The operation at this time is to increase the variable "n" by one as shown on the seventh line.

The ninth to twelfth lines indicate the operation which is effected after receiving the electronic mail of SIGNAL type and the report. When the two electronic mails are available, both the variables "m" and "n" become an integer, so that the if condition of the ninth line is formed, and the tenth and eleventh lines are executed. The tenth line indicates to reset the variables "m" and "n" to "0". The eleventh line sends the report previously stored as "A" to the report administrator "Hanako Suzuki".

In FIG. 41, the second line describes about the condition of the report and the sixth line describes about the conditions of SIGNAL type electronic mail, but this does not mean that the report has to be received earlier than the SIGNAL type electronic mail. The utilization environment definition is not executed successively, and the executable statement corresponding to the formed condition (including the reserved word such as BEGIN, and the condition indicated immediately behind the if) can be executed any time. Therefore, either of the report and the SIGNAL type electronic mail may be received earlier by the software object "MailDelayer", and both the variable "m" and "n" become positive when both of them are given.

When the groupware generated as described above is used, queuing of a plurality of electronic mails can be realized, so that a complex transferring order can be defined.

The groupware development assisting system according to a ninth embodiment will be described with reference to FIG. 42 through FIG. 45.

Figure 42:
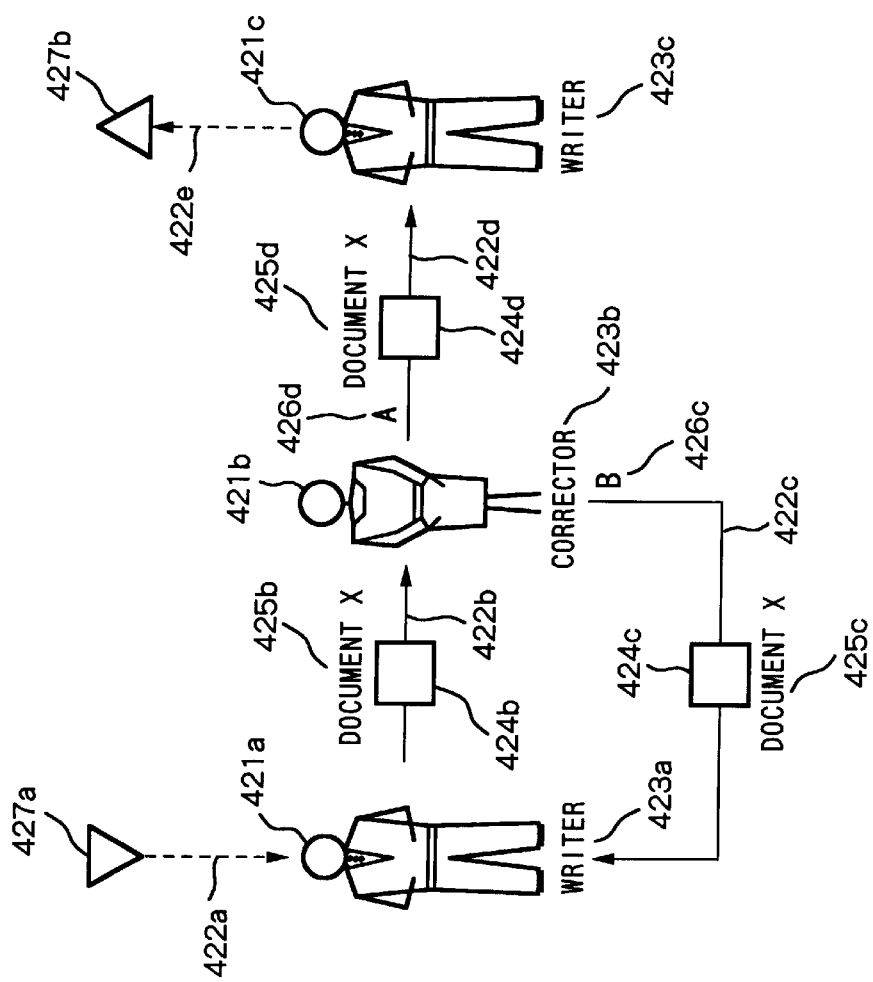
FIG. 42 is a chart showing one example of the pattern of transferring order which can be used by the groupware development assisting system according to the ninth embodiment.

FIG. 42 is a chart showing one example of the pattern of transferring order which can be used by the groupware development assisting system according to the ninth embodiment. This pattern is previously defined and registered using the transferring order definition means. In the same way as before, 421a, 421b and 421c are nodes, and 422a, 422b, 422c, 422d and 422e are arcs.

Triangles 427a and 427b are also nodes, but these are particularly used in the definition of a pattern, and indicate a connecting terminals with an exterior. The node 427a is an input terminal, and the node 427b is an output terminal. The nodes 421a, 421b and 421c indicate workers, and labels 423a, 423b and 423c indicate the names of roles of the nodes 421a, 421b and 421c. In this example, the labels 423a and 423c are the same, and specifically, 421a and 421c are nodes representing the same person.

The arcs 422b, 422c and 422d each indicate the delivery and receipt of electronic mail, and squares 424b, 424c and 424d indicate that they have a format. The format name is "document X" as indicated by labels 425b, 425c and 425d.

The arcs 422a and 422e are indicated by a broken line in the same way as the arc 212b of FIG. 21, and are arcs to indicate the delivery and receipt of the electronic mail (indicating the completion of the operation) automatically generated and not having a format. The arcs 422a and 422e and the connecting terminals 427a and 427b, will be described afterward.

In the chart of FIG. 42, a difference from the charts described in the previous embodiments is that the transferring route of electronic mail is branched. In this embodiment, two arcs 422c and 422d are branched from the node 421b. The branching of transferring order is a function not only possible at the time of pattern registration of transferring order as in this example but also possible to be introduced in the ordinary transferring order definition described in the previous embodiments. In this embodiment, allowance of the branching of this transferring order will be also described. In FIG. 42, the arcs 422c and 422d have labels 426c and 426d respectively. These two labels are used to refer to where the node 421b is branched, and automatically prepared by the transferring order definition means.

In the description up to the eighth embodiment, the definition of the worker has been made using a visual chart alone, but to effect the branching, it is difficult to define using a chart alone in order to define the branching condition. When the mouse is double-clicked on the node of the worker during the definition of the transferring order as shown in FIG. 7, the window defining the details of the worker is called, and details can be defined.

Figure 43:
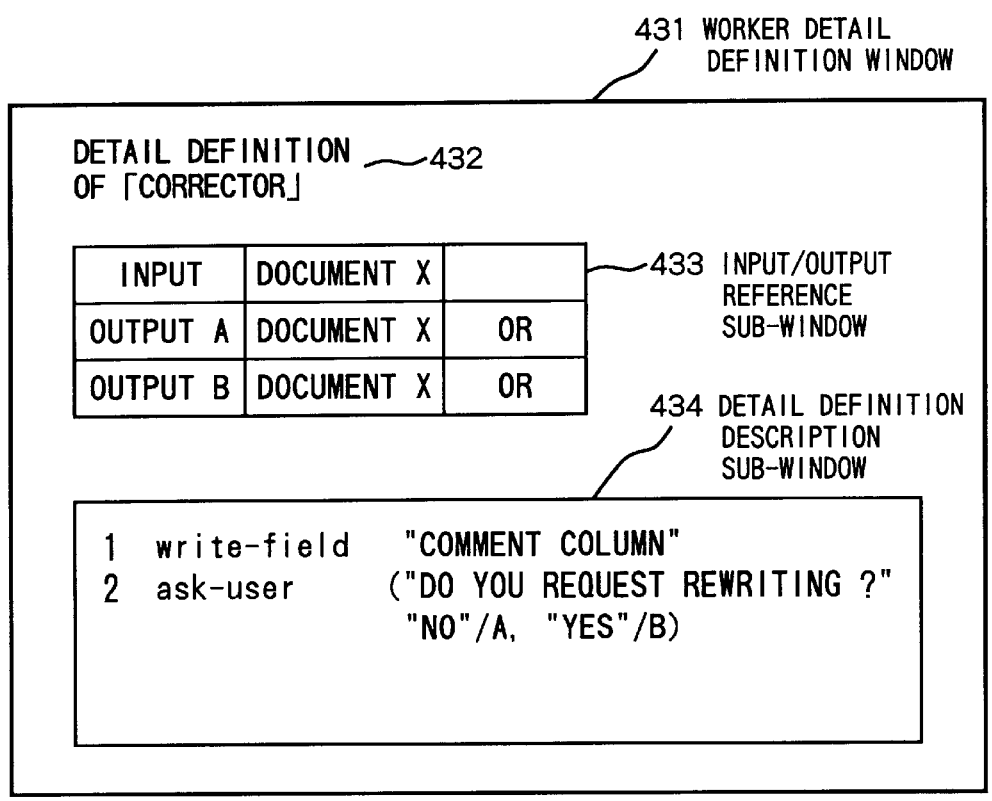
FIG. 43 is a screen view showing one example of the screen of the worker detail definition window regarding the corrector node of FIG. 42.

FIG. 43 shows one example of the screen of the worker detail definition window for defining in detail regarding the corrector node 421b of FIG. 42. A worker detail definition window 431 consists of a label 432, an input/output reference sub-window 433, and a detail definition description sub-window 434. The label 432 represents a name of the worker node (421b in this case) being edited, and is a "corrector" in this example. The input/output reference sub-window 433 shows a list of the input of electronic mail to the node 421b being edited and the output of electronic mail from the node 421b.

The "OR" in the third column is a part entered by the developer and indicates that the developer has selected that either of output "A" (corresponding to the arc 422d of FIG. 42) and output "B" (corresponding to the arc 422c of FIG. 42) is outputted. If "AND" is entered here, electronic mail (or document X) is outputted to both the arcs 422d and 422c.

The detail definition description sub-window 434 is a part entered by the developer, and the developer enters the specification of the node 421b including the branching conditions to the arcs 422d and 422c. But, the line number is added to the detail definition description sub-window 434 of FIG. 43 for convenience of description.

The first line indicates that a corrector 421b writes in the "comment column" of the document X. Specifically, it is indicated that when the field of the document X has a column named "comment column", the corrector 421b can write in that part only. This entry limitation has not been described in the embodiments up to the eighth embodiment, but can be effected by introducing the worker detail definition window 431 as in this embodiment.

The "ask-to-user" on the second line is a key word having three or more parameters. The first parameter indicates a character string shown to the worker, and the second and later parameters indicate a selector the worker can select and where branching is made when such selector is selected. Therefore, in this example, a character string "Do you request rewriting?" and two selectors "YES" and "NO" are shown to the worker or corrector, and when the worker selects the selector "NO", branching is made to "A" or the arc 422d, and when the worker selects "YES", branching is made to "B" or the arc 422c. The work detail of the worker defined within the detail definition description sub-window 434 is outputted after an appropriate conversion into the electronic mail utilization environment definition information which is referred to by the groupware utilization software used by the worker using the generation means.

In an example of FIG. 42, the branching of transferring order has occurred in the worker node 421b, but it may be branched in the software object. In such an example, it is necessary to include the description indicating a standard for judging the branching during defining the object. For example, there is a method to read the content of a certain field of the format of the inputted electronic mail and to branch according to the read content.

The node 421a of FIG. 42 has two arcs 422a and 422c designated as input. All such plural inputs have been interpreted as "synchronization" in the eighth embodiment, i.e. the node starts the operation when all inputs arrive, but in this embodiment, it is designated in the worker detail definition window whether synchronization is made regarding the plural inputs (AND) or the node starts the operation when either input is entered (OR). In the example of FIG. 42, since the arc 422b and the arc 422c form a loop, the input from the arc 422a in the node 421a is the first one time, but the input from the arc 422c has possibility to take place repeatedly. Therefore, since synchronization of the arc 422a and the arc 422c can not be made, "OR" is designated.

An example of reusing the pattern of the transferring order designed and registered as shown in the chart of FIG. 42 will be described. It is supposed here that the pattern of FIG. 42 is registered as "correction pattern".

Figure 44:
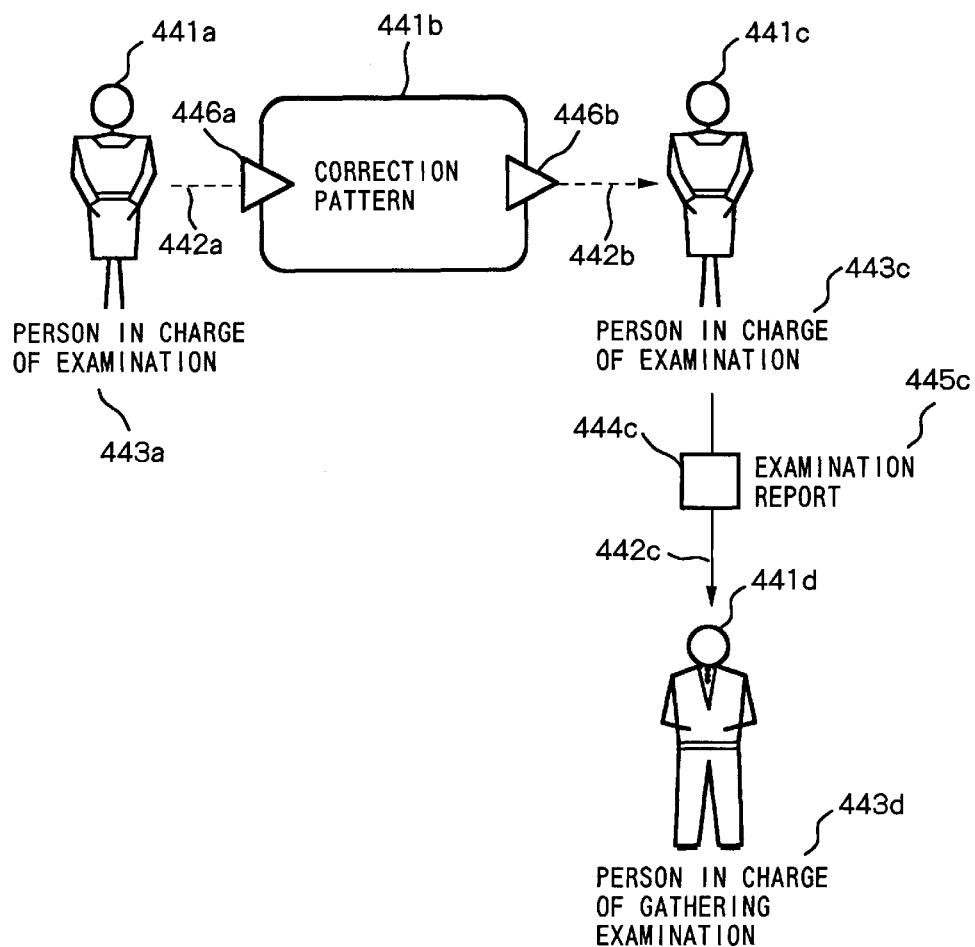
FIG. 44 is a chart showing an example that the transferring order is defined by reusing the correction pattern shown by the chart of FIG. 42.

FIG. 44 is a chart showing an example that the transferring order is defined by reusing the correction pattern shown by the chart of FIG. 42 when the groupware developer defines the transferring order. In FIG. 44, 441a, 441b and 441d are nodes, and 442a, 442b and 442c are arcs. The nodes 441a, 441c and 441d are workers, and 441b is a deletion pattern reused. Labels 443a, 443c and 443d of the node indicate the names of roles of worker nodes 441a, 441c and 441d. Square 444c indicates that the delivery and receipt of electronic mail shown by the arc 442c indicates that the electronic mail has a format, and the format is an "examination report" represented by a label 445c.

The arcs 442a and 442b are respectively connected to triangles 446a and 446b belonging to the correction pattern node 441b. The triangles 446a and 446b represent connecting terminals of a correction pattern, and correspond to connecting terminals 427a and 427b of FIG. 42 respectively. Therefore, the arcs 442a, 442b connected to these connecting terminals are connected to the arcs 422a, 422e of FIG. 42 respectively.

The arcs 442a, 442b are arcs indicated by a broken line, and the same with the arcs 422a, 422e. Thus, FIG. 44 can be connected to FIG. 42. The arcs indicated by a broken line originally indicate electronic mail which is automatically sent at the completion of the operation of the start node, but the node 441a does not have input and its operation is not defined. In this case, the electronic mail represented by the arc 442a under no condition at the start of the groupware generated according to the transferring order definition of FIG. 44 is transferred.

Figure 45:
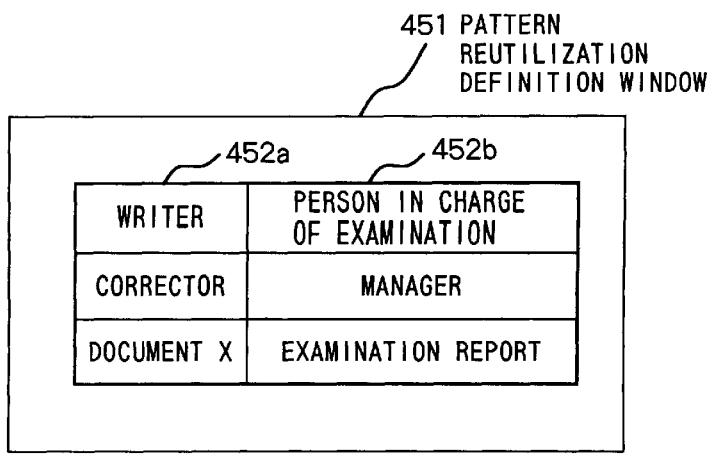
FIG. 45 is a screen view showing one embodiment of the pattern reutilization definition window.

The chart (FIG. 42) defining the correction pattern and the chart (FIG. 44) reusing the correction pattern cannot be connected unless the name of role and the name of document are corresponded. A pattern reutilization definition window is used so that the developer makes the definition required therefor. This pattern reutilization definition window is called by double-clicking the mouse on the node showing the deletion pattern, or the node 441b. FIG. 45 shows one example of the pattern reutilization definition window which is called by double-clicking the mouse on the correction pattern node 441b of FIG. 44.

The pattern reutilization definition window 451 has a table consisting of two columns 452a, 452b. The left column 452a is a list of role and format used in the chart defining the correction pattern shown in FIG. 42, and automatically generated by the transferring order definition means. The right column 452b is a column entering the names of role and format used in the transferring order definition (FIG. 44) for defining by reusing a pattern, and entered by the groupware developer.

In this example, a writer corresponds to a person in charge of examination, a corrector to a manager, and a document X to an examination report. The person in charge of examination and manager are generated by being replaced by the name of the actual worker defined by a role corresponding definition means when the generation means generates the groupware. Manager does not appear in FIG. 44 but is defined in FIG. 45, so that the role corresponding definition means needs the definition of the manager. The person in charge of examination of FIG. 44 and the writer of FIG. 42 have different icons (shapes of the nodes shown in the form of man), but this does not constitute any problem in the reutilization of the pattern.

When the chart of the correction pattern of FIG. 42 and the chart of the transferring order definition of FIG. 44 are connected according to the pattern reutilization definition of FIG. 45, the arc defined by the connection of the arc 442a and the arc 422a become the transfer of electronic mail from the person in charge of examination to the person in charge of examination or the transfer of electronic mail between the same persons. The arc indicating the transfer of electronic mail between the same persons or the same software objects is interpreted according to the following rule.

Specifically, it is a rule that the operation defined by an end node is executed after the completion of the operation defined by a start node. In case of the software object, this corresponds to a state transition. This rule is applied to a case of the arc indicated by a broken line and to a case that a format is designated by the arc indicated by a solid line. The same is applied to the connection of the arc 422c and the arc 442b.

As described above, in the transferring order definition shown in FIG. 44, the transferring order that the person in charge of examination asks the manager to correct the examination report by reusing the correction pattern, and it is presented to a person in charge of gathering examinations is defined.

A detailed embodiment of the generation means of the groupware development assisting system described in the first embodiment through the ninth embodiment will be described. The groupware development assisting system including the function provided by all embodiments is supposed here, and the structure of the generation means which can be applied to all embodiments described will be described.

Figure 46:
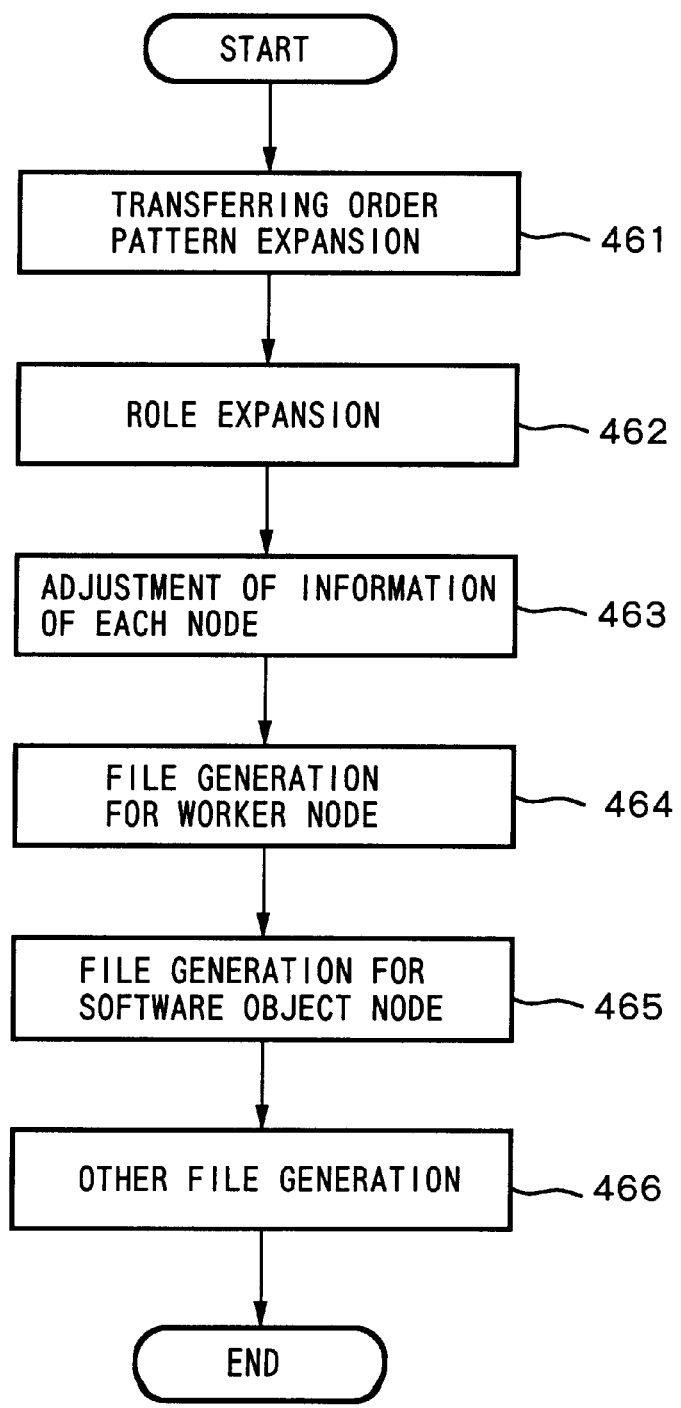
FIG. 46 is a flowchart showing the outline of the generating procedure of the generation means.

FIG. 46 is a flowchart showing the outline of the generating procedure of the generation means. Each step will be described successively.

(Step 461): When the transferring order pattern described in the ninth embodiment is used in the transferring order definition, the pattern is expanded, and the original transferring order definition is converted to the transferring order definition without a pattern. The meeting pseudo object shown in the fourth embodiment and the fifth embodiment is treated as one type of the transferring order pattern and expanded.

(Step 462): When the role corresponding definition described in the second embodiment is being conducted, the role name is converted to an actual name of the worker.

(Step 463): Required information is arranged for each node of the graph appearing in the transferring order definition. When the same node appear in plural in the transferring order definition, they are arranged.

(Step 464): Among the transferring order definition, a file concerning each worker node or an electronic mail utilization environment definition file for the worker is generated.

(Step 465): Among the transferring order definition, a file concerning each software object node or an electronic mail utilization environment definition file for each software object, and a processing program file are generated.

(Step 466): A file required for another is generated. In the previous embodiments, the initialization file for MERMAID corresponds to this.

Each step will be described in detail.

Figure 47:
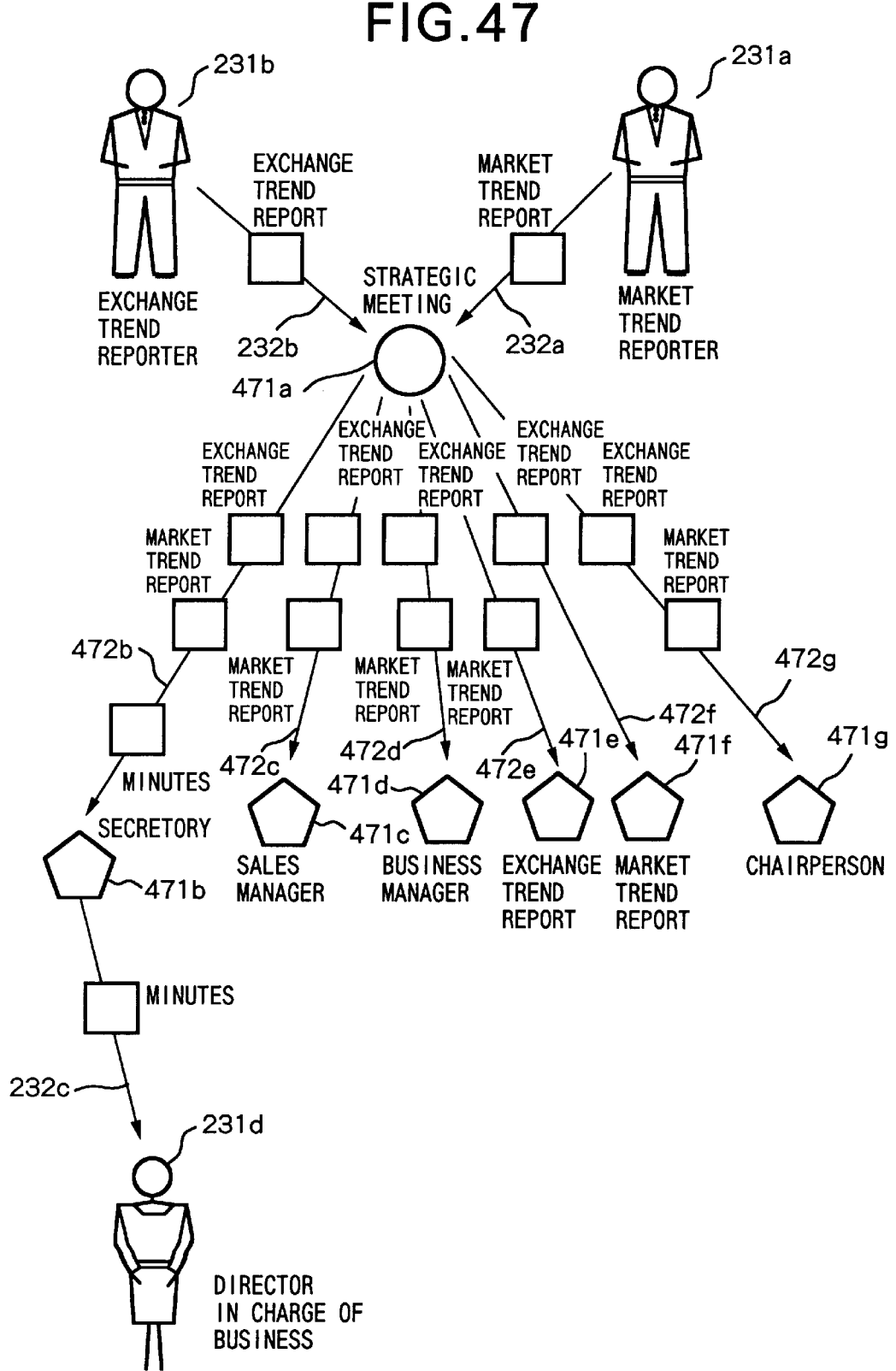
FIG. 47 is a chart showing the expansion example of FIG. 23 under the object definition shown in FIG. 24.

In the step 461, for example the pattern shown in FIG. 42 is applied to, for example, the transferring order definition of FIG. 44 to expand. In this case, according to the corresponding table defined in the pattern reutilization definition window of FIG. 45, the role name and format name are changed. Another required work in the step 461 is to expand the meeting pseudo object. For example, the transferring order definition using the meeting pseudo object shown in FIG. 23 is expanded as shown in FIG. 47 under the object definition shown in FIG. 24 (actually, a chart is not drawn, and codes are expanded in the generation means, but a chart is used here for description). As to the expansion method from FIG. 23 to FIG. 47, the outline has been described in the explanatory section of FIG. 23 and FIG. 24, but details will be described below.

1. Instead of the meeting pseudo object, one software object is placed. Here, it is temporarily called in the same name "StrategicMeeting" as the meeting pseudo object.

2. An arc to deliver data from the software object "StrategicMeeting" to all attendants excepting the sender of data is generated.

3. The software object "StrategicMeeting" generates a format of minutes, but generates an arc to send it to the secretary (exactly, a role designated as OutputMaker). The format of minutes is a format designated to an arc outputted from the meeting pseudo object in the original transferring order definition (FIG. 23).

4. An arc which sends the format of minutes from the secretary to the outside (destination where an output arc from the meeting pseudo object goes) is generated.

Specifically, the meeting pseudo object 231c of FIG. 23 is expanded to a software object 471a and worker objects 471b, 471c, 471d, 471e, 471f and 471g (in FIG. 47, icons of worker objects are shown in a pentagon). These are meeting attendants. The software object 471a delivers the electronic mail to be inputted in the meeting pseudo object 231c to the expanded worker objects 471b, 471c, 471d, 471e, 471f and 471g. This is respectively represented by arcs 472b, 472c, 472d, 472e, 472f and 472g (here, to avoid complexity, a square indicating two or more format designation is added to one arc, but actually, arcs are present in the number same to that of squares). But, delivery of the exchange trend report to the exchange trend reporter and delivery of the market trend report to the, market trend reporter are not made. Further, the software object 471a generates the format of minutes and sends to the secretary node 471b.

Figure 48:
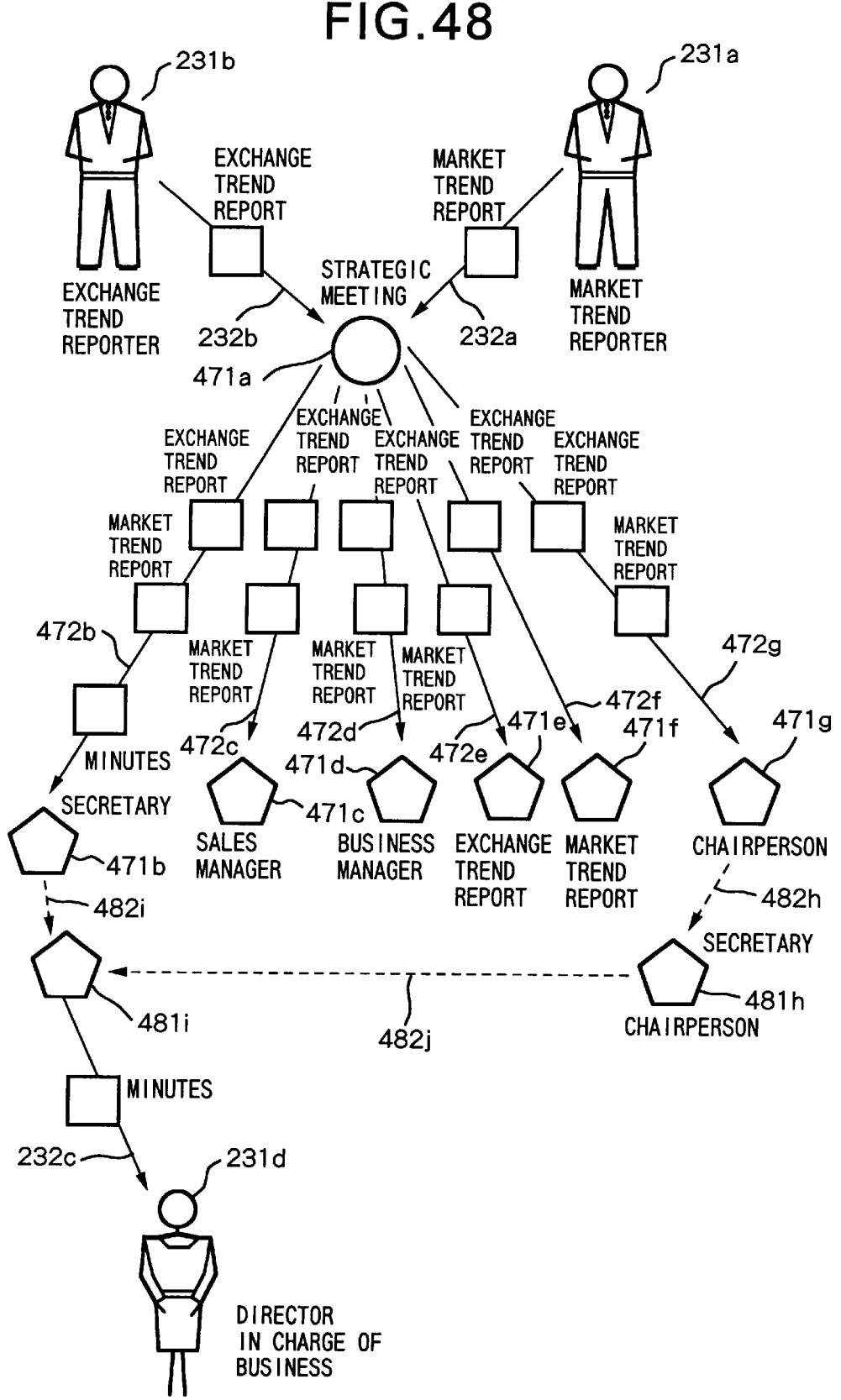
FIG. 48 is a chart showing the expansion example of FIG. 23 when using the meeting pseudo object definition of FIG. 27.

FIG. 48 is a expanded example of FIG. 23 that when the online realtime meeting system MERMAID is used as a realizing method of the meeting pseudo object, or the meeting pseudo object definition of FIG. 27 is used. A difference from FIG. 47 is that a chairperson node 481h, a secretary node 481i, arcs 482h, 482i and 482j are added. The chairperson has obligation to start the online realtime meeting system MERMAID since "Originator" is declared in FIG. 27. This obligation is recorded as an attribute of the chairperson node 471g.

The new chairperson node 481h is a node indicating the state of the chairperson after the termination of the online realtime meeting system MERMAID. The new secretary node 481i is a node indicating the state of the secretary after the start of the online realtime meeting system MERMAID. The arc 482h indicates a state transition of the chairperson occurring due to the termination of the online realtime meeting system MERMAID.

It has been described in the description of FIG. 42 that the arc of a broken line between the same nodes represents the state transition. The arc 482i indicates the state transition of the secretary which occurs by the start of the online realtime meeting system MERMAID. The arc 482j represents the transmission of SIGNAL type electronic mail (electronic mail not having a format) from the chairperson to the secretary, and advises the termination of the online realtime meeting system MERMAID to the secretary (this arc then generates the thirteenth and fourteenth lines of FIG. 29).

The step 463 of FIG. 46 will be described. The step 463 has the following procedure.

1. When the same type of nodes, i.e. same workers or objects of the same name appear in plural times during the transferring order definition, they are put together.

2. A list (node data table) having the start of arc and format as a key is prepared for an arc which may be inputted in each node.

3. Data needed to generate the action corresponding to each arc is written in the above node data table.

FIG. 49 is an example of generating the node data table regarding the nodes 471b, 482i of the "secretary" (Jiro Nakagawa) shown in FIG. 48. And, FIG. 50 is an example of generating the node data table regarding the person in charge of examination when expanding the transferring order definition shown in FIG. 42 and FIG. 44. But, FIG. 50 has been prepared in that the manager has an actual worker name of "Megumi Ishiguro" and the person in charge of collecting examinations has an actual worker name of "Tadashi Sekimoto".

FIG. 49 consists of five data lines 491, 492, 493, 494 and 495. The lines 491, 492 indicate the receipt of the exchange trend report and market trend report indicated by the arc 472b of FIG. 48. In this case, synchronization is not conducted, and it is defined as a node data table preparation method when using the online realtime meeting system MERMAID that action is "show" (indication of the received mail).

The line 493 also corresponds to the arc 472b and means the receipt of the minutes. At this time, the minutes are once stored in a file (Store/tmp/foobar), and transition is made to the following state (state 4), and this is defined as a node data table preparation method at the use of the online realtime meeting system MERMAID.

The line 494 is data regarding the node 481i which has made the state transition by the arc 482i. The "STATE-TRNS" is a key word to indicate a state transition, and in this case, the sender is not designated. It is designated to conduct synchronization with the arc 482j (indicated by synchronization "5"), and this is defined as a node data preparation method when using the online realtime meeting system "MERMAID". The line 495 corresponds to the arc 482j. In this case, synchronization with the line 494 is conducted, and a minutes file is taken and sent to "Hanako Suzuki". This action is also defined as a node data table preparing method when using the online realtime meeting system MERMAID.

FIG. 50 consists of five data lines 501, 502, 503, 504 and 505. The line 501 corresponds to the node 441*a* of FIG. 44. The "BEGIN" is a key word indicating that there is no flowing-in of the arc, and when the "BEGIN" is used, the sender is not designated. Here, the arc 442*a* represents the state transition, so that an action (state 2) representing the transition to the line 502 is indicated.

The line 502 corresponds to the arc 422*a* (same to the arc 442*a*) which flows into the node 421*a*. Here, an examination report (corresponding to the "document X" of FIG. 42) is newly prepared, admitted, and sent to "Megumi Ishiguro" (corrector). The line 503 corresponds to the arc 422*c* which flows into the node 421*a*. As to the format, "F (approval)= NO" is indicated and it means "when the approval field of the examination report is "NO".

The line 504 corresponds to the arc 422*d* which flows into the node 421*c*, but since the format and the sender alone are not sufficient to judge which case of the lines 503 and 504, a value of the field is further examined here. Here, the approval field has a value of "YES" or "NO" automatically written by the action of "ask-to-user" shown on the second line of the detail definition description sub-window 434 of FIG. 43. The line 505 corresponds to the node 441*c* of FIG. 44.

FIG. 51 is an example of the node data table generated regarding the software object node 311*d* (BudgetManager) of FIG. 31. FIG. 51 consists of a line 511 alone. The "proc_BudgetManger_1" is a name automatically given to the Procedure defined in FIG. 33. In case of the software object, the generation of format and the cooperation work are described in the object definition by the developer. In this case, such action is described in the "proc_BudgetManger_1". Therefore, in the node data table, it is sufficient by entering the procedure call and electronic mail sending alone.

The step 463 for preparing the node data table of FIG. 49, FIG. 50 and FIG. 51 described above will be described again in detail. The step 463 makes the following processing on each node (when the same type of nodes appears in plural, one having them put together).

1. As to the arc flowing into all nodes, a pair of format (SIGNAL, including a state transition) and sender (excluding a case of state transition) is prepared. If there is no flowing-in, it is determined to be BEGIN.

2. As to the arc flowing into the nodes, it is checked that a pair of format and sender does not appear two or more times. If it appears two or more times, it is examined whether a value of a specific field in the format can be specified as in the case of the lines 503 and 504 of FIG. 50 (in the case of FIG. 50, it can be specified because the value of approval field is designated in FIG. 43). When the format and sender are in the same combination, and there are a plurality of arcs which can not be distinguished by a value of a specified field, it is determined to be an error.

3. The format of the node data table and the column of the sender are entered on the basis of the data examined in the previous step.

4. As to a part that the action is previously determined like the meeting pseudo object, synchronization and generation of an action part are conducted as determined.

5. The presence or not of synchronization is checked, and the synchronization column of the node data table is filled.

6. In case of the worker node, the action column is generated according to the following rules.

(a) When the input format is the same with the output format, edit<format name>, send<format name>to<addressee> is determined as action.

(b) When the input format is different from the output format, the show<input format name>, create<output format name>, send<format name>to<addressee> is determined as action.

(c) As an exception of the above, when SIGNAL is output, the create-signal-message send<SIGNAL>to<addressee> is determined as action.

7. In case of the software object node, the action column is generated according to the following rules.

(a) A unique name is given to the Procedure part of the object definition, and stored as a function of C language (as to the definition of the Procedure, the form as a function as C language is prepared by adding a type of function, name, declaration of an argument and return statement). Thus function is used in the step 465.

(b) The above function is determined to be the first action.

(c) The send<output format name>to <addressee> is determined to be the second action.

The step 464 of FIG. 46 will be described. This step returns the node data table for the worker node prepared in the step 463 to the original, and generates the electronic mail utilization environment definition for each worker by the following procedure.

1. When there is a worker environment definition, environment declaration is generated (see the examples of FIG. 37 and FIG. 38).

2. A condition part (line which starts with BEGIN, if, etc.) is generated with reference to the format of node data table and the column of sender, and an action part (line which is executed by the formation of the condition part) is generated with reference to the action column. At this time, care must be taken to the following points.

A variable is used temporarily as required (e.g., "A" on the third line of FIG. 13).

When there is synchronization, this process is conducted (e.g., the processing by "m" and "n" on the first, fourth, seventh, ninth and tenth lines of FIG. 41).

When there is a special generation method like the case of the meeting pseudo object, this method is followed.

The step 465 of FIG. 46 will be described. This step generates the processing program and the electronic mail utilization definition for each software object on the bases of the software object node data table prepared in the step 463. The generation is made by the following procedure.

1. One pulled out from the Procedure part of the object definition and changed into a function of C language is outputted as a processing program in the step 463.

2. The generation method of electronic mail utilization environment definition is in accordance with the case of the worker node. But, "do-proc" is used to call the processing program.

Lastly, the step 466 of FIG. 46 will be described. This step is executed in a special case alone, for example the generation of an initializing file for MERMAID using the online realtime meeting system MERMAID. The generation content when using the online real time meeting system MERMAID has been already described in the embodiment, and generates a dedicated initializing file for the chairperson and secretary by a determined method. When a meeting tool other than the online realtime meeting system MERMAID is used, or a special transferring pattern or tool is newly introduced, it is necessary to include the generation method in the generation means every time.

An embodiment of the electronic mail receiving software other than the groupware development assisting system body of this invention will be described. The groupware utilization software 370*a* described with reference to FIG. 37 is the embodiment of this electronic mail receiving software. The groupware utilization software 370*a* of FIG. 37 includes the communication means 371*a*. When the control means 372 controls the communication means 371*a* to look for the communication means 371*b* possessed by a terminal which is the other side of the communication, a terminal having an identification name designated by the electronic mail utilization environment definition information of FIG. 38 is selected, looked for and connected.

In this case, the name of the electronic mail editing software designated by the electronic mail utilization environment definition file is given from the environment interpreting means 371 to the control means 372, and from the control means 372, given to the user interface means 373 on the terminal side through the communication means 371*a* and the communication means 371*b*, then the user interface means 373 starts the designated electronic mail editing software.

As described above, since the groupware development assisting system of this invention is structured as described above, it has effects excelling in convenience of the assisting system and diversity of transferring forms which the assisting system can treat. Specifically, the following effects are accomplished.

1. A developer who does not have a specialized knowledge on an exclusive language can easily develop the groupware using electronic mail.

2. Free electronic mail transferring order can be set between a worker and a processing program (object), so that it is possible to consistently design a series of procedures having the entry by manual and the processing by the system intermingled.

3. With the groupware development assisting system according to the second embodiment, a developing method which can determine afterward which worker specifically gets which role can be used.

4. With the groupware development assisting system according to the third embodiment, a groupware which automatically generates and gives and receives electronic mail showing the completion of work can be generated.

5. With the groupware development assisting system according to the fourth embodiment, the development of groupware supporting a series of works with a meeting among it can be assisted. Particularly, with the groupware development assisting system according to the fifth embodiment, an online realtime meeting system can be used.

6. With the groupware development assisting system according to the sixth embodiment, a groupware using a so-called multi-agent system in which a plurality of software modules dynamically adjusts mutual autonomic targets to automatically find an optimum solution can be generated.

7. With the groupware development assisting system according to the seventh embodiment, the construction of a flexible system reflecting a preference of workers and work environment can be supported.

8. With the groupware development assisting system according to the eighth embodiment, a transferring order to start the next operation after receiving a plurality of electronic mails can be defined.

9. With the groupware development assisting system according to the ninth embodiment, a pattern which is frequently used in connection of the transferring order of electronic mail is previously defined, and it can be reused to efficiently develop the groupware.

10. In general, the groupware development assisting system of this invention can save labor extensively in developing the groupware, and can enhance developing efficiency.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A groupware development assisting system for assisting effective execution of a series of works by giving or receiving electronic mail among a plurality of nodes, comprising:

a format definition means for dynamically visually defining a format of said electronic mail given or received among said nodes and outputting the defined format as format definition information, wherein said format definition information includes label fields, text fields, and selection fields, and a layout of the respective fields;

an object definition means for defining operation condition information of a software object forming one of said nodes inputting or outputting said electronic mail and outputting as object definition information;

a transferring order definition means for visually designating a transferring order showing an order in which said electronic mail is to be delivered and received in succession among said plurality of nodes and a format of said electronic mail given or received by said transferring order and outputting as transferring order definition information; and a generation means for generating first electronic mail utilization environment definition information A indicating a transferring operation of said electronic mail and an editing operation of said electronic mail in said transferring order relating to at node corresponding to a worker who is a component unit of said nodes based on said format definition information, said object definition information and said transferring order definition information, and generating a processing program code required to execute individual operation of said software object and second electronic mail utilization environment definition information indicating the transferring operation of said electronic mail in said transferring order relating to said software object based on said format definition information, said object definition information and said transferring order definition information.

2. A groupware development assisting system as set forth in claim 1, wherein said generation means, when the format of said electronic mail in said transferring order is not designated by said transferring order definition means, generates a processing program code for said software object described to automatically generate and transfer the electronic mail in a format previously fixed to indicate the completion of the work of said software object node which is a node on a sending side of said electronic mail which has said format not designated.

3. A groupware development assisting system as set forth in claim 1, wherein said generation means, when a meeting pseudo object node expressing a meeting by a plurality of workers with said electronic mail as at least input or output as one of said software object nodes is described by said transferring order definition means, delivers said electronic mail which is inputted to said meeting pseudo object node as a meeting material to the nodes corresponding to all workers attending said meeting excluding a sender, and generates electronic mail utilization environment definition information indicating to deliver said electronic mail in a format designated minutes to at least one previously designated worker node.

4. A groupware development assisting system as set forth in claim 1, wherein said generation means, when said software object node having a plurality of electronic mail inputs by said transferring order definition means, generates electronic mail utilization environment definition information which indicates to start the operation of said software object after waiting the completion of a plurality of electronic mail inputs as said groupware of said software object node having said plurality of electronic mail inputs.

5. A groupware development assisting system as set forth in claim 1, wherein said transferring order definition means has a reutilization means which refers to a pattern of transferring order previously registered and reuses.

6. A groupware development assisting system as set forth in claim 2, wherein said generation means, when the meeting pseudo object node expressing the meeting by a plurality of workers with said electronic mail as at least input or output as one of said software object nodes is described by said transferring order definition means, delivers said electronic mail which is inputted to said meeting pseudo object node as a meeting material to the nodes corresponding to workers attending said meeting, and generates electronic mail utilization environment definition information indicating to deliver said electronic mail in a format designated minutes to at least one previously designated worker node.

7. A groupware development assisting system as set forth in claim 2, wherein said generation means, when said software object node having a plurality of electronic mail inputs by said transferring order definition means, generates electronic mail utilization environment definition information which indicates to start the operation of said software object after waiting the completion of a plurality of electronic mail inputs as said groupware of said software object node having said plurality of electronic mail inputs.

8. A groupware development assisting system as set forth in claim 2, wherein said transferring order definition means has a reutilization means which refers to a pattern of transferring order previously registered and reuses.

9. A groupware development assisting system as set forth in claim 3, wherein said meeting pseudo object is an online realtime meeting system communicating in realtime through an inter-computer network.

10. A groupware development assisting system as set forth in claim 3, wherein said generation means, when said software object node having a plurality of electronic mail inputs by said transferring order definition means, generates electronic mail utilization environment definition information which indicates to start the operation of said software object after waiting the completion of a plurality of electronic mail inputs as said groupware of said software object node having said plurality of electronic mail inputs.

11. A groupware development assisting system as set forth in claim 3, wherein said transferring order definition means has a reutilization means which refers to a pattern of transferring order previously registered and reuses.

12. A groupware development assisting system for assisting effective execution of a series of works by giving or receiving electronic mail among a plurality of nodes, comprising:

a format definition means for dynamically visually defining a format of said electronic mail given or received among said nodes and outputting the defined format as format definition information, wherein said format definition information includes label fields, text fields, and selection fields, and a layout of the respective fields;

an object definition means for defining operation condition information of a software object forming one of said nodes inputting or outputting said electronic mail and outputting as object definition information;

a transferring order definition means for visually designating a transferring order expressed in a role name given the order in which said electronic mail is to be delivered and received in succession among said plurality of nodes corresponded to said plurality of nodes and a format of said electronic mail given or received among said nodes in said transferring order, and outputting as transferring order definition information;

a role corresponding definition means for defining the corresponding relation between said role name given to said node and the actual name of a worker in said, node, and outputting as role corresponding definition; and a generation means for generating first electronic mail utilization environment definition information indicating the transferring operation of said electronic mail and the editing operation of said electronic mail relating to a node corresponding to a worker who is a component unit of said nodes in said transferring order based on said format definition information, said object definition information, said transferring order definition information and said role corresponding definition, and generating a processing program code required to execute individual operation of said software object and second electronic mail utilization environment definition information indicating the transferring operation of said electronic mail relating to said software object node based on said format definition information, said object definition information, said transferring order definition information and said role corresponding definition.

13. A groupware development assisting system as set forth in claim 12, wherein said generation means, when the format of said electronic mail in said transferring order is not designated by said transferring order definition means, generates a processing program code for said software object described to automatically generate and transfer the electronic mail in a format previously fixed to indicate the completion of the work of said software object node which is a node on a sending side of said electronic mail which has said format not designated.

14. A groupware development assisting system as set forth in claim 12, wherein said generation means, when a meeting pseudo object node expressing the meeting by a plurality of workers with said electronic mail as at least input or output as one of said software object nodes is described by said transferring order definition means, delivers said electronic mail which is inputted to said meeting pseudo object node as a meeting material to the nodes corresponding to workers attending said meeting, and generates electronic mail utilization environment definition information indicating to deliver said electronic mail in a format designated minutes to at least one previously designated worker node.

15. A groupware development assisting system as set forth in claim 12, wherein said generation means, when said software object node having a plurality of electronic mail inputs by said transferring order definition means, generates electronic mail utilization environment definition information which indicates to start the operation of said software object after waiting the completion of a plurality of electronic mail inputs as said groupware of said software object node having said plurality of electronic mail inputs.

16. A groupware development assisting system as set forth in claim 12, wherein said transferring order definition means has a reutilization means which refers to a pattern of transferring order previously registered and reuses.

17. A groupware development assisting system as set forth in claim 13, wherein said generation means, when a meeting pseudo object node expressing a meeting by a plurality of workers with said electronic mail as at least input or output as one of said software object nodes is described by said transferring order definition means, delivers said electronic mail which is inputted to said meeting pseudo object node as a meeting material to the nodes corresponding to workers attending said meeting, and generates electronic mail utilization environment definition information indicating to deliver said electronic mail in a format designated minutes to at least one previously designated worker node.

18. A groupware development assisting system as set forth in claim 13, wherein said generation means, when said software object node having a plurality of electronic mail inputs by said transferring order definition means, generates electronic mail utilization environment definition information which indicates to start the operation of said software object after waiting the completion of a plurality of electronic mail inputs as said groupware of said software object node having said plurality of electronic mail inputs.

19. A groupware development assisting system as set forth in claim 13, wherein said transferring order definition means has a reutilization means which refers to a pattern of transferring order previously registered and reuses.

20. A groupware development assisting system as set forth in claim 14, wherein said meeting pseudo object is an online realtime meeting system communicating in realtime through an inter-computer network.

21. A groupware development assisting system as set forth in claim 14, wherein said generation means, when said software object node having a plurality of electronic mail inputs by said transferring order definition means, generates electronic mail utilization environment definition information which indicates to start the operation of said software object after waiting the completion of a plurality of electronic mail inputs as said groupware of said software object node having said plurality of electronic mail inputs.

22. A groupware development assisting system as set forth in claim 14, wherein said transferring order definition means has a reutilization means which refers to a pattern of transferring order previously registered and reuses.

23. A groupware development assisting system for assisting effective execution of a series of works by giving or receiving electronic mail among a plurality of nodes, comprising:

a format definition means for dynamically visually defining a format of said electronic mail given or received among said nodes and outputting the defined format as format definition information, wherein said format definition information includes label fields, text fields, and selection fields, and a layout of the respective fields;

an object definition means for defining operation condition information of a software object forming one of said nodes inputting or outputting said electronic mail and outputting as object definition information;

a transferring order definition means for visually designating a transferring order showing the order in which said electronic mail is to be delivered and received in succession among said plurality of nodes and a format of said electronic mail given or received by said transferring order, and outputting as transferring order definition information; and a generation means for generating first electronic mail utilization environment definition information indicating the transferring operation of said electronic mail and the editing operation of said electronic mail in said transferring order relating to a node corresponding to a worker who is a component unit of said nodes based on said format definition information, said object definition information and said transferring order definition information, and generating a processing program code required to execute individual operation of said software object and second electronic mail utilization environment definition information indicating the transferring operation of said electronic mail in said transferring order relating to said software object based on said format definition information, said object definition information and said transferring order definition information, said generation means, when a mutual relation meaning cooperation among said plurality of software object nodes is defined by said transferring order definition means, generating a processing program code for said software object described to execute multi-agent processing for automatically obtaining an optimum solution while dynamically adjusting a self-target of said software object node having a mutual relation indicating said cooperation.

24. A groupware development assisting system as set forth in claim 23, wherein said generation means, when the format of said electronic mail in said transferring order is not designated by said transferring order definition means, generates a processing program code for said software object which described to automatically generate and transfer the electronic mail in a format previously fixed to indicate the completion of the work of said software object node which is a node on a sending side of said electronic mail which has said format not designated.

25. A groupware development assisting system as set forth in claim 23, wherein said generation means, when a meeting pseudo object node expressing a meeting by a plurality of workers with said electronic mail as at least input or output as one of said software object nodes is described by said transferring order definition means, delivers said electronic mail which is inputted to said meeting pseudo object node as a meeting material to the nodes corresponding to workers attending said meeting, and generates electronic mail utilization environment definition information indicating to deliver said electronic mail in a format designated minutes to at least one previously designated worker node.

26. A groupware development assisting system as set forth in claim 23, comprising a work environment definition means which defines work environments including individual editing program and electronic mail utilization environment used by said worker corresponding node and types of individual computer used as said worker corresponding node and network to which said worker corresponding node belongs, said generation means generating electronic mail utilization environment definition information for indicating to execute the transferring operation of said electronic mail and the editing operation of said electronic mail under said working environment designated by said working environment definition information as said groupware of said worker corresponding node.

27. A groupware development assisting system as set forth in claim 23, wherein said generation means, when said software object node having a plurality of electronic mail inputs by said transferring order definition means, generates electronic mail utilization environment definition information which indicates to start the operation of said software object after waiting the completion of a plurality of electronic mail inputs as said groupware of said software object node having said plurality of electronic mail inputs.

28. A groupware development assisting system as set forth in claim 23, wherein said transferring order definition means has a reutilization means which refers to a pattern of transferring order previously registered and reuses.

29. A groupware development assisting system for assisting effective execution of a series of works by giving or receiving electronic mail among a plurality of nodes, comprising:

a format definition means for dynamically visually defining a format of said electronic mail given or received among said nodes and outputting the defined format as format definition information, wherein said format definition information includes label fields, text fields, and selection fields, and a layout of the respective fields;

an object definition means for defining operation condition information of a software object forming one of said nodes inputting or outputting said electronic mail and outputting as object definition information, a transferring order definition means for visually designating a transferring order showing the order in which said electronic mail is to be delivered and received in succession among said plurality of nodes and a format of said electronic mail given or received by said transferring route, and outputting as transferring order definition information;

a generation means for generating first electronic mail utilization environment definition information indicating the transferring operation of said electronic mail and the editing operation of said electronic mail in said transferring order relating to a node corresponding to a worker who is a component unit of said nodes based on said format definition information, said object definition information and said transferring order definition information, and generating a processing program code required to execute individual operation of said software object and second electronic mail utilization environment definition information indicating the transferring operation of said electronic mail in said transferring order relating to said software object based on said format definition information, said object definition information and said transferring order definition information; and a working environment definition means for defining work environments including individual editing program and electronic mail utilization environment used by said worker corresponding node and types of individual computer used as said worker corresponding node and network to which said worker corresponding node belongs, said generation means generating electronic mail utilization environment definition information for indicating to execute the transferring operation of said electronic mail and the editing operation of said electronic mail under said working environment definition information said groupware of said worker corresponding node.

30. A groupware development assisting system as set forth in claim 29, wherein said generation means, when the format of said electronic mail in said transferring order is not designated by said transferring order definition means, generates a processing program code for said software object which described to automatically generate and transfer the electronic mail in a format previously fixed to indicate the completion of the work of said software object node which is a node on a sending side of said electronic mail which has said format not designated.

31. A groupware development assisting system as set forth in claim 29, wherein said generation means, when a meeting pseudo object node expressing a meeting by a plurality of workers with said electronic mail as at least input or output as one of said software object nodes is described by said transferring order definition means, delivers said electronic mail which is inputted to said meeting pseudo object node as a meeting material to the nodes corresponding to workers attending said meeting, and generates electronic mail utilization environment definition information indicating to deliver said electronic mail in a format designated minutes to at least one previously designated worker node.

32. A groupware development assisting system as set forth in claim 29, wherein said generation means, when said software object node having a plurality of electronic mail inputs by said transferring order definition means, generates electronic mail utilization environment definition information which indicates to start the operation of said software object after waiting the completion of a plurality of electronic mail inputs as said groupware of said software object node having said plurality of electronic mail inputs.

33. A groupware development assisting system as set forth in claim 29, wherein said transferring order definition means has a reutilization means which refers to a pattern of transferring order previously registered and reuses.

34. A groupware development assisting system for assisting effective execution of a series of works by giving or receiving electronic mail among a plurality of nodes, comprising:

a format definition means for dynamically visually defining a format of said electronic mail given or received among said nodes and outputting the defined format as format definition information, wherein said format definition information includes label fields, text fields, and selection fields, and a layout of the respective fields;

an object definition means for defining operation condition information of a software object forming one of said nodes inputting or outputting said electronic mail and outputting as object definition information;

a transferring order definition means for visually designating a transferring order expressed in a role name given the order in which said electronic mail is to be delivered and received in succession among said plurality of nodes corresponded to said plurality of nodes and a format of said electronic mail given or received among said nodes in said transferring order, and outputting as transferring order definition information;

a role corresponding definition means for defining the corresponding relation between said role name given to said node and the actual name of a worker in said nodes, and outputting as role corresponding definition; and a generation means for generating first electronic mail utilization environment definition information indicating the transferring operation of said electronic mail and the editing operation of said electronic mail relating to a nodes corresponding to a worker who is a component unit of said nodes in said transferring order based on said format definition information, said object definition information, said transferring order definition information and said role corresponding definition, and generates a processing program code required to execute individual operation of said software object and second electronic mail utilization environment definition information indicating the transferring operation of said electronic mail relating to said software object node based on said format definition information, said object definition information, said transferring order definition information and said role corresponding definition, said generation means, when a mutual relation meaning cooperation among said plurality of software object nodes is defined by said transferring order definition means, generating a processing program code for said software object described to execute multi-agent processing for automatically obtaining an optimum solution while dynamically adjusting a self-target of said software object node having a mutual relation indicating said cooperation.

35. A groupware development assisting system as set forth in claim 34, wherein said generation means, when the format of said electronic mail in said transferring route is not designated by said transferring order definition means, generates a processing program code for said software object which described to automatically generate and transfer the electronic mail in a format previously fixed to indicate the completion of the work of said software object node which is a node on a sending side of said electronic mail which has said format not designated.

36. A groupware development assisting system as set forth in claim 34, wherein said generation means, when a meeting pseudo object node expressing a meeting by a plurality of workers with said electronic mail as at least input or output as one of said software object nodes is described by said transferring order definition means, delivers said electronic mail which is inputted to said meeting pseudo object node as a meeting material to the nodes corresponding to workers attending said meeting, and generates electronic mail utilization environment definition information indicating to deliver said electronic mail in a format designated minutes to at least one previously designated worker node.

37. A groupware development assisting system as set forth in claim 34, comprising a work environment definition means which defines work environments including individual editing program and electronic mail utilization environment used by said worker corresponding node and types of individual computer used as said worker corresponding node and network to which said worker corresponding node belongs, said generation means generating electronic mail utilization environment definition information for indicating to execute the transferring operation of said electronic mail and the editing operation of said electronic mail under said working environment designated by said working environment definition information as said groupware of said worker corresponding node.

38. A groupware development assisting system as set forth in claim 34, wherein said generation means, when said software object node having a plurality of electronic mail inputs by said transferring order definition means, generates electronic mail utilization environment definition information which indicates to start the operation of said software object after waiting the completion of a plurality of electronic mail inputs as said groupware of said software object node having said plurality of electronic mail inputs.

39. A groupware development assisting system as set forth in claim 34, wherein said transferring order definition means has a reutilization means which refers to a pattern of transferring order previously registered and reuses.

40. A groupware development assisting system for assisting effective execution of a series of works by gibing or receiving electronic mail among a plurality of nodes, comprising:

a format definition means for dynamically visually defining a format of said electronic mail given or received among said nodes, and outputting the defined format as format definition information, wherein said format definition information includes label fields, text fields, and selection fields, and a layout of the respective fields;

an object definition means for defining operation condition information of a software object forming one of said nodes inputting or outputting said electronic mail, and outputting as object definition information; a transferring order definition means for visually designating a transferring order showing the order in which said electronic mail is to be delivered and received in succession among said plurality of nodes and a format of said electronic mail given or received by said transferring order, and outputting as transferring order definition information;

a generation means for generating first electronic mail utilization environment definition information indicating the transferring operation of said electronic mail and the editing operation of said electronic mail in said transferring order relating to a node corresponding to a worker who is a component unit of said nodes based on said format definition information, said object definition information and said transferring order definition information, and generating a processing program code required to execute individual operation of said software object and second electronic mail utilization environment definition information indicating the transferring operation of said electronic mail in said transferring order relating to said software object based on said format definition information, said object definition information and said transferring order definition information; and a working environment definition means for defining work environments including individual editing program and electronic mail utilization environment used by said worker corresponding node and types of individual computer used as said worker corresponding node and network to which said worker corresponding node belongs, said generation means generating electronic mail utilization environment definition information for indicating to execute the transferring operation of said electronic mail and the editing operation of said electronic mail under said working environment designated by said working environment definition information as said groupware of said worker corresponding node.

41. A groupware development assisting system as set forth in claim 40, wherein said generation means, when the format of said electronic mail in said transferring order not designated by said transferring order definition means, generates a processing program code for said software object which described to automatically generate and transfer the electronic mail in a format previously fixed to indicate the completion of the work of said software object node which is a node on a sending side of said electronic mail which has said format not designated.

42. A groupware development assisting system as set forth in claim 40, wherein said generation means, when a meeting pseudo object node expressing a meeting by a plurality of workers with said electronic mail as at least input or output as one of said software object nodes is described by said transferring order definition means, delivers said electronic mail which is inputted to said meeting pseudo object node as a meeting material to the nodes corresponding to workers attending said meeting, and generates electronic mail utilization environment definition information indicating to deliver said electronic mail in a format designated minutes to at least one previously designated worker node.

43. A groupware development assisting system as set forth in claim 40, wherein said generation means, when said software object node having a plurality of electronic mail inputs by said transferring order definition means, generates electronic mail utilization environment definition information which indicates to start the operation of said software object after waiting the completion of a plurality of electronic mail inputs as said groupware of said software object node having said plurality of electronic mail inputs.

44. A groupware development assisting system as set forth in claim 40, wherein said transferring order definition means has a reutilization means which refers to a pattern of transferring order previously registered and reuses.

* * * * *